United States Patent
Takenaka et al.

(10) Patent No.: US 6,243,623 B1
(45) Date of Patent: Jun. 5, 2001

(54) LEG TYPE MOBILE ROBOT CONTROL APPARATUS

(75) Inventors: Toru Takenaka; Tadaaki Hasegawa; Takashi Matsumoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/331,587

(22) PCT Filed: Jan. 30, 1998

(86) PCT No.: PCT/JP98/00399

§ 371 Date: Aug. 25, 1999

§ 102(e) Date: Aug. 25, 1999

(87) PCT Pub. No.: WO98/33629

PCT Pub. Date: Aug. 6, 1998

(30) Foreign Application Priority Data

Jan. 31, 1997 (JP) .................................................... 9-033176

(51) Int. Cl.[7] .................................................... G06F 19/00
(52) U.S. Cl. ........................... 700/245; 700/246; 700/247; 700/249; 700/250; 700/251; 700/253; 700/260; 901/1; 901/9; 901/33; 901/46; 901/47; 901/48; 180/8.1; 180/8.6; 701/23
(58) Field of Search .................................... 700/245, 246, 700/251, 260, 247, 249, 253, 258, 250; 318/568.12, 568.22, 568.2, 568.17, 568.11, 568.1, 567; 180/8.1, 8.6; 701/23, 124; 901/1, 48, 46, 47, 2, 9, 33; 414/730, 734

(56) References Cited

U.S. PATENT DOCUMENTS 5,337,235 * 8/1994 Takahashi et al. ...................... 701/23
5,349,277 * 9/1994 Takahashi et al. .............. 318/568.12

(List continued on next page.)

FOREIGN PATENT DOCUMENTS 62-97005  5/1987 (JP) .
4-15068   3/1992 (JP) .
5-62363   9/1993 (JP) .

(List continued on next page.)

OTHER PUBLICATIONS

Nagy et al., Motion Control for a Novel Legged Robot, IEEE., pp. 2–7, 1989.*

Primary Examiner—William A. Cuchlinski, Jr.
Assistant Examiner—McDieunel Marc
(74) Attorney, Agent, or Firm—Arent Fox Kintner Plotkin & Kahn, PLLC

(57) ABSTRACT

In a legged mobile robot, in particular in a biped robot, the feet position and/or posture is determined in such a manner that compensating moment of total floor reaction force about a desired total floor reaction force central point is determined, based upon the detected posture inclination of the robot, and is distributed to each of the feet such that each foot rotates respectively by predetermined angles about the desired total foot floor reaction force central point and a desired foot floor reaction force central point, in order to control the actual total floor reaction force and the actual foot floor reaction force acting on the robot properly such that it walks on a floor having not only a slope extending over a relatively long distance, but also existing locally. With this, it becomes possible to control the floor reaction force acting on the robot easily and properly, without causing any interference to occur. Moreover, the system can ensure to control the floor reaction force acting on the robot properly, even when walking on the floor having not only a slant or undulation extending over a relatively long distance. Furthermore, the system can achieve the posture stabilization control of a legged mobile robot easily, decrease the impact acting on the legged mobile robot at foot landing, and enhance the contactability with the floor so as to prevent the slippage or spinning at walking from happening. In addition, the system can decrease the load of the actuators of the legged mobile robot.

13 Claims, 33 Drawing Sheets

U.S. PATENT DOCUMENTS

| | | | | |
|---|---|---|---|---|
| 5,355,064 | * | 10/1994 | Yoshino et al. | 318/568.12 |
| 5,445,235 | * | 8/1995 | Gomi et al. | 180/8.6 |
| 5,459,659 | * | 10/1995 | Takenaka | 700/260 |
| 5,594,644 | * | 1/1997 | Hasegawa et al. | 701/23 |
| 5,838,130 | * | 11/1998 | Ozawa | 318/568.2 |
| 5,872,893 | * | 2/1999 | Takenaka et al. | 700/245 |

FOREIGN PATENT DOCUMENTS

| | | |
|---|---|---|
| 5-305584 | 11/1993 | (JP) . |
| 5-305586 | 11/1993 | (JP) . |
| 405305580A * | 11/1993 | (JP) . |
| 5-337849 | 12/1993 | (JP) . |
| 6-31658 | 2/1994 | (JP) . |
| 6-79657 | 3/1994 | (JP) . |
| 10-86080 | 4/1998 | (JP) . |
| 10-86081 | 4/1998 | (JP) . |
| WO99/54095 * | 10/1999 | (JP) . |

OTHER PUBLICATIONS

Hirose et al., Design of Prismatic Quadruped Walking Vehicle Titan VI, IEEE., pp. 723–728, 1991.*

Young et al, Biped Locomotion by Reduced Ankle Power, IEEE., pp. 584–589, 1996.*jf124c Randall, et al., Stable On–line Neural Control of Hexapod Joint Trajectories, IEEE., pp. 436–440, 1998.*

Zhang et al., A New Method of Desired Gait Synthesis in Biped Robot, IEEE., pp, 1300–1304, 2000.*

* cited by examiner

DESIRED TOTAL FLOOR REACTION FORCE CENTRAL POINT TRAJECTORY (DESIRED ZMP TRAJECTORY) VIEWED FROM TOP

TIME CHART SHOWING DESIRED TOTAL FLOOR REACTION FORCE CENTRAL POINT (DESIRED ZMP)

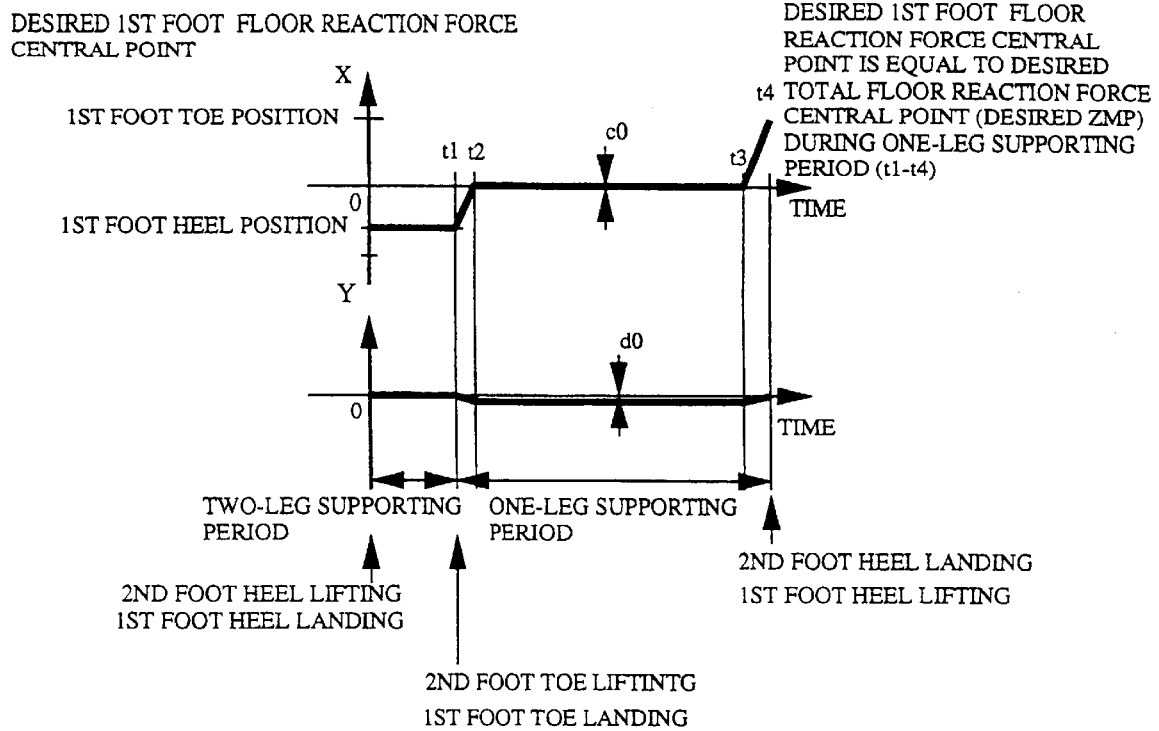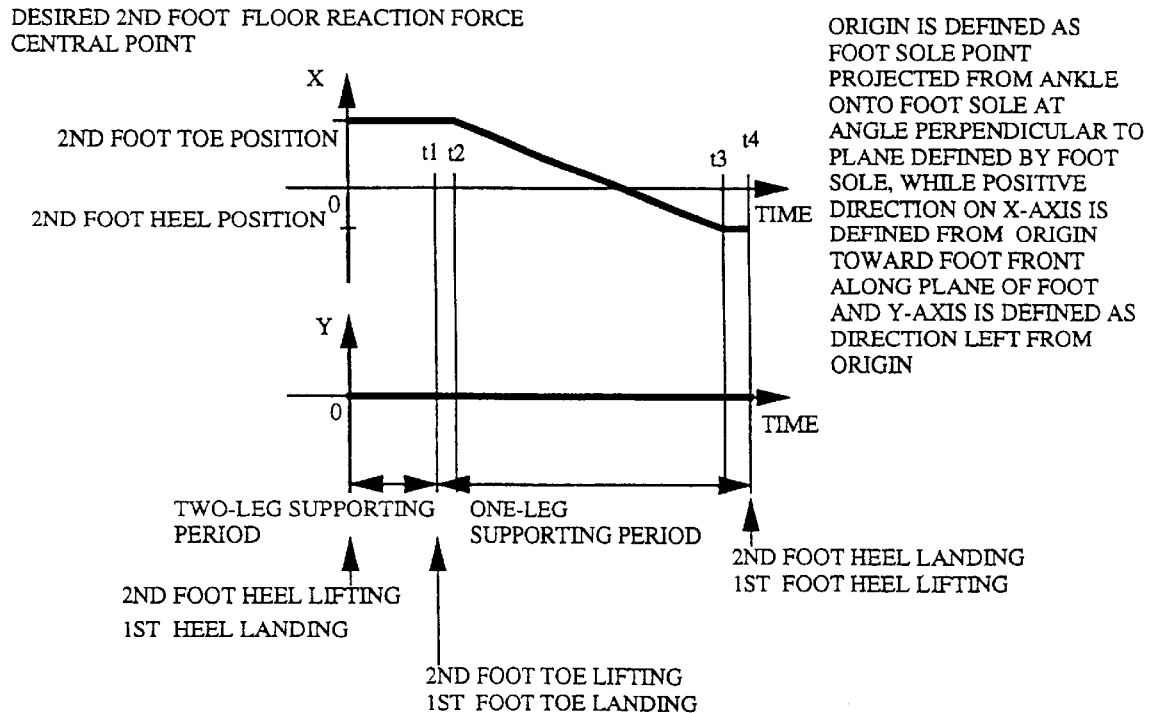

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

2ND FOOT   1ST FOOT

2ND FOOT   1ST FOOT

FIG. 33

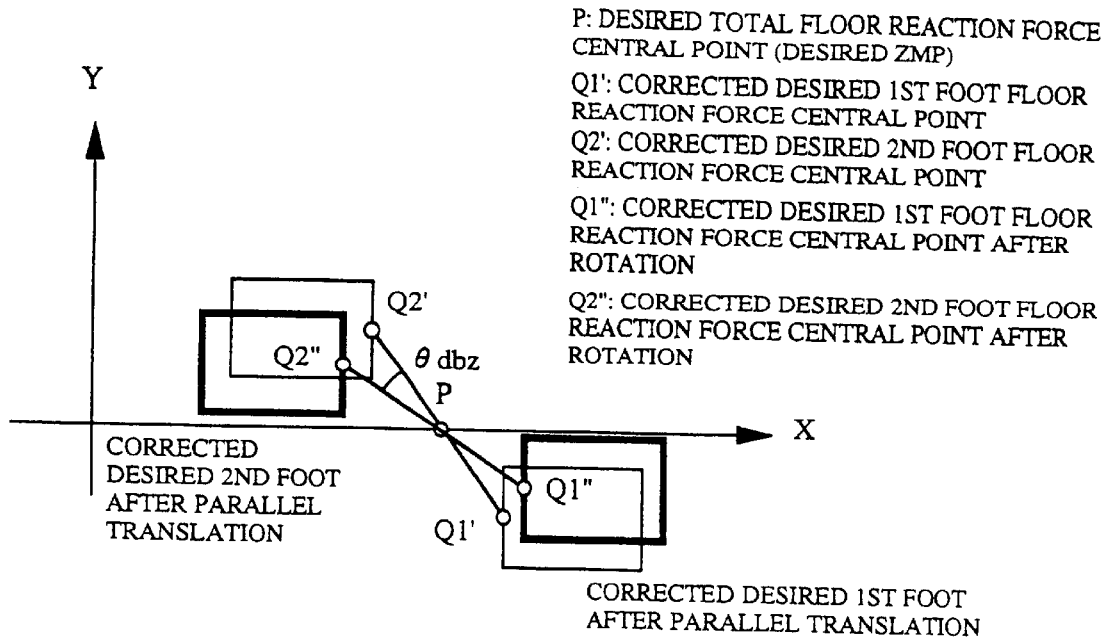

P: DESIRED TOTAL FLOOR REACTION FORCE CENTRAL POINT (DESIRED ZMP)

Q1': CORRECTED DESIRED 1ST FOOT FLOOR REACTION FORCE CENTRAL POINT

Q2': CORRECTED DESIRED 2ND FOOT FLOOR REACTION FORCE CENTRAL POINT

Q1": CORRECTED DESIRED 1ST FOOT FLOOR REACTION FORCE CENTRAL POINT AFTER ROTATION

Q2": CORRECTED DESIRED 2ND FOOT FLOOR REACTION FORCE CENTRAL POINT AFTER ROTATION

FIG. 34

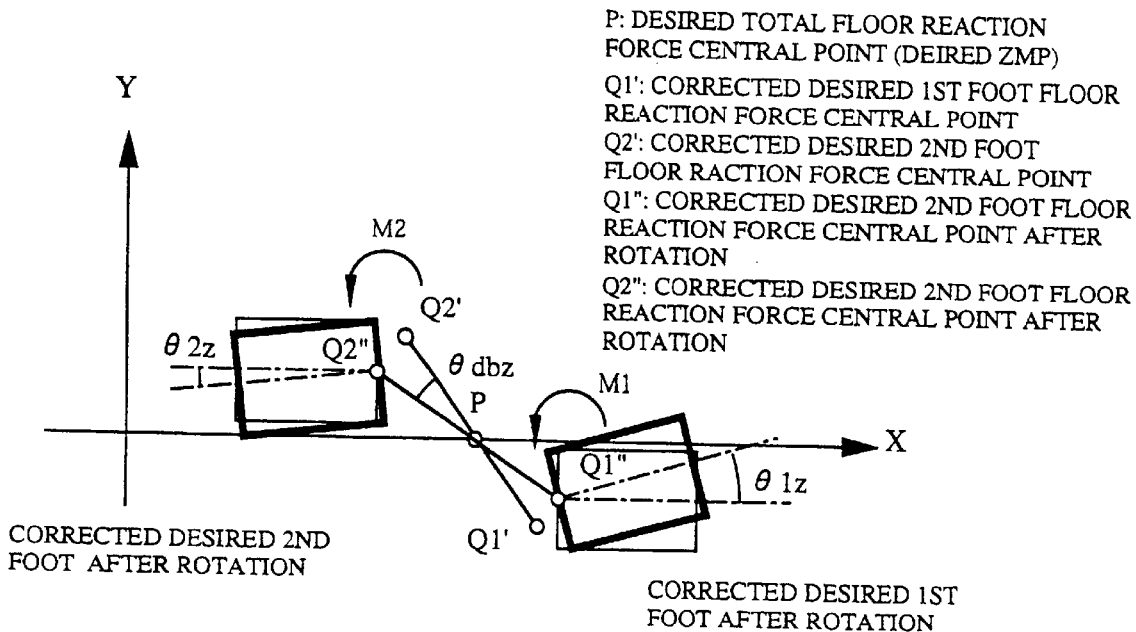

P: DESIRED TOTAL FLOOR REACTION FORCE CENTRAL POINT (DEIRED ZMP)

Q1': CORRECTED DESIRED 1ST FOOT FLOOR REACTION FORCE CENTRAL POINT

Q2': CORRECTED DESIRED 2ND FOOT FLOOR RACTION FORCE CENTRAL POINT

Q1": CORRECTED DESIRED 2ND FOOT FLOOR REACTION FORCE CENTRAL POINT AFTER ROTATION

Q2": CORRECTED DESIRED 2ND FOOT FLOOR REACTION FORCE CENTRAL POINT AFTER ROTATION

DESIRED TOTAL FLOOR REACTION FORCE
CENTRAL POINT (DESIRED ZMP)

DESIRED TOTAL FLOOR REACTION FORCE
CENTRAL POINT (DESIRED ZMP)

DESIRED TOTAL FLOOR REACTION FORCE
CENTRAL POINT (DESIRED ZMP)

DESIRED TOTAL FLOOR REACTION FORCE
CENTRAL POINT (DESIRED ZMP)

LEG TYPE MOBILE ROBOT CONTROL APPARATUS

TECHNICAL FIELD TO WHICH THE INVENTION RELATES

The present invention relates to a control system of a legged mobile robot, specifically to a posture control system of a legged mobile robot, and more specifically a system for conducting a compliance control on the motion of the legs of a legged mobile robot, in particular a biped walking robot, and controls the floor reaction force acting on the robot properly.

BACKGROUND ART OF THE INVENTION

A simplest control system of a legged mobile robot, in particular a biped walking robot comprises a desired motion pattern generator and a joint drive controller. The desired motion pattern generator generates at least a desired motion pattern. Normally, the desired motion pattern is generated in such a manner that a ZMP trajectory, obtained therefrom by conducting a dynamics calculation thereon, i.e., by solving the Euler-Newton equation, tracks a predetermined desired trajectory. The joint drive controller controls to drive the robot joints such that the joint displacement tracks the joint displacement command of the respective joints generated by the generator.

Here, the ZMP (Zero Moment Point) is used in this specification to indicate a floor point at which the moment components, except for the vertical component, of the resultant force (of the inertial force, the gravity generated by the robot motion) are both zero.

In such a control system, if the generator anticipates the floor flat and generates a gait suitable therefor, but the floor has, in fact, a slant as illustrated in FIG. 40. If the robot foreleg foot lands on the unexpected slant at the beginning of the two-leg supporting period, the foot generates an excessive floor reaction force greater than that anticipated, causing the robot to tilt. In order to solve this problem, the applicant proposed, in Japanese Laid-Open Patent Application Hei 5 (1993)—305,586, a control system for a biped walking robot of this kind.

In the proposed system, the robot body inclination is detected to determine a moment-restoring-demand value, while the moment component of the actual total floor reaction force about a desired total floor reaction force central point (the central point of the total floor reaction force; a desired ZMP) is detected, and the robot feet are controlled to move up and down such that the detected moment component of the actual total floor reaction force becomes equal to the moment-restoring-demand value. The moment component of the actual total floor reaction force is a moment which the resultant force of all of the foot floor reaction forces generates about the desired total floor reaction force central point (i.e., the desired ZMP).

Taking as an example the case illustrated in FIG. 40 in which the floor has the unexpected slant, the control system proposed earlier by the applicant will be explained. (The control of the system will be hereinafter referred to as "two-leg-compliance control".) For ease of understanding, each foot is assigned with a reference numeral, as illustrated in the figure. It is assumed here that, although the gait generator anticipates the floor flat and generates a gait suitable therefor, but the floor has, in fact, the slant as illustrated in FIG. 40, and hence, since the robot foreleg foot lands on the unexpected slant at the beginning of the two-leg supporting period, the foot generates an excessive floor reaction force greater than that anticipated. It is also assumed that the robot still keeps, at that instant, a desirable posture (i.e., the body inclination zero).

In the proposed control system, the actual moment of total floor reaction force about the desired total floor reaction force central point (i.e., the desired ZMP) is detected. At that situation, since the vertical component of the floor reaction force of the 1st foot is excessive, the actual moment of total floor reaction force acts in the direction to tilt the robot backward.

In the proposed control system, in order to decrease the moment to zero, a virtual floor A–A' is supposed, as illustrated in FIG. 41, and the virtual plane is supposed to be rotated by an angle $\Delta\theta$ about the desired total floor reaction force central point (desired ZMP) and each foot is supposed to be on the virtual plain such that the feet are moved to the positions on the virtual floor.

With this, the vertical component of the 1st foot floor reaction force decreases, while the vertical component of the 2nd foot floor reaction force increases. As a result, the actual moment of total floor reaction force about the desired total floor reaction force central point (desired ZMP) becomes almost zero. Thus, even if the floor has an unexpected slant, this two-leg-compliance control can ensure that the robot continues walking without tipping over.

However, the proposed technique can not control the actual floor reaction force acting on each foot during the two-leg supporting period, if the floor has an unexpected local slant or bump, the robot is likely to spin or may tip over due to drastic posture change.

To be more specific, as illustrated in FIG. 42, if there exists an unexpected protrusion or step (level difference) on the floor at a position at which the robot 1st foot toe is scheduled to land in the two-leg supporting period, since the 1st foot toe is controlled to be driven downward in the two-leg supporting period, the 1st foot toe will stomp the projection, causing the vertical component of the 1st foot floor reaction force to grow drastically. As a result, this suddenly generates the actual moment of total floor reaction force about the desired total floor reaction force central point (desired ZMP). The two-leg-compliance control would sometimes be late in restoring the posture and at worst, the robot turns over.

Even if the robot did not turn over during the two-leg supporting period, when the second foot is lifted, although the desired total floor reaction force central point (desired ZMP) is set at the heel of the 1st foot, since the 1st foot heel is not on the floor, the actual total floor reaction force central point shifts to its toe. The generated actual moment of total floor reaction force about the desired total floor reaction force central point (desired ZMP) will tilt the robot backward and cause the robot to turn over.

It could be stated from the above that the two-leg-compliance control can effectively cope with an unexpected slant or undulation extending over a relatively long distance, but can not cope with an unexpected local slant or level difference existing at a position at which the robot foot will land.

Aside from the aforesaid two-leg-compliance control system, the applicant proposed, in Japanese Laid-Open Patent Application No. Hei 5 (1993)—305,584, etc., another control system which has a foot-landing-impact-absorber made of a material such as rubber with a springy property. In this control system, actual moment of foot floor reaction force acting about the ankle of each robot foot is detected and an ankle compliance control to rotate the foot ankle such that the detected moment becomes zero, is effected.

In order to solve the problem mentioned above, it is therefore possible to combine this control disclosed in Japanese Laid-Open Patent Application No. Hei 5 (1993)— 305,584 (hereinafter referred to as "ankle-compliance control") to the two-leg-compliance control.

If the two kinds of control are used, it will be possible to rotate the 1st ankle in the direction in which the unexpected moment of the 1st foot floor reaction force is canceled, as illustrated in FIG. 43, such that the 1st foot heel lands on the floor. Accordingly, the robot will not turn over when the phase shifts to the succeeding one-leg supporting period.

However, if the two-leg-compliance control and the ankle-compliance control are simply combined to be used, the two kinds of control interferes with each other and causes either or both of the total floor reaction force and the foot floor reaction force to deviate from desired values or control oscillates.

An object of the present invention is to solve the drawbacks and to provide a control system for a legged mobile robot which can ensure to control the actual floor reaction force acting on the robot easily and properly, while preventing the problem of interference from occurring.

A second object of the present invention is to provide a control system for a legged mobile robot which can ensure to control the floor reaction force acting on the robot properly, even when walking on the floor having not only a slant or undulation extending over a relatively long distance, but also an unexpected local slant or level difference, without being affected thereby.

A third object of the present invention is to provide a control system for a legged mobile robot which can ensure to control the floor reaction force acting on the robot properly such that a posture stabilization control of a legged mobile robot is facilitated.

A fourth object of the present invention is to provide a control system for a legged mobile robot which can ensure to control the floor reaction force acting on the robot properly such that the foot-landing impact is decreased.

Moreover, the biped walking robot walks with its free leg swinging forward. This yields the moment of inertia force about the vertical axis of the robot, which causes the robot body to rotatively-vibrate about that axis. With this, the vertical component of the actual moment of floor reaction force acting on each foot oscillates. If the magnitude of oscillation becomes excessive, the actual moment of foot floor reaction force peaks beyond the friction limit, causing the robot foot to slip and the robot to spin. If the robots spins greatly, it may sometimes lose posture stability and turn over. Accordingly, it is desirable to conduct, in addition to the aforesaid control, a control to decrease such an oscillation.

A fifth object of the present invention is to provide a control system for a legged mobile robot which can ensure to control the floor reaction force acting on the robot properly such that the oscillation of the vertical component of the moment of floor reaction force is decreased.

A sixth object of the present invention is to provide a control system for a legged mobile robot which can ensure to control the floor reaction force acting on the robot properly such that the contactability of robot foot with the floor is enhanced so as to prevent the aforesaid slippage or spinning that can occur during walking from happening.

A seventh object of the present invention is to provide a control system for a legged mobile robot which can ensure to control the floor reaction force acting on the robot properly such that the load to be exerted on actuators of the robot is decreased.

DISCLOSURE OF THE INVENTION

In order to achieve the above-mentioned objects, the present invention is configured to have a system for controlling a legged mobile robot having at least a body and a plurality of legs each connected to the body through a first joint and having a foot connected to its distal end through a second joint, comprising gait generating means for generating a gait of the robot including at least a motion pattern including at least a desired position and a posture of the foot, and a desired pattern of a total floor reaction force acting on the robot; desired foot floor reaction force central point determining means for determining a desired foot floor reaction force central point indicative of a point of action on the foot when the total floor reaction force in the generated gait is distributed to each of the feet; actual floor reaction force detecting means for detecting an actual floor reaction force acting on the foot; foot rotating amount determining means for calculating a moment of the detected actual floor reaction force about the desired foot floor reaction force central point, and for determining a foot rotating amount for rotating the foot based on the calculated moment; foot position/posture correcting means for correcting the desired position and/or the posture of the foot such that the position and/or the posture of the foot rotates based on the determined foot rotating amount; and joint displacement means for displacing the first joint and the second joint of the robot based on at least the corrected position and/or posture of the foot.

In this description corresponding to claims, the term "a desired pattern of a total floor reaction force" indicates a desired pattern relating to the total floor reaction force which includes at least a total floor reaction force central point trajectory. The term "total floor reaction force" indicates, more specifically, the resultant force of all of the foot floor reaction forces acting on each distal end of the leg. The term "foot" indicates, more specifically, a foot of a biped walking robot like that of the human being, but includes all distal end portions of a robot having two or more legs and other potions such as a hoof, talon, etc., which are different from a human being's foot.

Moreover, the present invention is configured to have a system for controlling a legged mobile robot having at least a body and a plurality of legs each connected to the body through a first joint and having a foot connected to its distal end through a second joint, comprising: gait generating means for generating a gait of the robot including at least a motion pattern including at least a desired position and a posture of the foot, and a desired pattern of a total floor reaction force acting on the robot; desired foot floor reaction force central point determining means for determining a desired foot floor reaction force central point indicative of a point of action on the foot when the total floor reaction force in the generated gait is distributed to each of the feet; actual floor reaction force detecting means for detecting an actual floor reaction force acting on the foot; foot rotating amount determining means for determining a foot rotating amount for rotating the foot based on the detected actual floor reaction force; foot position/posture correcting means for correcting the desired position and/or the posture of the foot such that the position and/or the posture of the foot rotates about the desired foot floor reaction force central point or thereabout based on the determined foot rotating amount; and joint displacement means for displacing the first joint and the second joint of the robot based on at least the corrected position and/or posture of the foot.

In the system, the foot position/posture correcting means corrects the desired position and/or the posture of the foot based on the determined foot rotating amount such that the position and/or the posture of the foot rotates about the desired foot floor reaction force central point or thereabout.

The system further includes: foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment; and wherein the foot position/posture correcting means corrects the desired position and/or the posture of the foot based on the determined foot rotating amount and the determined foot moving amount.

In the system, a compensating moment of total floor reaction force for posture stabilization is determined, and wherein the foot rotating amount determining means and/or the foot moving amount determining means determines the foot rotating amount and/or the foot moving amount based on at least the detected actual floor reaction force and the determined compensating moment of total floor reaction force for posture stabilization.

In the system, the compensating moment of total floor reaction force for posture stabilization is determined based on at least an inclination error of the robot.

In the system, the compensating moment of total floor reaction force for posture stabilization is determined based on at least a yaw-rate of the robot.

In the system, the compensating moment of total floor reaction force for posture stabilization is determined based on at least an error from a desired path of the robot.

In the system, a component of the compensating moment of total floor reaction for posture stabilization is set to zero or thereabout.

In the system, the foot position/posture correcting means further corrects the desired position and/or the posture of the foot based on a posture error of the robot.

In the system, the foot rotating amount determining means and/or the foot moving amount determining means determines the foot rotating amount and/or the foot moving amount such that the compensating moment of total floor reaction force for posture stabilization is distributed to each of the legs.

Furthermore, the present invention is configured to have a system for controlling a legged mobile robot having at least a body and a plurality of legs each connected to the body through a first joint and having a foot connected to its distal end through a second joint, comprising: gait generating means for generating a gait of the robot including at least a motion pattern including at least a desired position and a posture of the foot, and a desired trajectory pattern of a total floor reaction force acting on the robot; posture stabilization compensating total floor reaction force calculating means for calculating a compensating total floor reaction force for stabilizing a posture of the robot; actual floor reaction force detecting means for detecting an actual floor reaction force acting on the foot; floor reaction force distributing means for distributing the total floor reaction force in the desired gait and the compensating total floor reaction force; correcting means for correcting the desired position and/or the posture of the foot in the desired gait based on the distributed floor reaction force in the desired gait and the compensating floor reaction force and the detected floor reaction force acting on the foot; and joint displacement means for displacing the first joint and the second joint of the robot based on at least the corrected position and/or posture of the foot.

In the system, the correcting means further corrects the desired position and/or the posture of the foot based on a posture error of the robot.

BRIEF DESCRIPTION OF THE DRAWINGS

FIG. 8 is a time chart showing the trajectory of the desired 1st foot floor reaction force central point corresponding to the motion pattern illustrated in FIG. 5, which is set to satisfy predetermined conditions;

FIG. 9 is a time chart showing the trajectory of the desired 2nd foot floor reaction force central point corresponding to the motion pattern illustrated in FIG. 5, which is set to satisfy the predetermined conditions;

FIG. 33 is an explanatory view, similar to FIG. 16, but showing the operation of the system according to the third embodiment;

FIG. 34 is an explanatory view, similar to FIG. 17, but showing the operation of the system according to the third embodiment;

DETAILED DESCRIPTION OF THE PREFERRED EMBODIMENTS

The control system of a legged mobile robot according to the present invention will be explained with reference to the accompanied drawings. A biped robot is taken as an example of the legged mobile robot.

Figure 1:
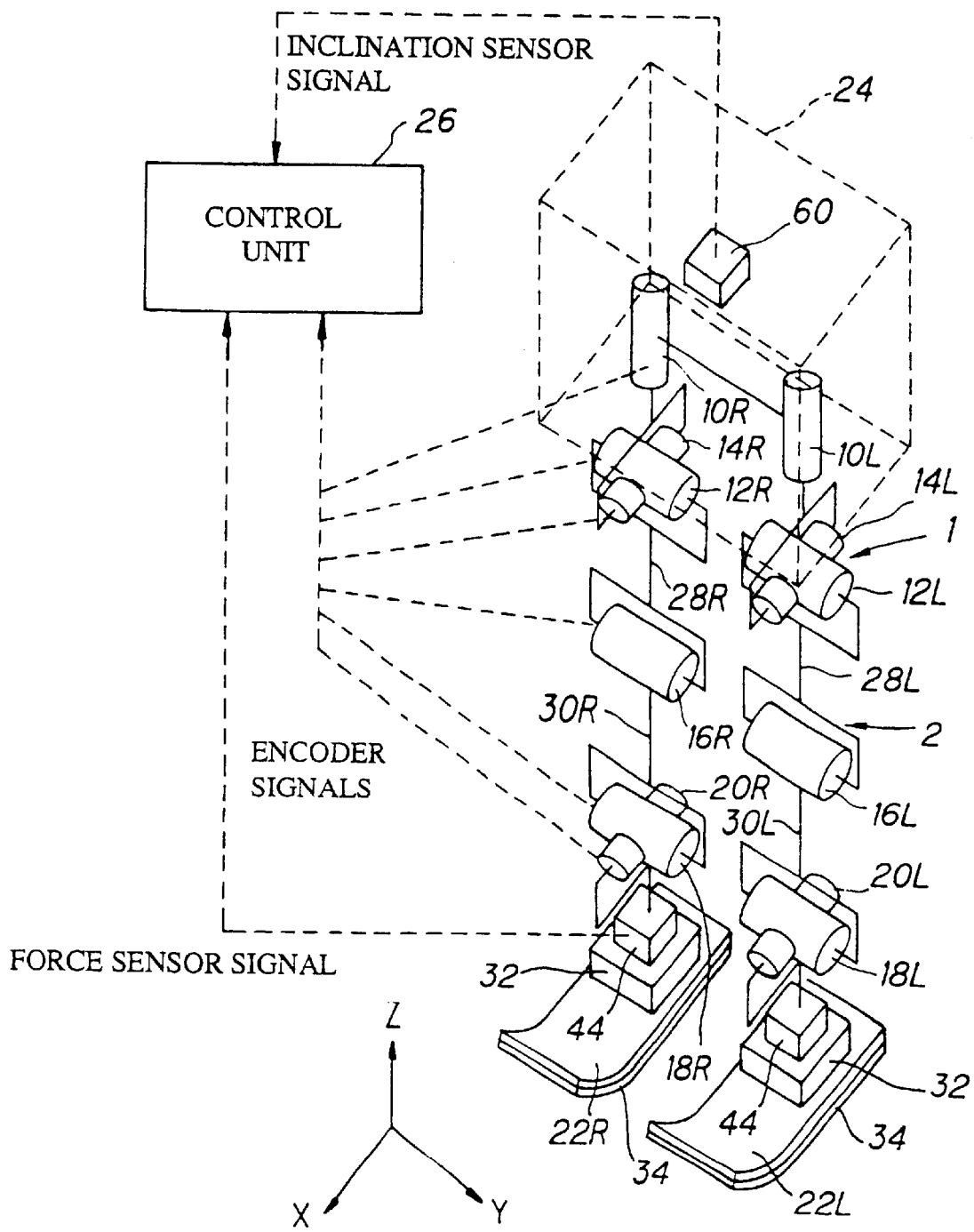
FIG. 1 is a schematic view showing an overall configuration of a control system of a legged mobile robot according to the present invention.

FIG. 1 is a schematic view showing an overall configuration of the system according to the present invention.

As illustrated in the figure, a biped walking robot 1 has a pair of right and left leg links 2 each composed of six joints. (In a simple representation, each of the joints is represented by an electric motor which actuates the joint.) The six joints include, arranged successively downward, a pair of hip joints 10R, 10L (the right-hand joint is indicated by R and the left-hand joint by L) for rotating legs with respect to hips, a pair of hip joints 14R, 14L in the rolling axis (about an X-axis), a pair of hip joints 12R, 12L in the pitching axis (about a Y-axis), a pair of knee joints 16R, 16L in the pitching axis, a pair of ankle joints 18R, 18L in the pitching axis, and a pair of joints 20R 20L in the rolling axis.

The robot is provided with feet 22R, 22L underneath of the joints 18R(L) and 20R(L), and a body (trunk) 24 at its top which houses a control unit 26 comprising microcomputers (explained later). In the above, the joints 10R(L), 12R(L), 14R(L) make up the hip joints, and the joints 18R(L), 20R(L) make up the ankle joints. The hip joints and knee joints are connected to each other by thigh links 28R, 28L, and the knee joints and ankle joints are connected to each other by crus or shank links 30R, 30L.

With the above structure, each of the leg links 2 is given six degrees of freedom. When the 6*2=12 joints are driven to suitable angles during walking, a desired motion is imparted to the entire leg structure to cause the robot to walk arbitrarily in a three-dimensional (absolute) environment. (In the specification, "*" represents multiplication in scalar calculation and outer product in vector calculation.).

It should be noted that the body position and velocity thereof indicate the position and its displacement velocity of a predetermined position of the body 24, specifically a representative position such as the position of the center of gravity of the body 24.

As shown in FIG. 1, a known force sensor (more precisely, known as the six-axis force and torque sensor) 44 is disposed at a position below each ankle joint for measuring three directional components Fx, Fy, Fz of force and three directional components Mx, My, Mz of torque or moment thereby of the force and outputs a signal indicative of foot landing and the floor reaction force (the load acting from the floor). Moreover, the body 24 has an inclination sensor 60 for detecting tipping or inclination in the frontal plane with respect to a Z-axis (the vertical direction (the direction of gravity)) and its angular velocity (yaw-rate), and also a tilt in the sagittal plane with respect to the Z-axis and its angular velocity. The electric motors of the respective joints are coupled with respective rotary encoders for detecting angular displacements of the electric motors.

Figure 2:
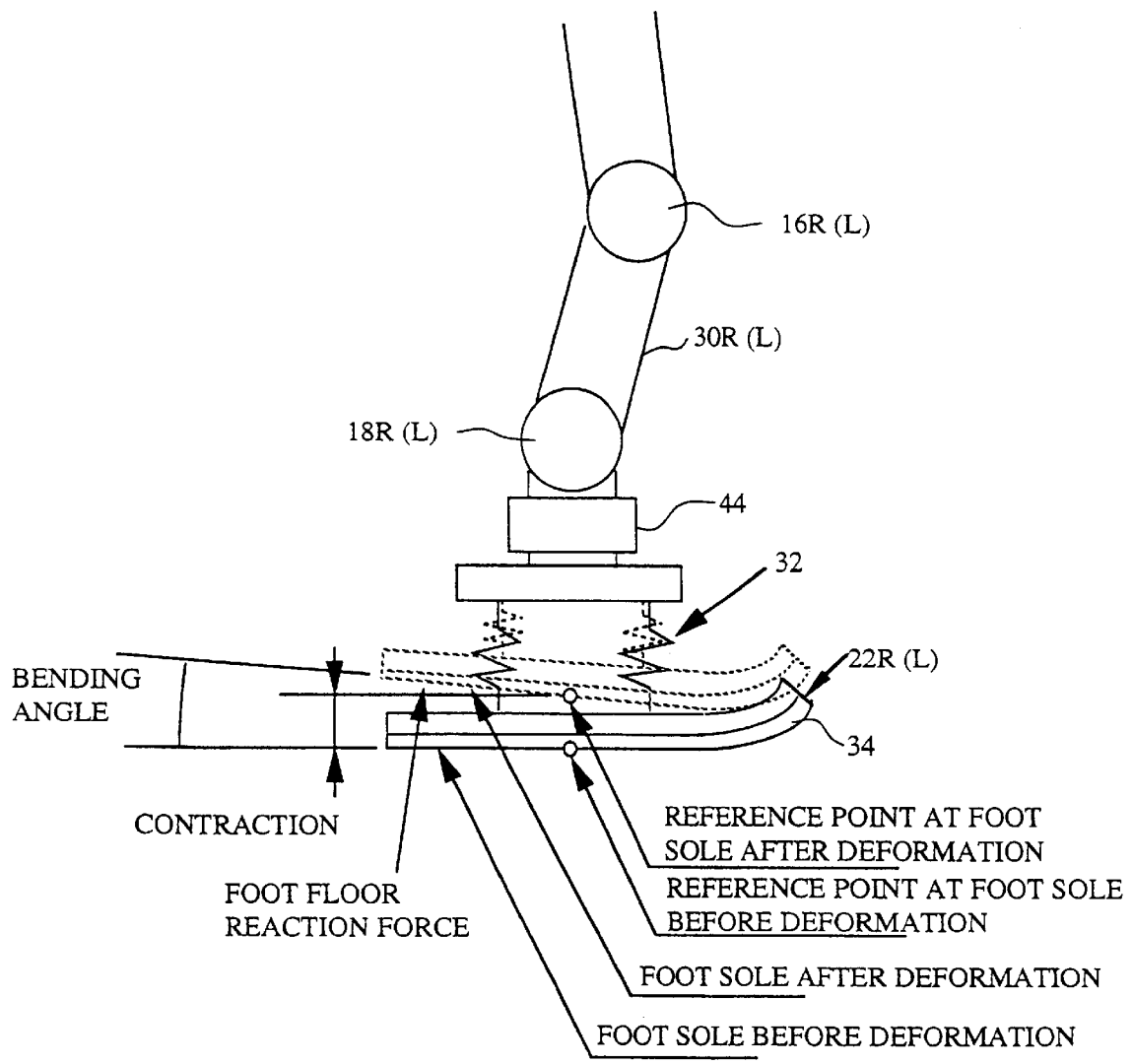
FIG. 2 is an explanatory side view showing the structure of the foot of a biped walking robot illustrated in FIG. 1.

As illustrated in FIG. 2, a spring mechanism 32 is installed at a position upward from the foot 22R(L). A sole elastic member 34 is attached to the sole of the foot 22R(L). The spring mechanism 32 has a box-like guide member connected to the foot 22R(L), and a piston member connected to the side of the ankle joint 18R(L), 20R(L) and the force sensor 44 and inserted in the guide member with an elastic member such that it moves in the guide member to a slight extent.

In the figure, the foot 22R(L) illustrated in thick lines shows the foot which is not subject to the floor reaction force. When subjected to the floor reaction force, the spring mechanism 32 and the sole elastic member 34 deforms and the foot 22R(L) shifts to the position and/or posture illustrated in dashed lines. This configuration is significant not only for decreasing the foot-landing impact, but also for enhancing the control performance. Since this configuration is disclosed in the aforesaid application (Japanese Laid-Open Patent Application No. Hei 5 (1993)—305, 584), no further explanation will be made.

Although not shown in FIG. 1, a joystick 62 is provided at an appropriate location of the biped walking robot 1, which enables an operator from the outside to input a request concerning the gait, such as switching from moving forward to turning.

Figure 3:
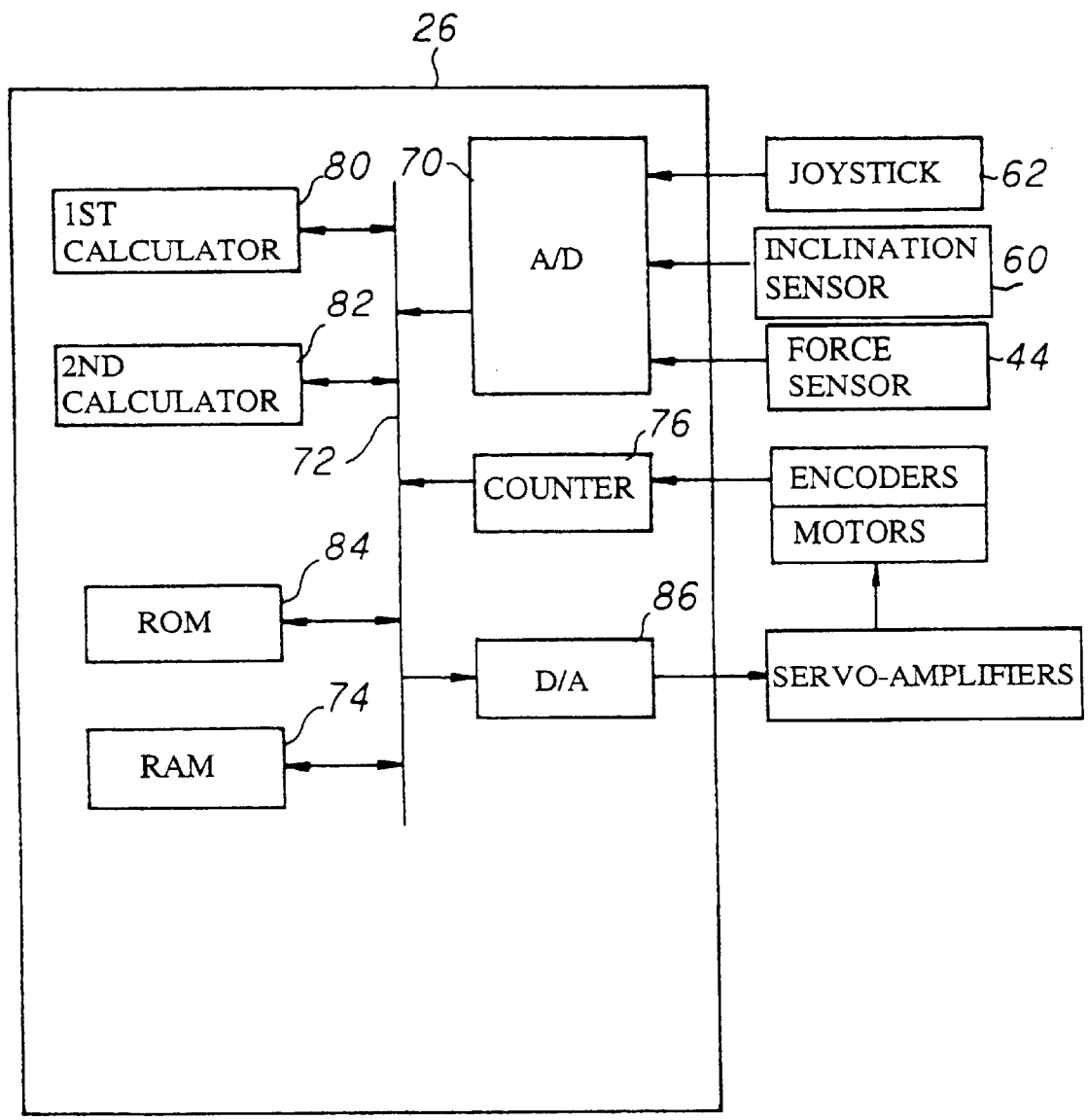
FIG. 3 is a block diagram showing details of a control unit of the robot illustrated in FIG. 1.

FIG. 3 is a block diagram which shows the details of the control unit 26, which is comprised of microcomputers. Outputs from the inclination sensor 60, etc., are converted by an A/D converter 70 into digital signals, which are transmitted through a bus 72 to a RAM 74. Output signals from the rotary encoders that are disposed adjacent to the respective electric motors are transmitted through a counter 76 to the RAM 74.

The control unit 50 includes a first calculator 80 and a second calculator 82 each comprising CPU. The first calculator 80 calculates joint angle displacement commands (displacement command for the actuators), and outputs the same to the RAM 74. The second calculator 82 reads the desired command values and the detected joint angles from the RAM 74, and calculates values (manipulated variables) and outputs the same through a D/A converter 86 and servo-amplifiers to the electric motors which drive the respective joints.

Here, terms used in the specification and figures are defined as follows. (Terms not defined in the following are used in the meaning defined in an application (Japanese Patent Application No. Hei 8 (1996)—214, 261) proposed by the applicant separately of the aforesaid applications.) The term "gait" is used to indicate, different from that usually defined in the field of robotic engineering, what includes the desired motion pattern and the floor reaction force pattern. The floor reaction force may be partial information such as "only the ZMP trajectory". In other words, the term gait generator should not be used in the situation when only the desired motion pattern, and not the information concerning the floor reaction force pattern is outputted.

Each of the feet is assigned with a reference numeral. The floor reaction force acting on n-th leg (n: 1 or 2) is called "n-th foot floor reaction force". The resultant force of all of the foot floor reaction forces acting both legs is called "total floor reaction force". (Although, it is simply called floor reaction force in the field of robotic engineering, it is called "total floor reaction force" here in order to distinguish from the (n-th) foot floor reaction force.)

The foot floor reaction force is described by a point of action and the force and the moment of force acting thereat. A combination of descriptions will accordingly be innumerable for a certain floor reaction force. The innumerable combinations of descriptions will surely include the combination of descriptions indicating that the moment components other than that about the vertical axis are zero and the point of action is on the floor. The point of action in this combination of descriptions is called "foot floor reaction force central point". (This was called "the center of contact-pressure" in Japanese Laid-Open Patent Application Hei 6 (1994)—79,657 proposed by the applicant (referred to later)).

Similarly, the total floor reaction force is described by a point of action and the force and the moment of force acting thereon. A combination of descriptions will accordingly be innumerable for a certain total floor reaction force. The innumerable number of combinations of descriptions will surely include the combination of descriptions indicating that the moment components other than that about the vertical axis are zero and the point of action is on the floor. The point of action in this combination of descriptions is called "total floor reaction force central point".

A desired value of the total floor reaction force is called "desired total floor reaction force". The desired total floor reaction force is the total floor reaction force which normally balances dynamically with the desired motion pattern. Accordingly, the desired total floor reaction force central point is normally equal to the desired ZMP.

As mentioned above, the ZMP (Zero Moment Point) is defined as follows. Namely, obtaining the resultant force of the force of inertia and the gravity generated by the desired motion pattern, if the moment, except for the vertical moment component, of the obtained resultant force about a certain point of action on the floor is zero, this point of action is called "desired ZMP (Zero Moment Point)". The desired ZMP can solely be determined unless the vertical force component of the resultant force is zero. The phrase "desired ZMP" is often used in this specification for ease of understanding. However, strictly speaking, the term "desired floor reaction force central point" should instead be used.

A desired value of the foot floor reaction force is called "desired foot floor reaction force". Different from the desired total floor reaction force, the desired foot floor reaction force can not be determined solely even when the desired motion pattern has been determined. Total floor reaction force actually acting on the robot is called "actual floor reaction force". Floor reaction force actually acting on each foot of the robot is called "actual foot floor reaction force".

Again referring to the problems of the present invention, the two-leg-compliance control can not cope with an unexpected local slant or level difference existing at a position at which the robot foot will land, but this problem can be solved if the ankle-compliance control is used. However, if the two-leg-compliance control and the ankle-compliance control are simply combined together to be used, the two kinds of control interfere with each other and this causes either one or both of the total floor reaction force and the foot floor reaction force to deviate from desired values or causes control to oscillate.

Figure 40:
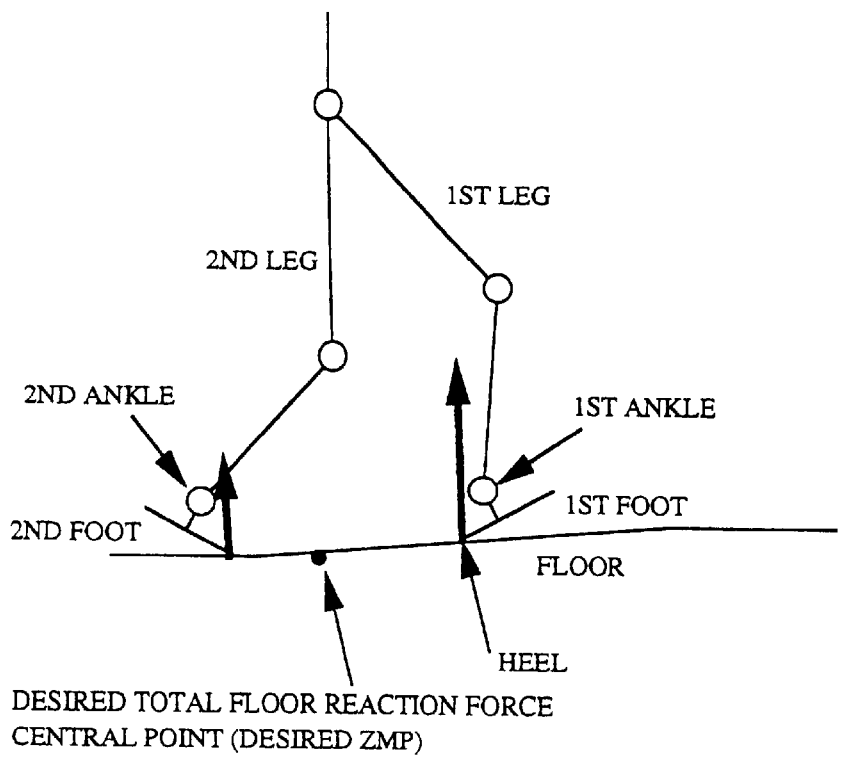
FIG. 40 is an explanatory view showing a biped walking robot whose foot lands on an unexpected slant on a floor.
Figure 41:
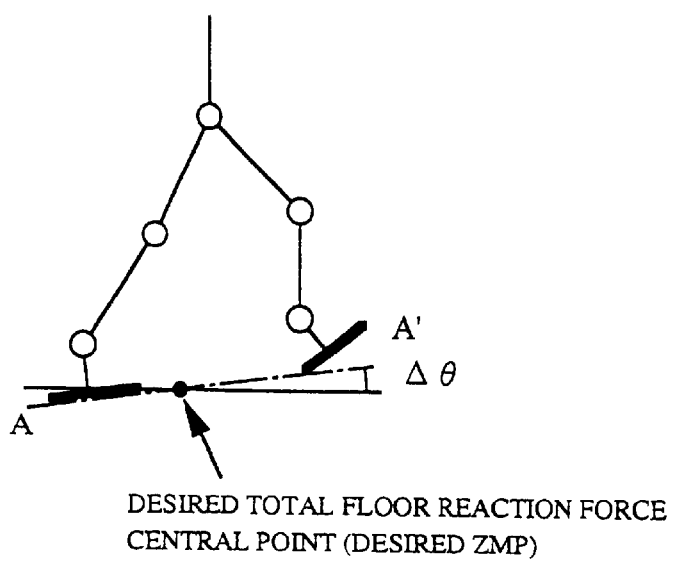
FIG. 41 is an explanatory view showing the two-leg-compliance control, proposed by the applicant, applied to the robot in the situation illustrated in FIG. 40.
Figure 42:
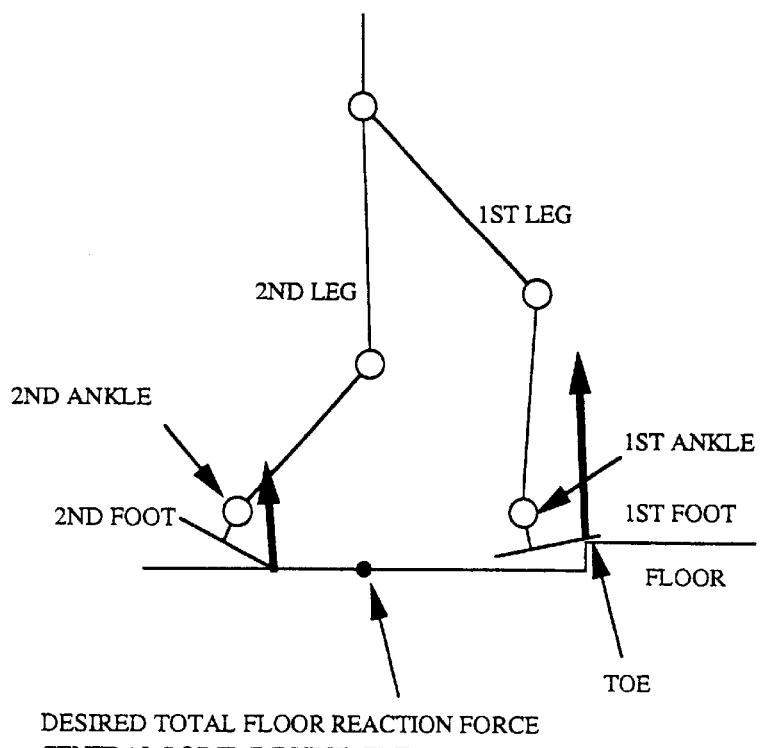
FIG. 42 is an explanatory view, similar to FIG. 40, also showing a biped walking robot whose foot lands on an unexpected projection on a floor.
Figure 43:
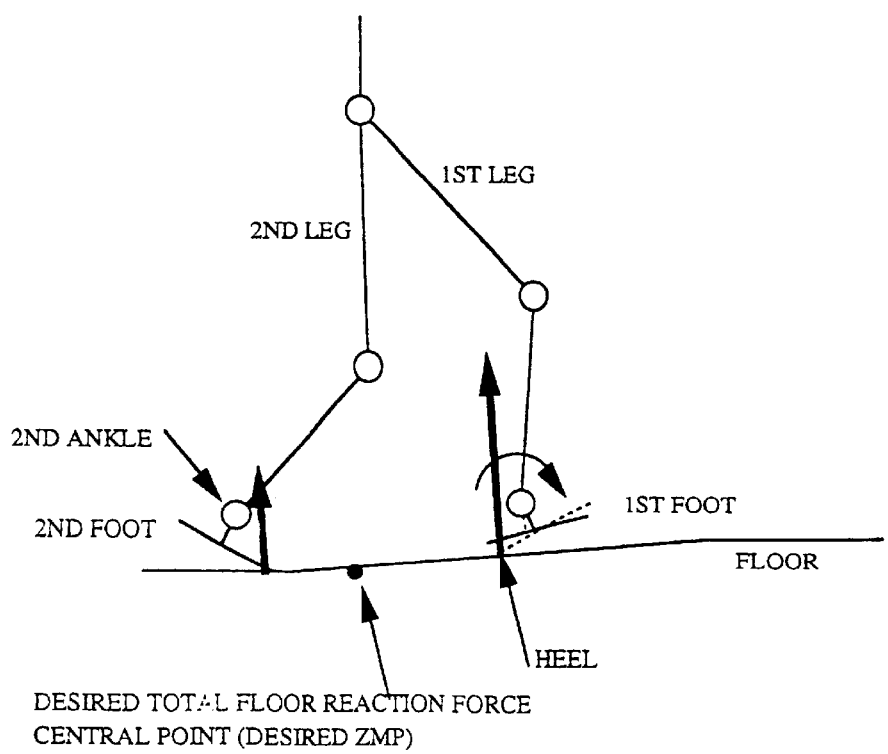
FIG. 43 is an explanatory view showing the ankle-compliance control, proposed by the applicant, applied to the robot in the situation illustrated in FIG. 42.

Again explaining this problem with reference to FIG. 40, the 1st foot heel is subject to an unexpected excessive floor reaction force, which generates the actual excessive moment of foot floor reaction force about the 1st ankle. The ankle-compliance control acts to rotate the 1st ankle so as to decrease this moment to zero, as shown in FIG. 43.

However, since the 1st foot heel position becomes high due to the ankle rotation, the vertical component of the 1st foot floor reaction force decreases. As a result, the actual moment of total floor reaction force about the desired total floor reaction force central point (desired ZMP) fluctuates. This indicates that actual moment of total floor reaction force (which is the controlled variable in the two-leg-compliance control) is interfered by the ankle-compliance control.

If the two-leg compliance control were immediately conducted, without paying attention to the interference, the actual moment of total floor reaction force about the desired total floor reaction force central point (desired ZMP) would deviate from zero, or oscillation would occur due to the interference.

One solution of this problem will be to determine the amount of interference between the two-leg-compliance control and the ankle-compliance control, and to input a manipulated variable to cancel the amount of interference such that no interference occurs. Since, however, the robot posture changes at every instant and hence, the relationship of interference changes at every instant. It is quite difficult to avoid the interference with this method.

Moreover, since the floor at which the 1st foot lands is at a greater slant than that anticipated in the desired gait in the situation illustrated in FIG. 43, the 1st foot should have been controlled to lift its toe higher than the position anticipated in the desired gait. It could be therefore said that the fact that the toe is driven to a lower position by the ankle-compliance control indicates that the ankle-compliance control does not operate properly.

Thus, the ankle-compliance control is effective for a local slant or level difference existing at a position at which the robot foot will land, but may affect the control on the floor having a slant or undulation extending over a relatively long distance.

In view of this problem, the system in the embodiment is configured such that the floor reaction force acting on the legged mobile robot, more specifically, the actual moment of total floor reaction force about the desired total floor reaction force central point and actual moment of foot floor reaction force about the desired foot floor reaction force central point are controlled easily and properly.

Moreover, the system is configured such that, even if the floor has not only an unexpected slant or undulation extending over a relatively long distance, but also an unexpected local slant or level difference, the robot locomotion can be continued with stable posture, without being affected thereby.

Figure 4:
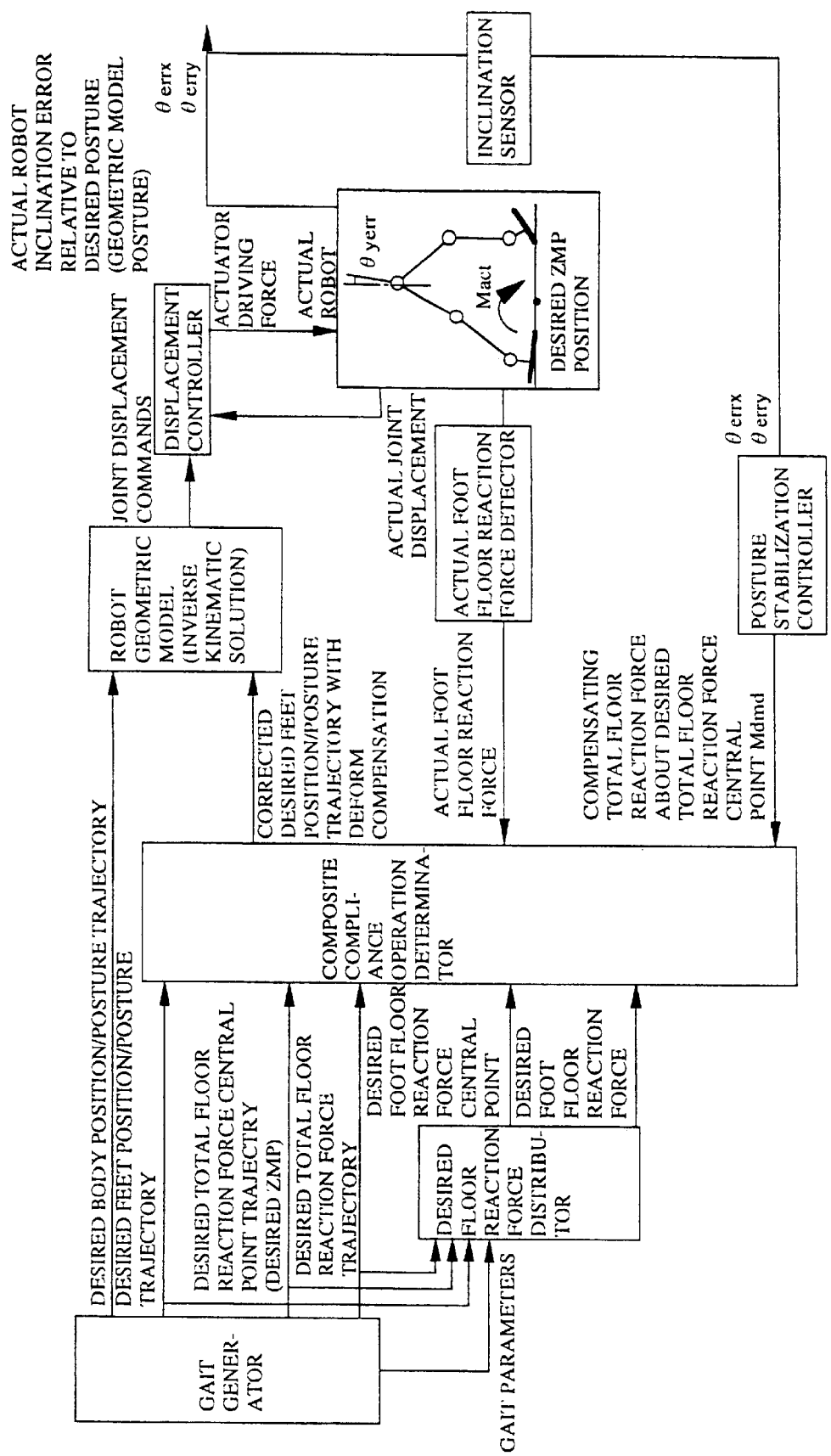
FIG. 4 is a block diagram showing the configuration and operation of the control system of a legged mobile robot according to the present invention in a functional manner.

FIG. 4 is a block diagram showing the configuration and operation of the control system (mainly corresponding to the first calculator 80 in FIG. 3) of a legged mobile robot according to the embodiment in a functional manner. The overall configuration of the system will be explained with reference to FIG. 4.

The system includes a gait generator which generates the desired gait and outputs the same. As will be understood from the definition mentioned above, the desired gait comprises the desired motion pattern and the desired floor reaction force pattern, more specifically, a desired body position and/or posture trajectory, a desired feet position and/or posture trajectory, a desired total floor reaction force central point (desired ZMP) trajectory and a desired total floor reaction force trajectory. Thus, the desired floor reaction force pattern includes the desired total floor reaction force central point trajectory. (It suffices if the desired floor reaction force pattern merely has the desired total floor reaction force central point trajectory, when a deform compensation (mechanism-deform compensation), explained later, is not involved.)

In this embodiment, the desired total floor reaction force outputted by the gait generator is the total floor reaction force which dynamically balances with the desired motion pattern. Accordingly, the desired total floor reaction force central point is equal to the desired ZMP.

Figure 5:
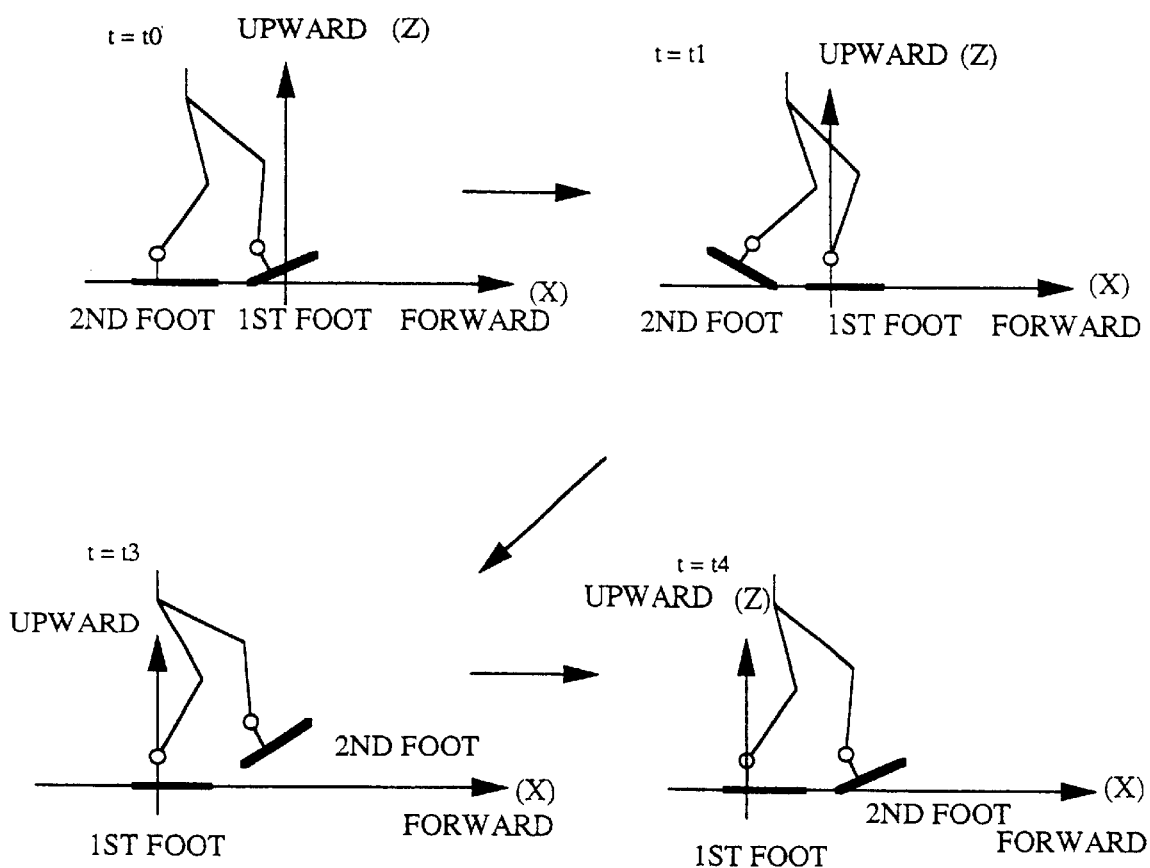
FIG. 5 are explanatory views showing one example of the motion pattern of the robot illustrated in FIG. 1 when it walks on a flat floor.
Figure 6:
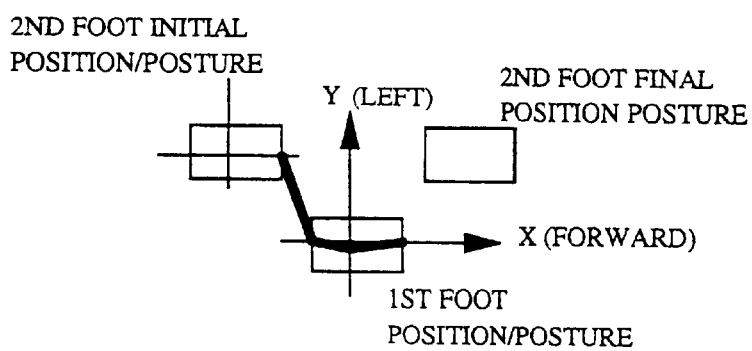
FIG. 6 is an explanatory plan view showing the trajectory of the desired total floor reaction force central point (desired ZMP) on the floor corresponding to the motion pattern illustrated in FIG. 5.
Figure 7:
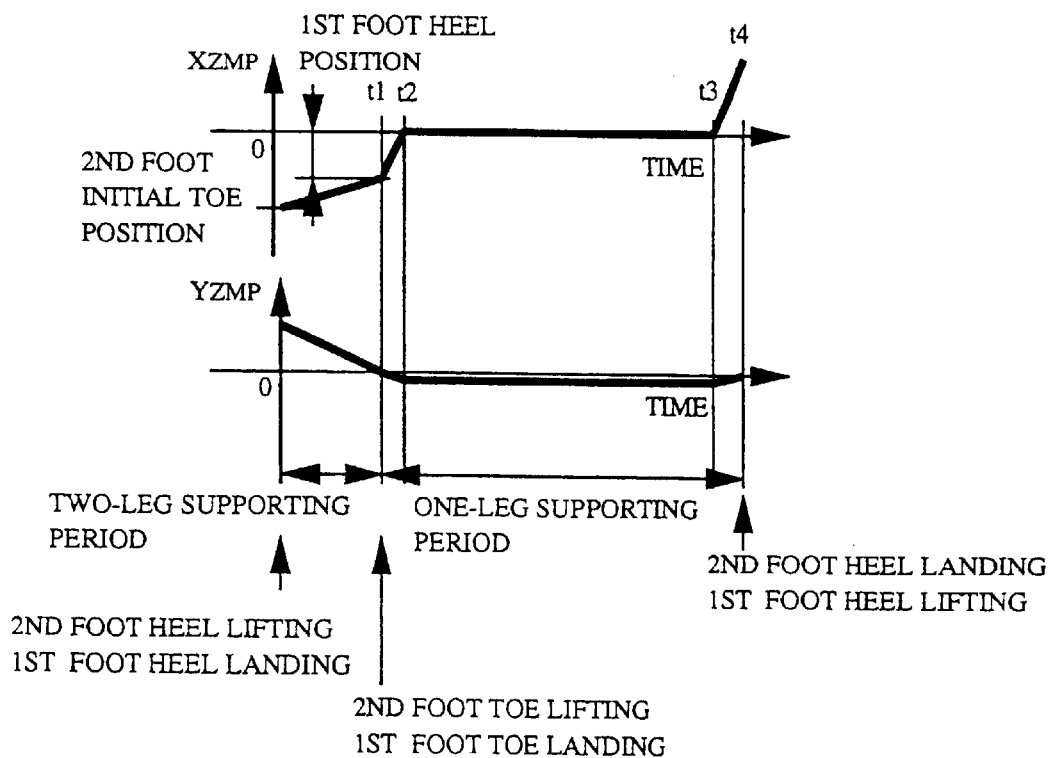
FIG. 7 is a time chart showing the trajectory of the desired total floor reaction force central point (desired ZMP) corresponding to the motion pattern illustrated in FIG. 5.

FIG. 5 shows one example of motion pattern when the robot 1 walks on a flat floor. FIG. 6 shows the trajectory of the desired ZMP on the floor corresponding thereto, and FIG. 7 shows a time chart corresponding thereto. The foot which is kept contact with floor during the illustrated gait period is to be named the 1st foot, while the other is to be named the 2nd foot. Since the gait generator is described in detail in the application (Japanese Patent Application Hei 8 (1996)—214,261), no further explanation will be omitted.

Returning to the explanation of FIG. 4, the system includes a desired floor reaction force distributor which receives the desired total floor reaction force central point (desired ZMP) and the desired feet position and/or posture as main inputs, and determines and outputs the desired foot floor reaction force central point of each foot. Practically, if required, it may also input gait parameters (such as the time of two-leg supporting period and desired landing position of free leg foot) or the period and time of gait (such as the current time is 0.1 sec. after the beginning of the two-leg supporting period) from the gait generator.

As regards the gait such as illustrated in FIG. 5, the desired floor reaction force distributor determines the desired foot floor reaction force central point such that it satisfies the following conditions.

Condition 1) The desired foot floor reaction force central point trajectory is continuous.

Condition 2) During the two-leg supporting period, the desired 1st foot floor reaction force central point exists at its heel, while the desired 2nd foot floor reaction force central point exists at its toe.

Condition 3) The desired total floor reaction force central point exists, at that instant, on the line between the desired 1st foot floor reaction force central point and the desired 2nd foot floor reaction force central point.

Condition 4) During the one-leg supporting period, the desired 1st foot floor reaction force central point is equal to the desired total floor reaction force central point.

Condition 5) During the one-leg supporting period, the desired 2nd foot floor reaction force central point shifts from the toe to the heel.

FIG. 8 shows the time chart of the desired 1st foot floor reaction force central point trajectory satisfying these conditions, while FIG. 9 shows that of the 2nd foot floor reaction force central point trajectory. In the figures, the origin is defined as the point on a sole of foot projected from the ankle (joints 18R(L), 20R(L)) onto the sole of the foot 22R(L) at the angle perpendicular to the plane defined by the sole of foot, while the positive direction on the X-axis is defined as the direction from the origin towards the front of the foot and along the plane defined by the foot, and the positive direction on the Y-axis is defined as the direction to the left of the foot from the origin.

Additionally, the desired floor reaction force distributor determines and outputs the desired foot floor reaction force. The desired foot floor reaction force is necessary for the deform compensation (mechanism-deform compensation) of the spring mechanism 32.

If the desired foot floor reaction force is determined to be corresponding to the desired foot floor reaction force central point, determined in the manner mentioned above, using the following equation, it will satisfy a condition that the resultant force of all of the desired foot floor reaction forces must be equal to the desired total floor reaction force.

Desired 1st foot floor reaction force=Desired total floor reaction force* (Distance between the desired 2nd foot floor reaction force central point and the desired ZMP/(Distance between the desired 1st foot floor reaction force central point and the desired 2nd foot floor reaction force central point)

Desired 2nd foot floor reaction force=Desired total floor reaction force* (Distance between the desired 1st foot floor reaction force central point and the desired ZMP/(Distance between the desired 1st foot floor reaction force central point and the desired 2nd foot floor reaction force central point) Eq. 1

Since the desired foot floor reaction force changes continuously, it is suitable for achieving walking with less impact. The details of the above is described in an application (Japanese Laid-Open Patent Application Hei 6 (1994)—79,657) proposed by the applicant.

Returning to the explanation of FIG. 4, the system includes a posture stabilization controller which estimates the conditions of the robot based on the sensed information of the robot and calculates a compensating total floor reaction force. Explaining this, assuming that robot joint displacement is controlled to track desired joint displacement completely through a displacement controller (explained later) while the robot walks or stands, the robot position and/or posture will not always be a desirable value.

In order to stabilize the robot posture over a long period, it is necessary to determine the force and moment necessary to restore desirable robot position and/or posture, and to additionally generate the determined force and moment at the desired total floor reaction force central point (desired ZMP) as the point of action. The additional force and moment is called "compensating total floor reaction force". The moment component of the compensating total floor reaction force is called "compensating moment of total floor reaction force".

Aside from the above, assuming that the desired gait of the legged mobile robot is subject to a reaction force, other than the floor reaction force, from the environment, naming this reaction force "reaction force from object", for example, the aforesaid definition of the desired ZMP may be extended as follows. That is; obtaining the resultant force of the force of inertia, the gravity and the reaction force from object generated by the desired motion pattern, if the moment, except for the vertical component, of the obtained resultant force about a certain point of action on the floor is zero, the point of action is newly defined as "desired ZMP".

Assuming that the robot 1 is completely rigid and joint displacement can be controlled to track desired joint displacement faithfully, perturbative motion of the position and/or posture of the entire robot due to deformation of the spring mechanism 32 and the sole elastic member 34 of the foot can be decomposed to the following six degrees of freedom.

Mode 1) Rotation about the desired total floor reaction force central point (desired ZMP) around the back-and-forth-axis (i.e., tiling in the-left-and-right direction).

Mode 2) Rotation about the desired total floor reaction force central point (desired ZMP) around the left-and-right-axis (i.e., tiling in the back-and-forth direction).

Mode 3) Vertical rotation about the desired total floor reaction force central point (desired ZMP) (i.e., spinning).

Mode 4) Translational swinging in the back-and-forth direction.

Mode 5) Translational swinging in the left-and-right direction.

Mode 6) Translational swinging in the vertical direction.

Among these modes, the swings of Mode 4 and Mode 5 occur with the deformation of the spring mechanism 32 and the sole elastic member 34 of the foot when they are subject to shearing force in the back-and-forth and left-and-right directions. Since the spring mechanism 32 and the sole elastic member 34 are prefabricated to have high stiffness in the direction of shearing, this kind of swing is small, affecting the walking only slightly.

Among of the rest of 4 degrees of freedom, since the rotation and swings of Mode 3 and Mode 6 have no direct relationship with the present invention, only the control against those of Mode 1 and Mode 2 will be conducted in this embodiment and a second embodiment (explained later). Since, but for the control against the rotations of Mode 1 and Mode 2, the robot is likely to turn over, the significance of the control is quite high. The control against the rotation of Mode 3 will be discussed in a third embodiment of the present invention.

The manipulated variable for controlling the rotation of mode 1 is the moment component about the back-and-forth axis (X-axis) of the compensating total floor reaction force. The manipulated variable for controlling the rotation of mode 2 is the moment component about the left-and-right axis (Y-axis) of the compensating total floor reaction force. Among the moment components of the compensating total floor reaction force, accordingly, it suffices if the moment component about the back-and-forth axis and that about the left-and-right axis are determined. Since the rest of the moment components are not used in this embodiment (and the second embodiment), they may be set to zero.

From now on the following definitions will apply. The moment component of compensating total floor reaction force is called "compensating moment of total floor reaction force Mdmd" (more precisely, compensating moment of total floor reaction force Mdmd about the desired total floor reaction force central point (desired ZMP)). As illustrated in FIG. 5, a coordinate system taking the X-axis in the robot forwarding direction, the Y-axis in the robot left direction and the Z-axis in the vertical direction and having the origin which is set at a point on the floor immediately below the 1st foot ankle, is called "supporting-leg coordinates system." Unless otherwise determined, the position, the force and the moment are expressed in accordance with this coordinate system. The X-component of Mdmd is named Mdmdx, Y-component thereof is named Mdmdy and Z-component thereof is Mdmdz. The X-component of an inclination error θerr of the body 24 (i.e., actual body inclination—desired body inclination) is named θerrx, Y-component thereof is named θerry, and their time differential are named (dθerrx/dt), (dθerry/dt).

Mdmdx and Mdmdy are determined in accordance with, for example, the following control laws.

$$Mdmdx=-Kthx\theta errx-Kwx\,(d\theta errx/dt)$$

$$Mdmdy=-Kthy\theta erry-Kwy\,(d\theta erry/dt) \qquad \text{Eq. 2}$$

In the above, Kthx, Kthy, Kwx and Kwy are control gains for body inclination stabilization.

The composite compliance operation determinator acts such that the actual total floor reaction force becomes equal to the resultant force of the desired total floor reaction force and the compensating total floor reaction force, as will be explained later.

Returning to the explanation of FIG. 4, the system includes an actual foot floor reaction force detector which detects the actual foot floor reaction force through the output of the force sensor 44. (The resultant force of all of the foot floor reaction forces is the actual total floor reaction force.) Moreover, based on the actual joint displacements obtained from the joint encoders (or based on the joint displacement commands), the actual foot floor reaction force detector calculates each foot position and/or posture relative to the coordinate system fixed on the body, then conducts coordinate-transformation of the detected values obtained by the force sensor 44 to calculate the actual foot floor reaction force in the coordinate system fixed on the body, and converts the calculated values into those in the supporting leg coordinate system.

The system includes a robot geometric model (inverse kinematic solution), which, upon receipt of the body position and/or posture and the feet position and/or posture, calculates respective joint displacements satisfying them. Since the degrees of freedom per leg is 6 in the robot 1 in this embodiment, the respective joint displacements are determined solely.

This embodiment is configured such that, equations of the inverse kinematic solution are directly prepared beforehand in such a manner that the respective joint displacements are obtained if the body position and/or posture and the foot position and/or posture are put in the equations. More specifically, the robot geometric model inputs the desired body position and/or posture and a corrected desired foot position and/or posture trajectory (a corrected desired foot position/posture with deform compensation) corrected by the composite compliance operation determinator, and calculates joint displacement commands for the 12 joints (including 10R(L), etc.).

The system includes a displacement controller (corresponding to the aforesaid 2nd calculator 82), which controls displacements of the 12 joints of the robot 1 to track the joint displacement commands calculated by the robot geometric model (inverse kinematic solution).

The system includes the composite compliance operation determinator which corrects the desired foot position and/or posture trajectory to satisfy the following two demands.

Demand 1) For the control of robot position and/or posture, the actual total floor reaction force should be controlled to track the resultant force of the compensating total floor reaction force (moment Mdmd) outputted by the posture stabilization controller and the desired total floor reaction force. If only the robot posture inclination should be controlled, only the horizontal direction moment component of the actual total floor reaction force about the desired total floor reaction force central point should be controlled to track the compensating moment of total floor reaction force Mdmd.

Demand 2) In order to ensure the floor-contactability of each foot, the absolute value of the actual moment of foot floor reaction force about the desired foot floor reaction force central point should be as small as possible.

Incidentally, normally in most situations, it is physically impossible to make each of the actual moment of foot floor reaction force about the desired foot floor reaction force central point to be zero, while causing the actual total floor reaction force to be equal to the resultant force of the compensating total floor reaction force and the desired total floor reaction force. It will accordingly be difficult to completely satisfy both Demand 1) and Demand 2), and some compromise should therefore be needed.

Based on the above, the operation of the system will be explained with reference to the flow chart (structuralized flow chart) of FIG. 10. The left of the flow chart indicates the elements illustrated in FIG. 4 which conducts the procedures corresponding to those mentioned in the right steps of the flow chart.

The program begins in S10 in which the system is initialized and proceeds, via S12, to S14 in which timer interrupt is waited for. The timer interrupt is executed once every 50 msec. Thus, the control cycle is 50 msec.

The program proceeds to S16 in which it is determined whether it is at gait switching, more specifically, it is determined whether it is at switching of the supporting leg. If the result is negative, the program proceeds to S22. If the result is affirmative, the program proceeds to S18 in which a timer t is initialized, and to S20 in which the desired gait parameters are set. As mentioned above, the gait parameters comprise the motion parameters and the floor reaction force parameters (i.e., the ZMP trajectory parameters).

The program proceeds to S22 in which instantaneous values of the desired gait is determined. Here, the "instantaneous value" indicates values at each control cycle. The instantaneous values of the desired gait comprise the desired body position and/or posture, the desired foot position and/or posture, and the desired ZMP position. Here, the "posture" indicates "orientation or direction" in the X, Y, Z space or environment.

The program then proceeds to S24 in which the desired foot floor reaction force central point is determined. This is done in the manner explained with respect to the desired floor reaction force distributor. Specifically, this is done by determining the value of the set desired foot floor reaction force central point trajectory at the current time t, as illustrated in FIGS. 8 and 9.

The program then proceeds to S26 in which the desired foot floor reaction force is determined. This is done by calculating the desired foot floor reaction force using Eq. 1 mentioned in the explanation of the desired floor reaction force distributor.

The program then proceeds to S28 in which the conditions of the robot such as the inclination of the body 24 are detected using the outputs of the sensors including the inclination sensor 60.

The program then proceeds to S30 in which the components of the compensating moment of total floor reaction force Mdmdx, Mdmdy (about the desired total floor reaction force central point (desired ZMP)) for posture stabilization are determined based on the detected conditions, etc. More specifically, the components of the compensating moment of total floor reaction force Mdmdx, Mdmdy are determined in accordance with Eq. 2 in order to effect posture stabilization when the body inclination is detected.

The program then proceeds to S32 in which the actual foot floor reaction force is detected for each foot. This is done from the output of the force sensor 44, as mentioned above.

The program then proceeds to S34 in which a feet compensating angle θdbv and a foot compensating angle θnx(y) for each foot are determined. This procedure is done by the aforesaid composite compliance operation determinator.

Figure 11:
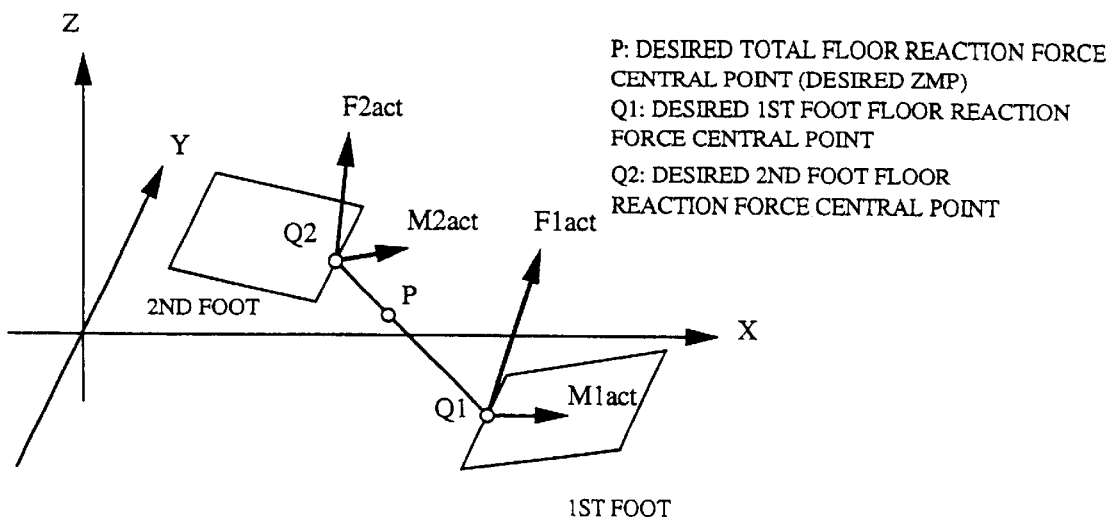
FIG. 11 is an explanatory view showing a situation that actual foot floor reaction force acts on each of the 1st foot and the 2nd foot during the two-leg supporting period, for explaining the operation of a composite compliance operation determinator, illustrated in FIG. 4, which conducts calculations of feet compensating angles, etc., referred to in the flow chart of FIG. 10.

The procedures to be done by the composite compliance operation determinator will be explained. For ease of explanation, it is within the two-leg supporting period in which the actual foot floor reaction force is respectively acting on the 1st foot 22R(L) and the 2nd foot 22L(R), as illustrated in FIG. 11.

Here, a vector Fnact indicates the force component of the n-th foot floor reaction force, and a vector Mnact indicates the moment component of the n-th foot floor reaction force. The direction of vector Mnact indicates that the moment acts from the floor to the foot clockwise with respect to the vector direction.

Figure 12:
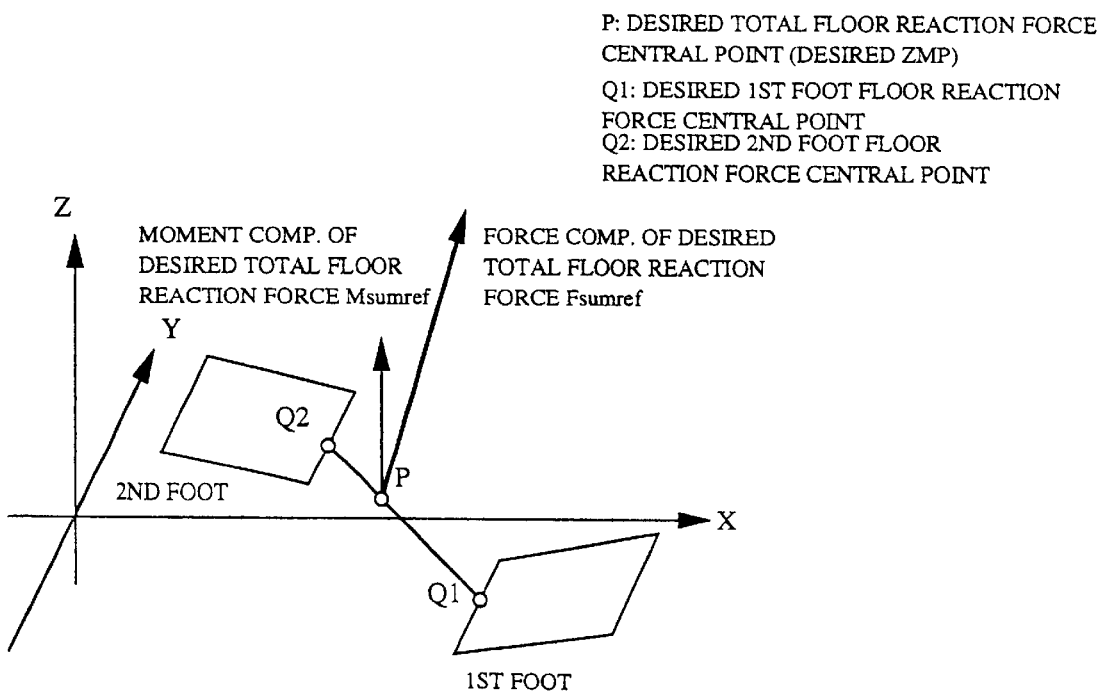
FIG. 12 is an explanatory view showing setting of the desired total floor reaction force in the situation illustrated in FIG. 11.

The desired total floor reaction force at this instant are assumed to be as shown in FIG. 12. Notably, a vector Msumref indicative of the desired moment of total floor reaction force about the desired total floor reaction force central point (desired ZMP) is vertical. (This is because the desired ZMP is a floor point at which the horizontal component of desired total floor reaction force is zero in accordance with the definition mentioned above.)

Figure 13:
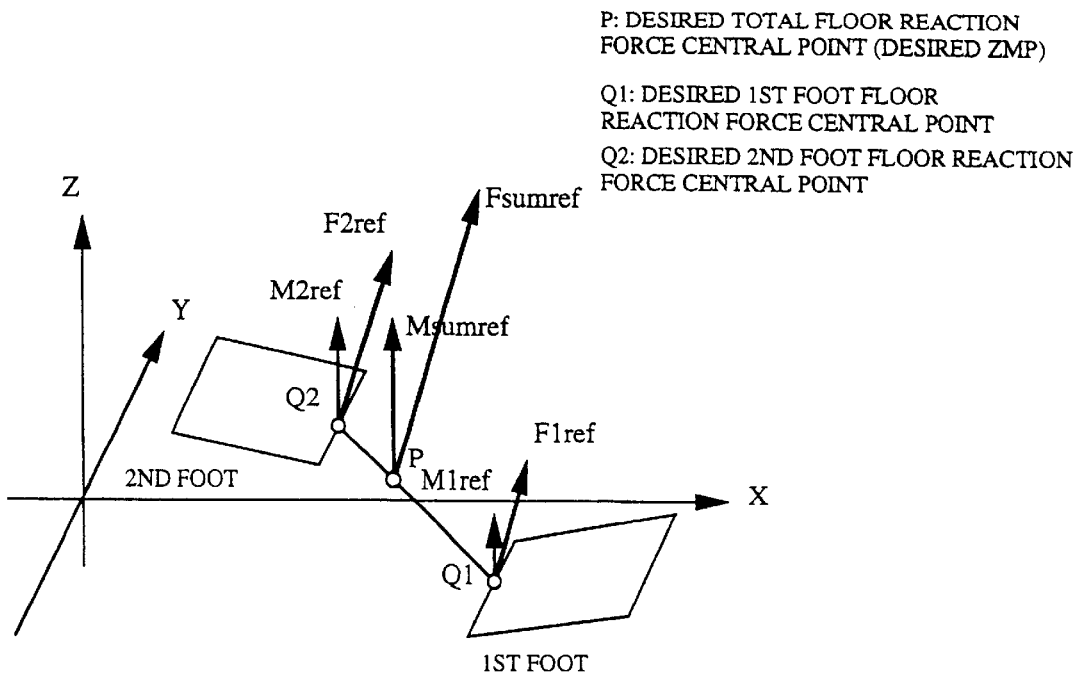
FIG. 13 is an explanatory view showing distribution of the desired foot floor reaction force in the situation illustrated in FIG. 11.

When the desired total floor reaction force is distributed to or divided into the respective desired foot floor reaction forces in accordance with Eq. 1, the result will be that as shown in FIG. 13. In the figure, a vector Fnref indicates the force component of the desired n-th foot floor reaction force. A vector Mnref indicates the moment component of desired n-th foot floor reaction force. The description of the direction of vector Mnref is the same as that of Mnact.

For ease of explanation, it is assumed that the robot is about to turn over backward to the left.

Figure 14:
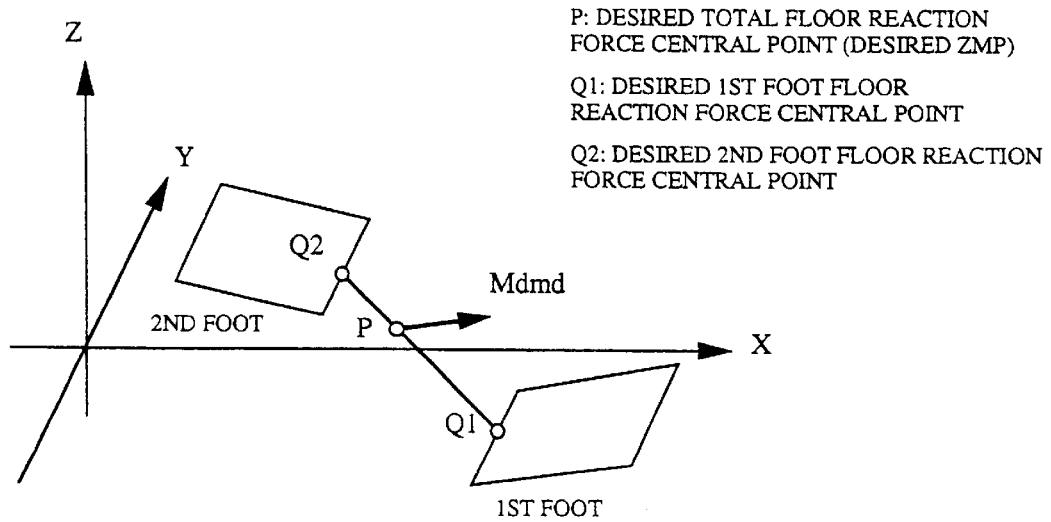
FIG. 14 is an explanatory view showing the compensating moment of total floor reaction force in the situation illustrated in FIG. 11.

The aforesaid posture stabilization controller calculates the compensating moment of total floor reaction force Mdmd based on the detected body inclination errors θerrx, θerry of the robot 1. In this embodiment, since the spinning about the vertical axis (Z-axis) is not controlled, the vertical component of the compensating moment of total floor reaction force Mdmd is zero. Since the body position swinging is not controlled the force component of the compensating total floor reaction force is also zero. FIG. 14 shows the compensating moment of total floor reaction force Mdmd for the assumed condition.

In order to restore the posture, it suffices if the horizontal component of the actual moment of total floor reaction force about the desired total floor reaction force central point (desired ZMP) is controlled to track a horizontal component of a sum of the desired moment of total floor reaction force Msumref and the compensating moment of total floor reaction force Mdmd.

The horizontal component of desired moment of total floor reaction force Msumref is zero at the desired total floor reaction force central point (desired ZMP). Accordingly, in order to restore the posture inclination in the back-and-force or left-and-right direction, it suffices if the horizontal component of the actual moment of total floor reaction force about the desired ZMP is controlled to track the horizontal component of Mdmd.

In this embodiment, the composite compliance operation determinator corrects the feet position and posture so as to satisfy the following aforesaid demands as much as possible.

Demand 1) In order to stabilization-control the robot posture inclination, the horizontal components (X-axis and Y-axis) of the actual moment of total floor reaction force about the desired total floor reaction force central point (desired ZMP) should be controlled to track the horizontal components of the compensating moment of total floor reaction force Mdmd.

Demand 2) In order to ensure the floor-contactability of each foot, the absolute value of the actual moment of foot floor reaction force about the desired foot floor reaction force central point should be as small as possible.

As mentioned above, it is impossible to satisfy both Demand 1) and Demand 2) and hence, some compromise is needed.

In this embodiment, the correction of feet position and/or posture is conducted as follows.

Figure 15:
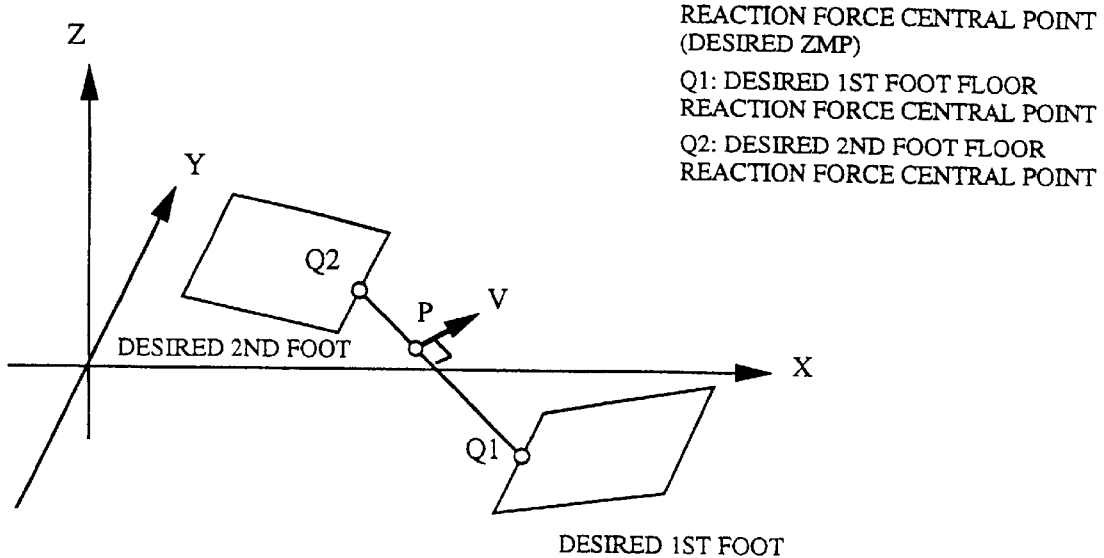
FIG. 15 is an explanatory view showing a vector V which is normal on the plane that includes the foot floor reaction force central point and is perpendicular to the horizontal plane in the situation illustrated in FIG. 11.

1) A vector V which is normal on the plane that includes the desired 1st foot floor reaction force central point Q1 and the 2nd foot floor reaction force central point Q2 and that is perpendicular to the horizontal plane, is first determined. The magnitude of V should be 1. FIG. 15 shows the vector V.

2) The coordinate of the desired 1st foot floor reaction force central point Q1 is rotated (moved) by a rotational angle θdbv about the desired total floor reaction force central point (desired ZMP) around the normal vector V. The central point after rotation is called Q1'. Similarly, the coordinate of the desired 2nd foot floor reaction force central point Q2 is rotated (moved) by a rotational angle θdbv about the desired total floor reaction force central point (desired ZMP) around the normal vector V. The central point after rotation called Q2'.

Figure 16:
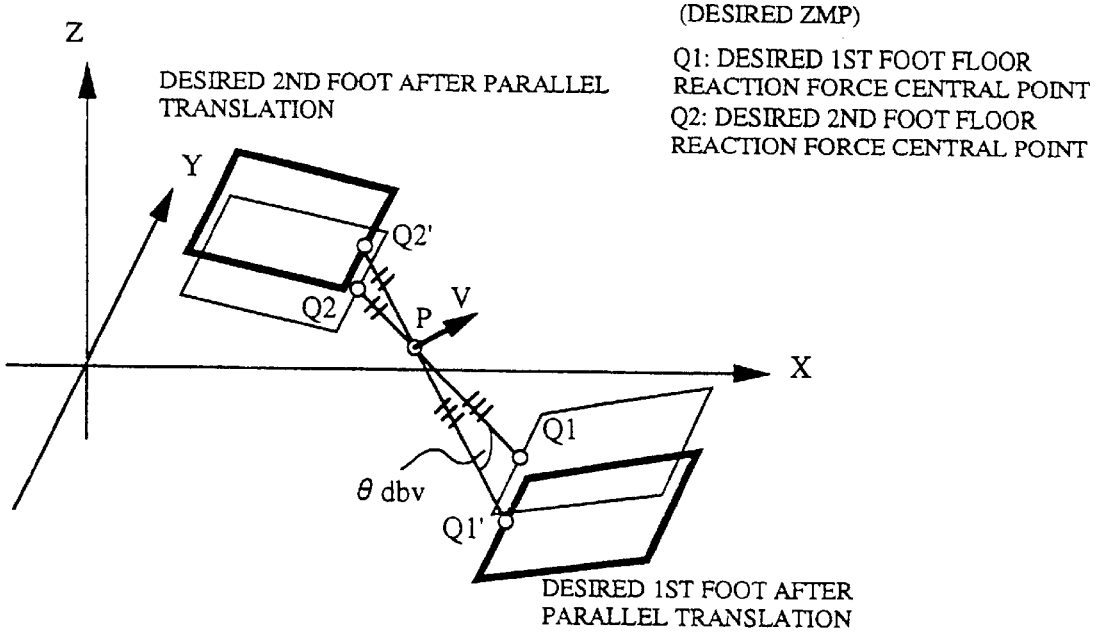
FIG. 16 is an explanatory view showing the desired foot floor reaction force central point rotated about the desired total floor reaction force central point (desired ZMP) by a predetermined angle θdbv in the situation illustrated in FIG. 11.

This rotational angle θdbv is called "feet compensating angle". The vector which starts at Q1 and ends at Q1' is named a vector Q1Q1'. Similarly, a vector which starts at Q2 and ends at Q2' is named a vector Q2Q2'. FIG. 16 shows Q1' and Q2'.

3) Then, the desired 1st foot is parallel-translated (moved almost up and down) by the vector Q1Q1', without changing its posture. Similarly, the desired 2nd foot is parallel-translated by the vector Q2Q2', without changing its posture. FIG. 16 shows each desired foot after movement with thick lines.

Figure 17:
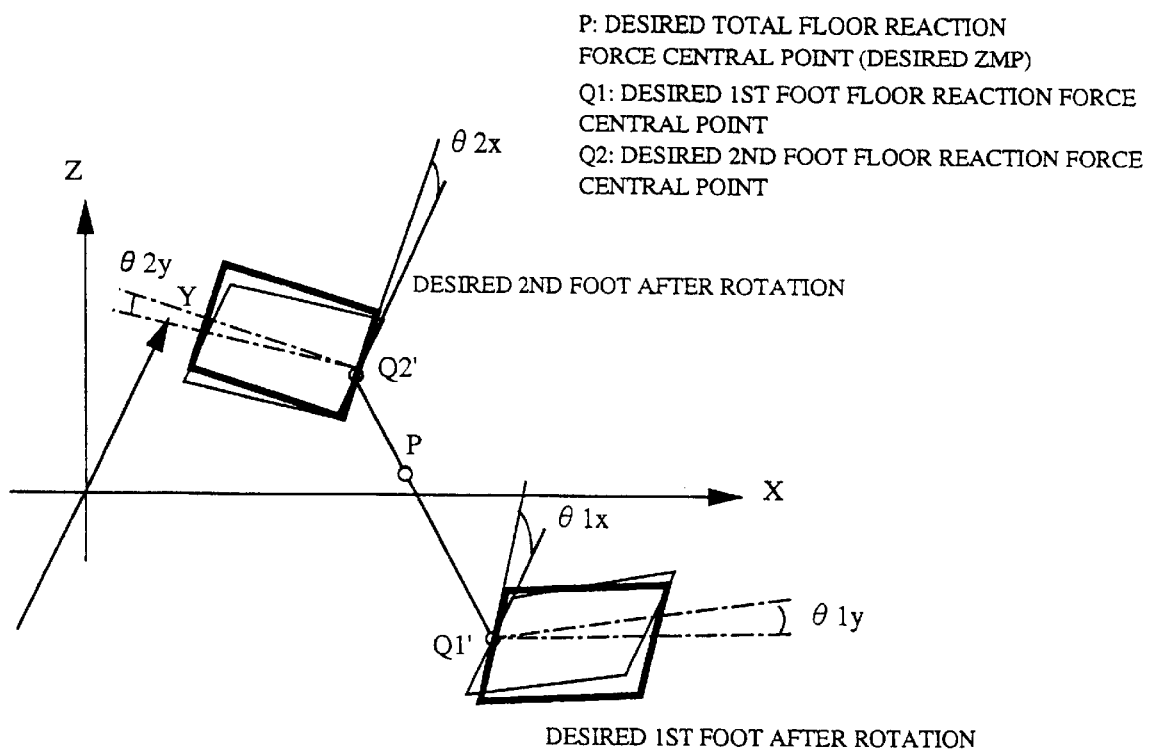
FIG. 17 is an explanatory view showing the feet each rotated about the back-and-forth-axis and left-and-right-axis by predetermined angles θnx, θny in the situation illustrated in FIG. 11.

4) Then, the desired 1st foot is rotated about Q1', by a rotational angle θ1x around the back-and-forth axis (X-axis) and by a rotational angle θ1y around the left-and-right axis (Y-axis). Similarly, the desired 2nd foot is rotated about Q2', by a rotational angle θ2x around the back-and-forth axis (X-axis) and by a rotational angle θ2y around the left-and-right axis (Y-axis). The rotational angles θnx and θny are called "n-th foot X-compensating angle" and "n-th foot Y-compensating angle", respectively. FIG. 17 shows each desired foot after rotation with thick lines.

If the above amount of compensating operation is not excessive, the contact-area of foot sole (the foot sole area where the pressure is positive) remains unchanged, although the distribution of pressure may change. If this is the case, the spring mechanism 32 and the sole elastic member 34 provided at each foot deform by an amount proportionate to the amount of compensating operation and generate the actual foot floor reaction force at each foot in response to the amount of deformation. With this, the relationship between the amount of compensating operation and the change in the actual foot floor reaction force generated by the compensating operation will exhibit the following appropriate characteristics.

Characteristic 1) If only the feet compensating angle θdbv is manipulated to move the desired foot position, the actual force component of foot floor reaction force of the foot which is moved down, increases, while that of the foot which is moved up decreases. At this time, the actual moment of foot floor reaction force about the corrected desired foot floor reaction force central point changes little.

Characteristic 2) If only the n-th foot X-compensating angle is manipulated to rotate the n-th foot posture, only the actual X-component moment of n-th foot floor reaction force about the desired n-th foot floor reaction force central point changes, but the other floor reaction force component changes by a slight amount. Similarly, if only the n-th foot Y-compensating angle is manipulated to rotate the n-th foot posture, only the actual Y-component moment of n-th foot floor reaction force about the desired n-th foot floor reaction force central point changes, but the other floor reaction force component changes by a slight amount.

Characteristic 3) When the feet compensating angle θdbv, the foot X-compensating angle and the foot Y-compensating angle are all manipulated at the same time, the change amount of actual foot floor reaction force will be the sum of the individual change amounts obtained by respective manipulation.

It could be stated from the above that characteristics 1) and 2) indicate that the respective manipulations mentioned there have independency, while characteristic 3) indicates that the respective manipulations have linearity.

Figure 18:
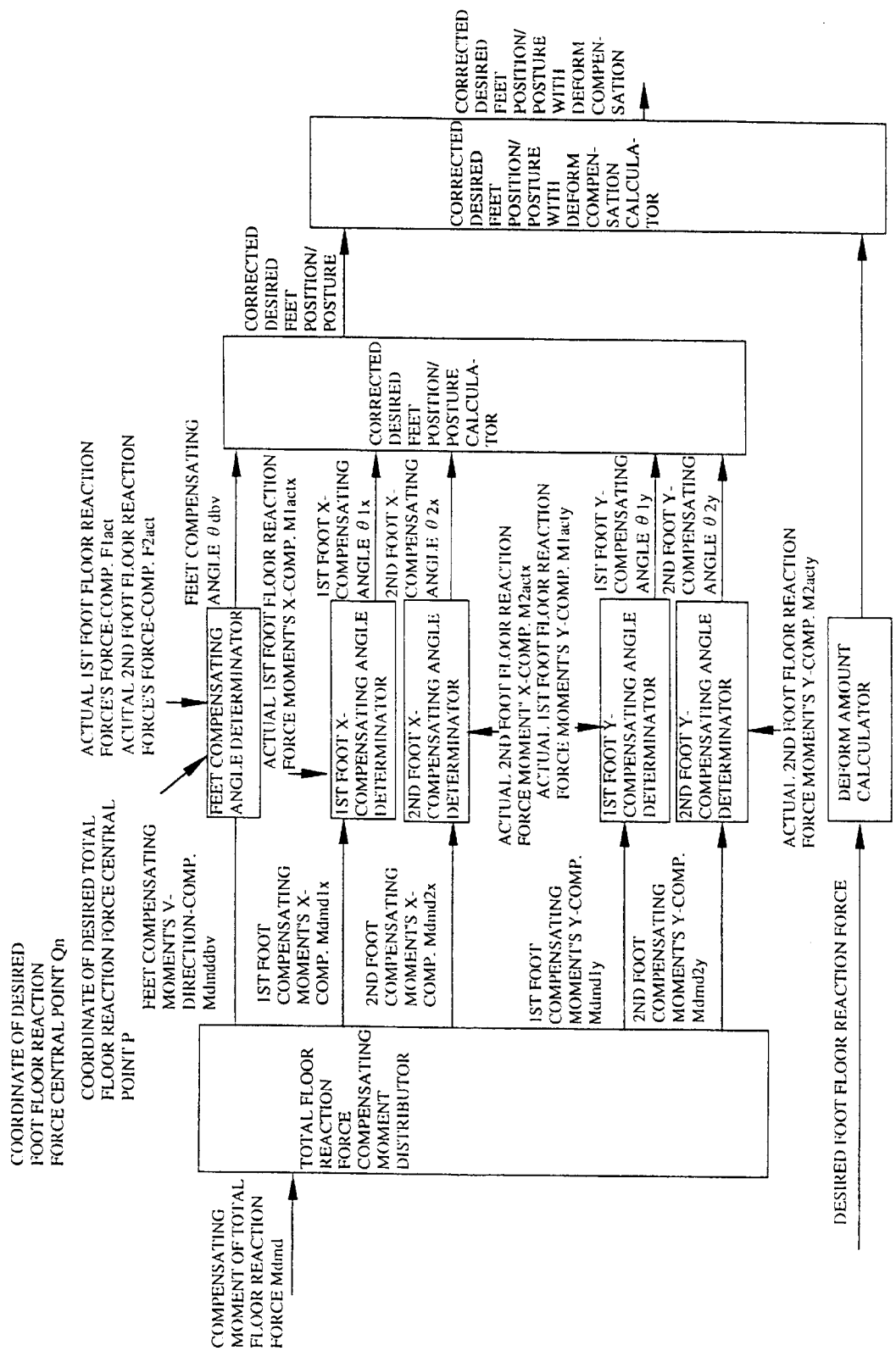
FIG. 18 is a block diagram showing the calculation of the composite compliance operation determinator illustrated in FIG. 4.

FIG. 18 is a block diagram showing the calculation of the composite compliance operation determinator. The calculation will be explained with reference to the figure.

Briefly explaining, a total floor reaction force compensating moment distributor distributes or divides the compensating moment of total floor reaction force Mdmd. Then, a feet compensating angle determinator and a n-th foot X-compensating determinator as well as a n-th foot Y-compensating angle determinator determine the aforesaid compensating angle θdbv and θnx (y) based on the actual foot floor reaction force and the distributed compensating moment of total floor reaction force, etc.

Then, a corrected feet position and posture calculator determines a compensated feet position and/or posture (named as "corrected desired feet position and/or posture") through a geometric calculation based on these determined compensating angles. Finally, a corrected desired feet position and/or posture with deform compensation calculator determines the amount of deformation of the spring mechanism 32 and the sole elastic member 34 expected to be generated by the desired foot floor reaction force, and further corrects the corrected desired feet position and/or posture to cancel the same.

To be more specific, the total floor reaction force compensating moment distributor distributes the compensating moment of total floor reaction force Mdmd to (divides into) a feet compensating moment Mdmddb and foot compensating moments Mdmd1x, y, Mdmd2x, y. The feet compensating moment Mdmddb is a desired value of moment to be generated about the desired total floor reaction force central point (desired ZMP) by the force component of the foot floor reaction force through the manipulation of the feet compensating angle (the amount of feet up-and-down movement) θdbv.

The component around the V-direction of the feet compensating moment Mdmddb is expressed as Mdmddbv. The V-direction is the direction of vector V defined with reference to the explanation of the composite compliance operation determinator. Defining a vector which is perpendicular to V and the vertical direction as "U", a U-component Mdmddbu of the feet compensating moment Mdmddb is set to zero. This is because the manipulation of feet compensating angle θdbv can not generate the U-direction moment of floor reaction force.

In this embodiment, since the vertical component of the compensating moment of total floor reaction force Mdmd is zero, the vertical component Mdmddbz of Mdmddb is also set to zero.

The 1st foot compensating moment Mdmd1 is a moment to be generated about the desired 1st foot floor reaction force central point by manipulating the 1st foot compensating angles θ1x and θ1y. The X-component of 1st foot compensating moment Mdmd1 is expressed as Mdmd1x, while the Y-component thereof is expressed as Mdmd1y. The 2nd foot compensating moment Mdmd2 is a moment to be generated about the desired 2nd foot floor reaction force central point by manipulating the 2nd foot compensating angles θ2x and θ2y. The X-component of 2nd foot compensating moment Mdmd2 is expressed as Mdmd2x, while the Y-component thereof is expressed as Mdmd2y.

The distribution will be carried out, for example, in the manner mentioned below.

$$Mdmddbv = Wdbx*Mdmdx + Wdby*Mdmdy \quad \text{Eq. 3}$$

$$Mdmd1x = W1x*(Mdmdx - Wint*Vx*Mdmddbv)$$

$$Mdmd1y = W1y*(Mdmdy - Wint*Vy*Mdmddbv)$$

$$Mdmd2x = W2x*(Mdmdx - Wint*Vx*Mdmddbv)$$

$$Mdmd2y = W2y*(Mdmdy - Wint*Vy*Mdmddbv) \quad \text{Eq. 4}$$

In the above, Wdbx, Wdby, W1x, W1y, W2x, W2y and Wint are distribution-weighting variables. Vx is a value of the X-component of vector V and Vy is that of Y-component of vector V. Among the variables, Wint is a variable for canceling the moment of total floor reaction force (generated due to the manipulation of the feet compensating angle) by manipulating the foot compensating angles.

Figure 19:
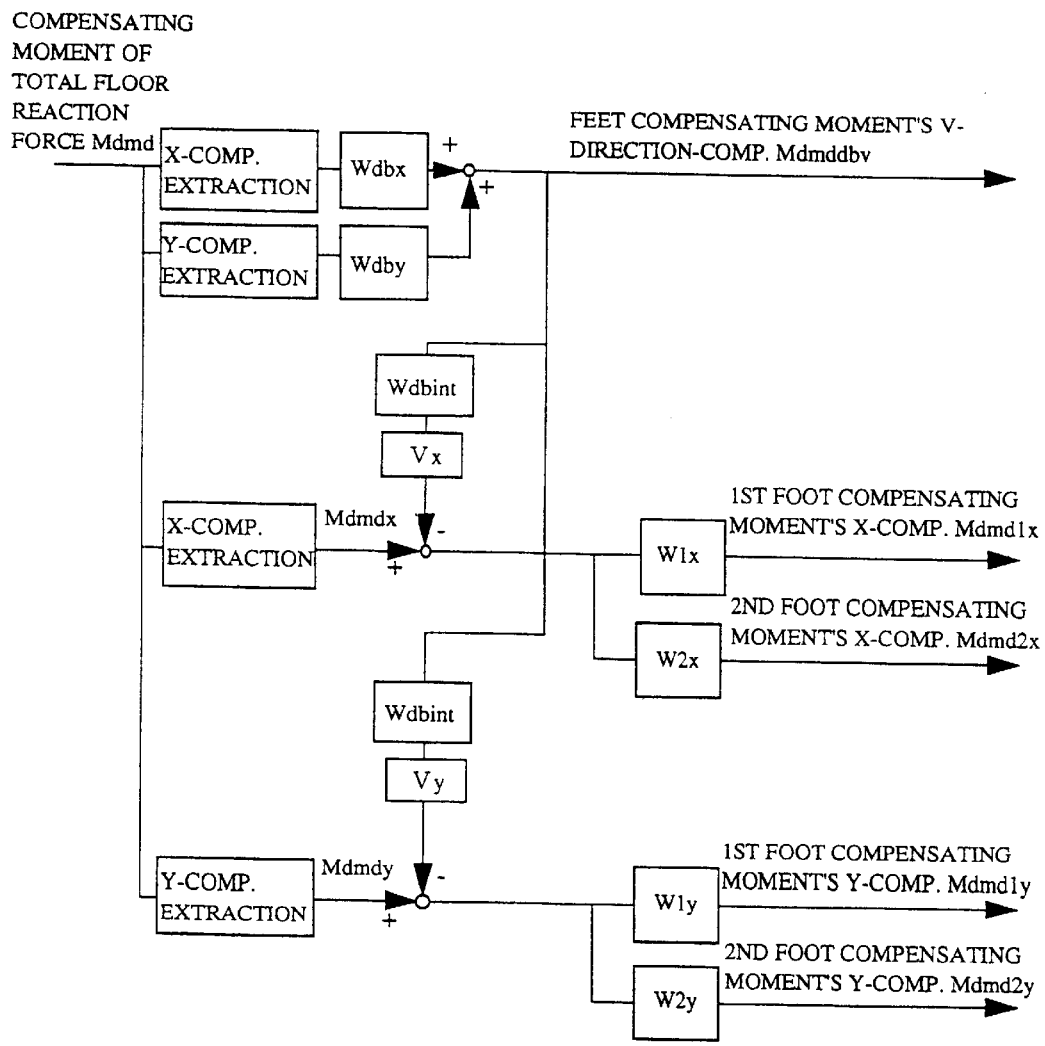
FIG. 19 is a block diagram showing the calculation of a total floor reaction force compensating moment distributor illustrated in FIG. 18.

FIG. 19 is a block diagram showing the total floor reaction force compensating moment distributor which conducts the calculation of Eqs. 3 and 4.

Figure 20:
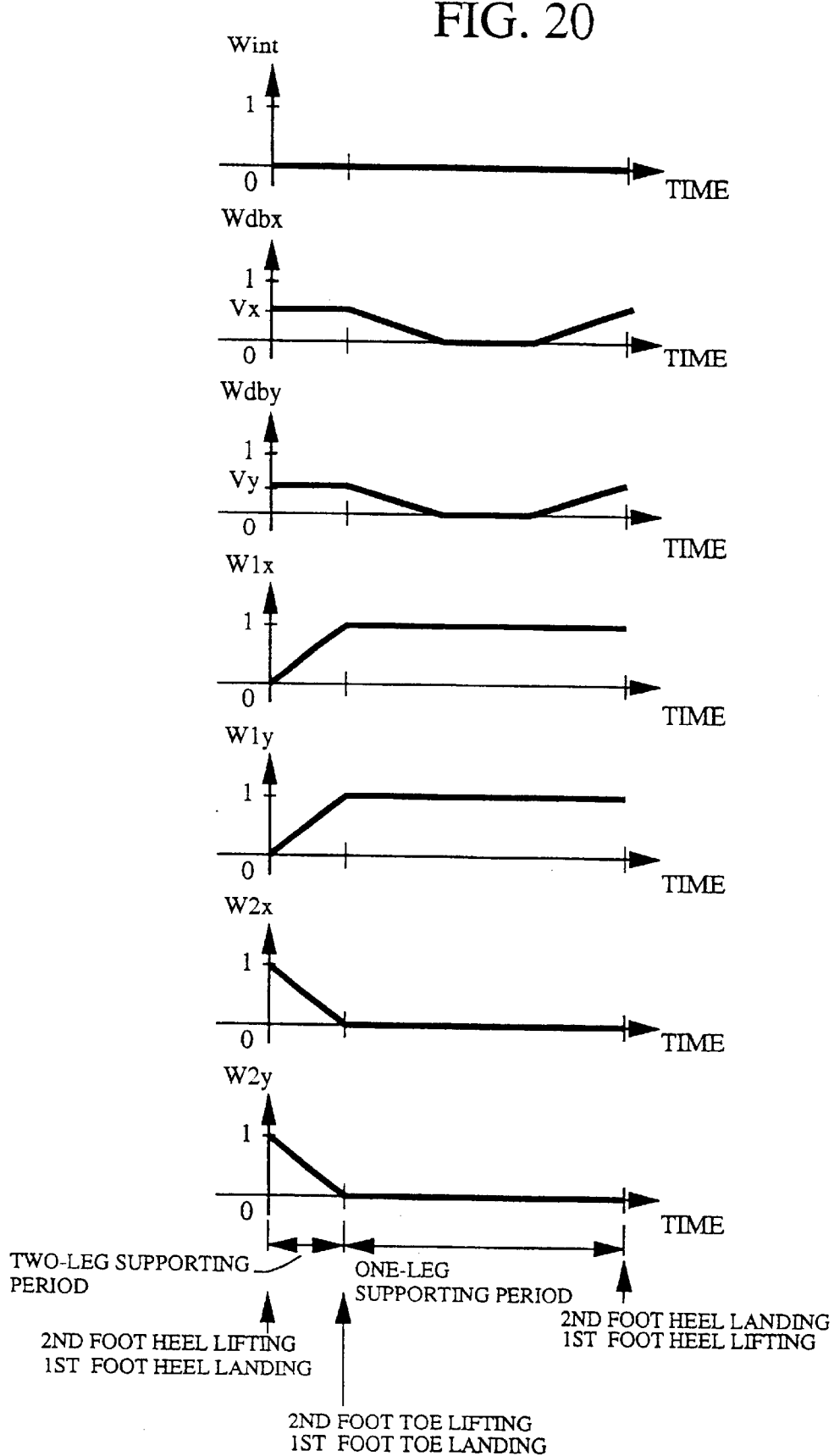
FIG. 20 is a set of time charts each showing examples of set distribution-weighting variables of the total floor reaction force compensating moment distributor, illustrated in FIG. 18, for manipulating the feet compensating angle.

FIG. 20 shows an example of the distribution-weighting variables Wdbx, Wdby, W1x, W1y, W2x, W2y and Wint during walking. The patterns illustrated in FIG. 20 should preferably be set taking the following attentions into account.

Attention 1) If the feet compensating angle and the foot compensating angle vary discontinuously, the joints experience an excessive torque. In order to change the feet compensating angle and the foot compensating angle continuously, the distribution-weighting variables should be changed continuously.

Attention 2) The distribution-weighting variables should be determined such that the actual moment of floor reaction force generated by the manipulation of the feet compensating angle and the foot compensating angle, is as close as possible to the compensating moment of total floor reaction force Mdmd.

Moreover, the variables should preferably be set in response to the situation of robot such as standing, walking, etc. In a situation such as standing in which the V-direction-component Mdmddbv of the feet compensating moment and the foot compensating moment Mdmd1, Mdmd2 can be faithfully generated in the actual foot floor reaction force, the variable should preferably be set as follows.

Specifically, in this situation, the variables should be set, satisfying both Eqs. 5 and 6 as much as possible, such that the horizontal component of the actual moment of total floor reaction force about the desired total floor reaction force central point becomes equal to the horizontal component of the compensating moment of total floor reaction force Mdmd (in other words, Demand 1) must be satisfied with respect to the composite compliance operation determinator).

$$Mdmddbv*Vx+Mdmd1x+Mdmd2x=Mdmdx \qquad \text{Eq. 5}$$

$$Mdmddbv*Vy+Mdmd1y+Mdmd2y=Mdmdy \qquad \text{Eq. 6}$$

Substituting Eqs. 5 and 6 into Eqs. 3 and 4 respectively, Eq. 5 is written as Eq. 7, while Eq. 6 is written as Eq. 8.

$$(Wdbx*Mdmdx+Wdby*Mdmdy)*Vx+W1x*(Mdmdx-\\Wint*Vx*(Wdbx*Mdmdx+Wdby*Mdmdy))+W2x*(Mdmdx-\\Wint*Vx*(Wdbx*Mdmdx+Wdby*Mdmdy))=Mdmdx \qquad \text{Eq. 7}$$

$$(Wdbx*Mdmdx+Wdby*Mdmdy)*Vy+W1y*(Mdmdy-\\Wint*Vy*(Wdbx*Mdmdx+Wdby*Mdmdy))+W2y*(Mdmdy-\\Wint*Vy*(Wdbx*Mdmdx+Wdby*Mdmdy))=Mdmdy \qquad \text{Eq. 8}$$

In order to always satisfy Eqs. 7 and 8, no matter what values Mdmdx and Mdmdy are, it suffices if Eqs. 9, 10 and 11 are satisfied at the same time.

$$Wint=1 \qquad \text{Eq. 9}$$

$$W1x+W2x=1 \qquad \text{Eq. 10}$$

$$W1y+W2y=1 \qquad \text{Eq. 11}$$

In the situation mentioned above, thus, it suffices if the variables are determined to satisfy Eqs. 9, 10 and 11 at the same time.

Figure 21:
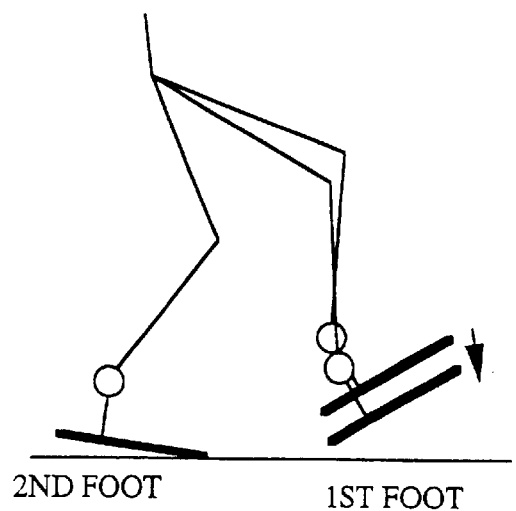
FIG. 21 is an explanatory view showing the robot posture for explaining the setting of the distribution-weighting variables of the total floor reaction force compensating moment distributor illustrated in FIG. 20.

When the robot is walking, the generated moment of actual total floor reaction force may sometimes be smaller than Mdmddbv, even if the foot position is corrected by manipulating the feet compensating angle θdbv so as to generate Mdmddbv. As shown in FIG. 21, for example, assuming that the robot tilts backward such that the 1st foot has not landed at the beginning of the two-leg supporting period, the actual floor reaction force does not change even if the 1st foot position is moved down by θdbv.

Figure 22:
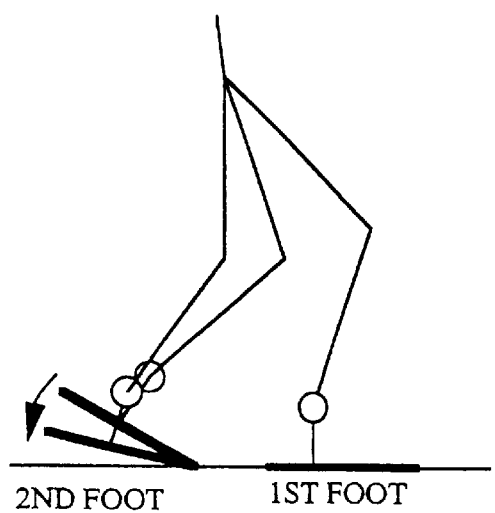
FIG. 22 is an explanatory view, similar to FIG. 21, also showing the robot posture for explaining setting of the distribution-weighting variables of the total floor reaction force compensating moment distributor.

Similarly, the increase of actual moment of floor reaction force may sometimes be smaller than Mdmd2, even if the angle of the 2nd foot is corrected by manipulating the 2nd foot compensating angle θ2 so as to generate Mdmd2. As shown in FIG. 22, for example, assuming that the robot tilts backward at the latter half of the two-leg supporting period, the actual floor reaction force does not change even if the 2nd foot heel is moved down.

Thus, even when the variables are determined to satisfy Eqs. 5 and 6, the increase of the actual floor reaction force generated by the composite compliance control may sometimes be less than the compensating moment of total floor reaction force Mdmd. The values obtained by dividing the left sides of Eqs. 5 and 6 by their respective right sides should accordingly be set to be greater than 1 under the situation where this problem would be likely to occur.

In FIG. 20 showing an example of setting of the distribution-weighting variables during walking, Wint is set to zero such that the manipulation of foot compensating angle can make up for the lack, even when the manipulation of the feet compensating angle θdbv can not generate the actual moment of total floor reaction force in the situation such as illustrated in FIG. 21.

Advantageously, if the robot tilts backward as illustrated in FIG. 21, since the 2nd foot heel moves down effectively to be easily landed on the floor, the actual moment of total floor reaction force can easily be generated by manipulating the 2nd foot compensating angle.

If the robot is not tilting backward, the actual moment of total floor reaction force is generated due to the manipulation of the feet compensating angle θdbv, but the 2nd foot heel has not landed on the floor, the manipulation of 2nd foot compensating angle does not yield the actual moment of total floor reaction force.

More specifically, the foot compensating angle does not act effectively when the feet compensating angle θdbv acts effectively, while the feet compensating angle θdbv does not act effectively when the foot compensating angle acts effectively. The sum of the respective actual moments of total floor reaction force generated by manipulating the feet compensating angle and the foot compensating angle becomes, as a result, almost equal to the compensating moment of total floor reaction force Mdmd.

Depending on the situation, the sum of the respective actual moments of total floor reaction force generated by manipulating the feet compensating angle and the foot compensating angle may sometimes become greater than the compensating moment of total floor reaction force Mdmd.

Even if this happens, since Mdmd is a feedback manipulated variable for posture stabilization in this embodiment, it will not be a serious problem, since, as will be generally experienced in every control system, the magnitude variance of Mdmd will cause the open-loop gain in the control system to vary slightly, but will have little affect on the closed-loop characteristics.

Attention 3) The absolute values of the distribution-weighting variables for feet compensating angle, Wdbx, Wdby, should be small during the one-leg supporting period. This is because changing the feet compensating angle during the one-leg supporting period will result in a wasteful up-and-down movement of the foot out of the floor, but will result in no change in the actual foot floor reaction force.

Attention 4) If the force component of the desired foot floor reaction force is small, the absolute value of the distribution-weighting variable for the foot compensating angle of the foot concerned, should be small so as to ensure the floor-contactability of the foot. In particular, if the foot is far from the floor, the absolute value of the distribution-weighting variable should be small, since the movement of the foot by the foot compensating angle will not result in the change of the actual floor reaction force of that foot, so as to avoid a wasteful foot movement.

Attention 5) The direction of the actual moment of total floor reaction force which can be controlled by manipulating the feet compensating angle is ordinary different from that which can be controlled by manipulating the foot compensating angle.

For example, the direction of the actual moment of total floor reaction force generated by manipulating the feet compensating angle θdbv is always the V-direction, and it can not generate any component perpendicular to the V-direction. On the contrary, the direction of the actual moment of total floor reaction force generated by manipulating the foot compensating angle is restricted depending on the situation.

For example, if the foot is in contact with the floor only by the toe edge or heel edge, no moment can be generated in the direction of the edge line. During the two-leg supporting period, taking this characteristic into account, the feet compensating angle and the foot compensating angle should accordingly be manipulated with a minimum loss.

For example, the distribution-weighting variables Wdbx, Wdby for manipulating the feet compensating angle should be determined as follows.

Specifically, defining a vector whose X-component is Wdbx, whose Y-component is Wdby and whose Z-component is zero, as "Wdb", Eq. 3 is the inner product of the vector Wdb and Mdmd. It could be said that what is obtained by resolving Mdmd to the component of the direction of vector Wdb and the component perpendicular thereto and then by extracting the component of the direction of vector Wdb and then by multiplying by the magnitude of vector Wdb, is Mdmddbv calculated in accordance with Eq. 3.

Figure 23:
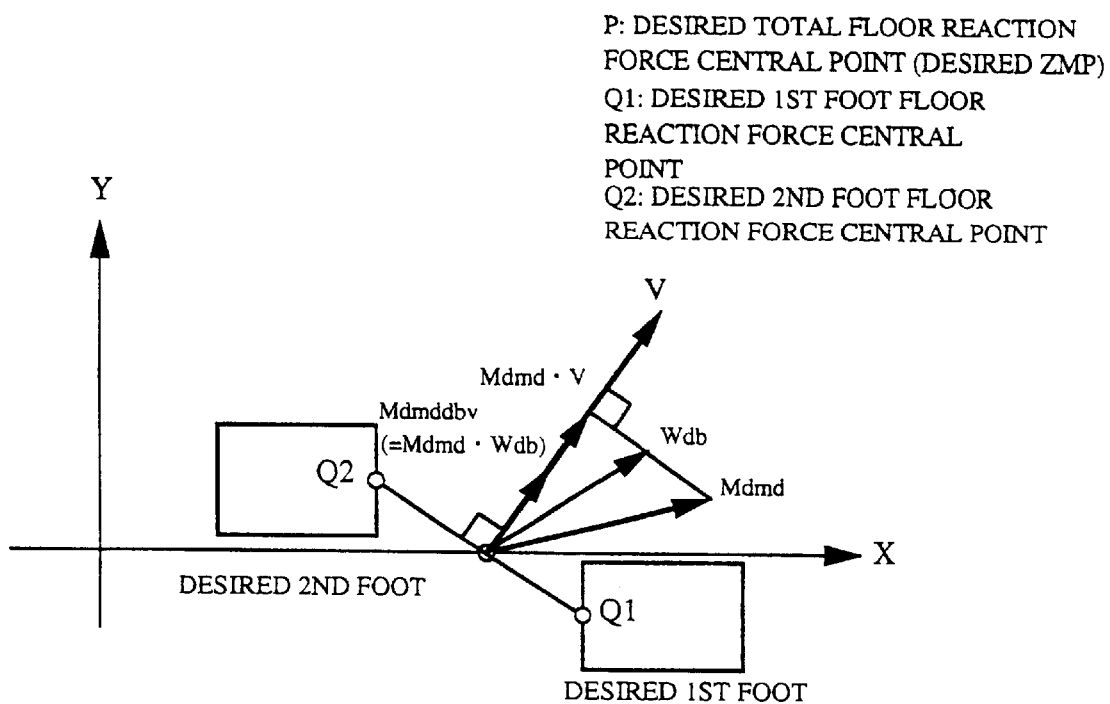
FIG. 23 is an explanatory view showing a V-direction-component of the feet compensating moment when the distributor-weight variables for manipulating the feet compensating angle are determined under a predetermined condition.

FIG. 23 shows this Mdmddbv. This indicates to build a feedback control system which controls the Wdb-direction component of the actual moment of total floor reaction force by manipulating the feet compensating angle. If the Wdb-direction is perpendicular to the vector V, the Wdb-direction component of the actual moment of total floor reaction force will not be generated no matter to what extent the feet compensating angle is manipulated, and the feedback control system would control the feet compensating angle in vain.

In order to decrease such a wasteful operation, the Wdb-direction should accordingly be equal to the direction of vector V or be close thereto as much as possible. Moreover, when it is intended that the Wdb-direction component of the compensating moment of total floor reaction force is generated, without using the foot compensating angle, but by solely manipulating the feet compensating angle, it should be determined such that the inner product of Wdb and V is 1. If it is intended to generate a part of the component by the foot compensating angle, they should be determined such that the inner product of Wdb and V is less than 1.

Aside from the above, when the lateral width of the foot is small, the X-component of the actual moment of foot floor reaction force generated by manipulating the foot compensating angle will be small. In this case, the magnitude of Wdbx should preferably be set to be larger. With this, although the Wdb-direction and the direction of the vector V become not equal to each other and the fluctuation of the feet compensating angle increases, the stability is enhanced.

Figure 24:
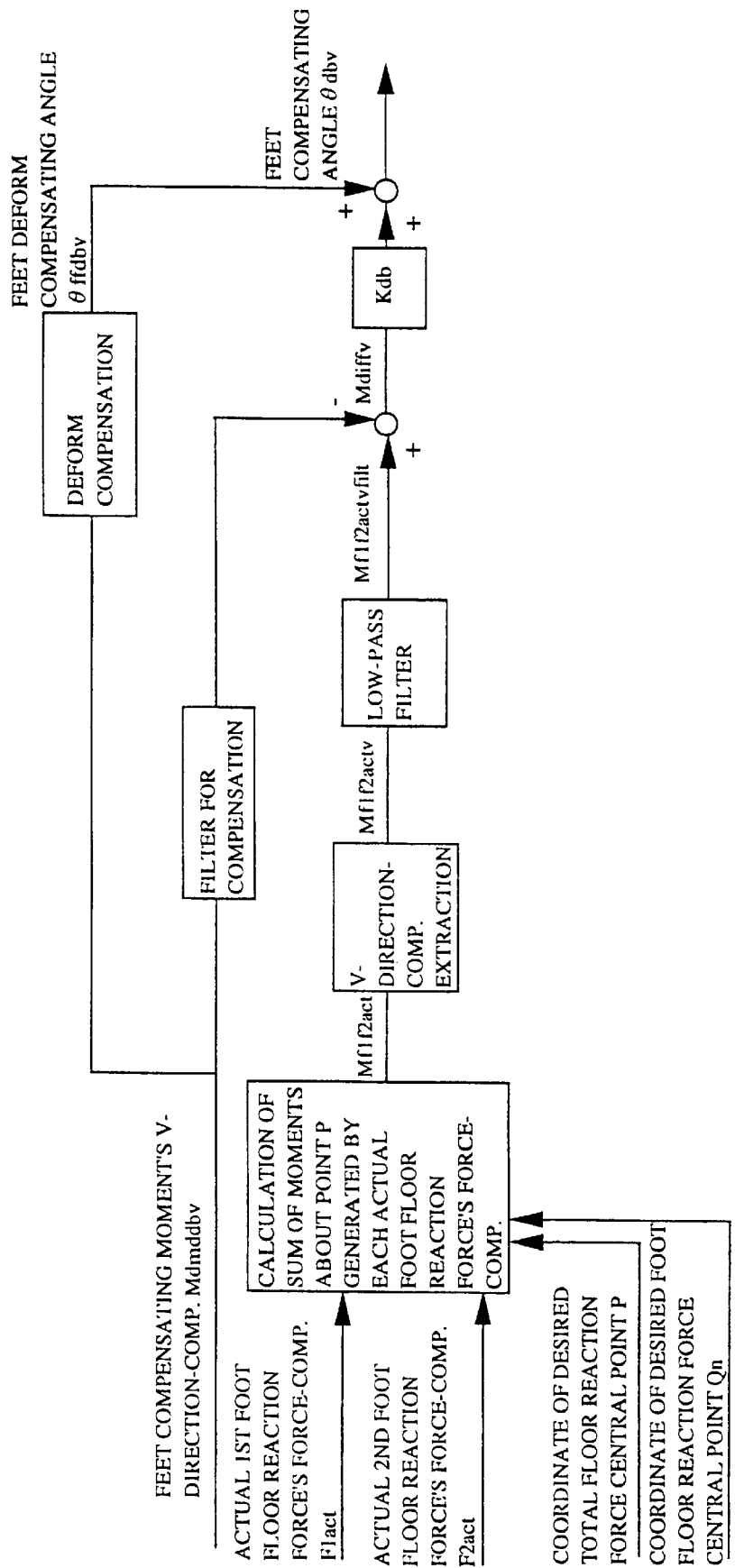
FIG. 24 is a block diagram showing the calculation of a feet compensating angle determinator illustrated in FIG. 18.

The feet compensating angle determinator will be explained further. FIG. 24 is a block diagram showing the calculation of the feet compensating angle determinator. The feet compensating angle θdbv is calculated in the manner as illustrated.

Explaining this with reference to FIG. 24, a moment Mf1f2act, which is generated about the desired total floor reaction force central point P by F1act acting on the desired 1st foot floor reaction force central point Q1 and F2act acting on the desired 2nd foot floor reaction force central point Q2, is determined in accordance with the following equation.

$$Mf1f2act=PQ1*F1act+PQ2*F2act \qquad Eq. 12$$

In the above, PQ1 is a vector which starts at P and ends at Q1, while PQ2 ia a vector which starts at P and ends at Q2.

Instead of Eq. 12, the following equation can be used without introducing any substantial problems.

$$Mf1f2act=PQ1*F1act+PQ2*F2act+M1act+M2act \qquad Eq. 12a$$

Eq. 12a is an equation which calculates the actual moment of total floor reaction force Msumact acting about the desired total floor reaction force central point. Eq. 12 indicates the difference obtained by subtracting the actual moment of foot floor reaction force acting about the desired foot floor reaction force central point from the actual moment of total floor reaction force acting about the desired total floor reaction force central point. Claim 4 is based on this description.

Next, the vector V-direction-component Mf1f2actv of Mf1f2act is extracted. This can be obtained in accordance with the following equation which uses the calculation of vector inner product. The vector V is the vector illustrated in FIG. 15 with reference to the aforesaid explanation.

$$Mf1f2actv=Mf1f2act*V \qquad Eq. 13$$

Then, Mf1f2act is filtered through a low-pass filter to obtain Mf1f2actvfilt.

Then, the V-direction-component of feet compensating moment Mdmddbv is filtered through a filter for compensation and the filtered result is subtracted from Mf1f2actvfilt to determine a V-direction-component of difference moment Mdiffv.

The filter for compensation is a filter for improving the frequency-response characteristic of the transfer function from Mdmddbv to the actual moment of total floor reaction force.

Then, a feet deform compensating angle θffdbv for canceling the influence of the deformation of the spring mechanism, etc., on the V-direction- component of feet compensating moment. This corresponds to the so-called feedforward compensation.

Specifically, this is done by using a mechanism-compliance model describing the relationship between the V-direction-component of feet compensating moment Mdmddbv and the amount of deformation, by calculating the angle of deformation of the line between the desired 1st foot floor reaction force central point Q1 and the desired 2nd foot floor reaction force central point Q2, and by inverting the polarity of the angle to determine the same as the feet deform compensating angle θffdbv.

The feet deform compensating angle θffdibv can be approximated using the following equation.

$$θffdbv=-α*Mdmddbv \qquad Eq.14$$

In the above, α is a predetermined constant.

Finally, the feet deform compensating angle θdbv is obtained in accordance with the following equation. Below, Kdb is a control gain and is normally set to be a positive value.

$$θdbv =Kdb*Mdiffv+θffdbv \qquad Eq. 15$$

Figure 25:
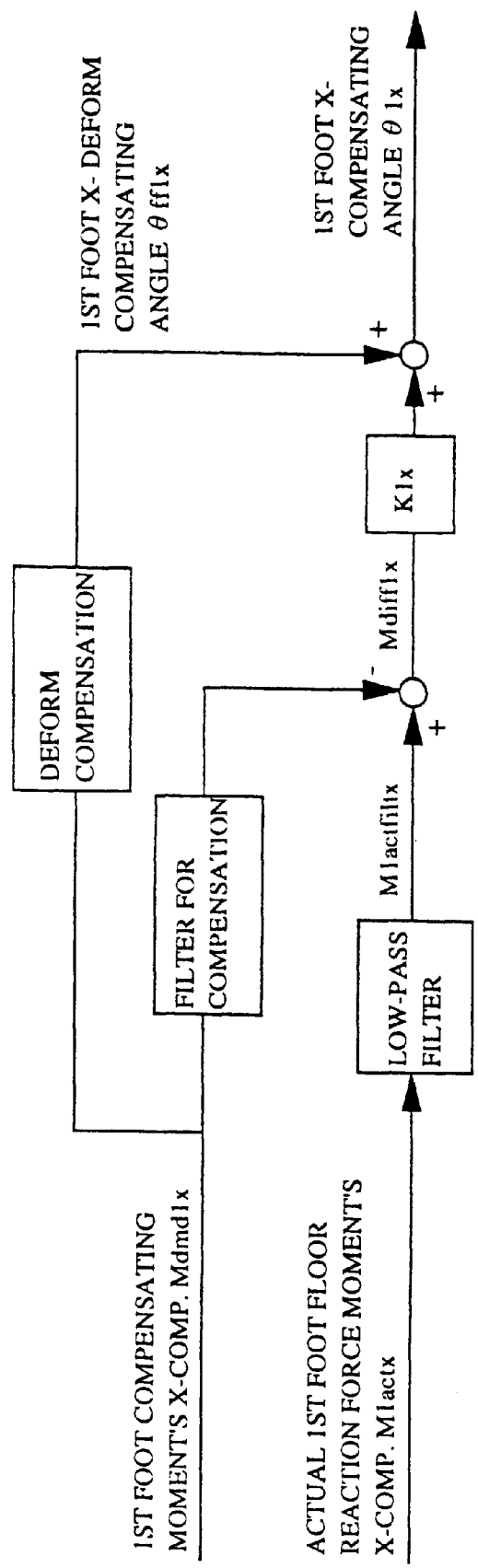
FIG. 25 is a block diagram showing the calculation of foot compensating angle determinators of each foot illustrated in FIG. 18.

The n-th foot compensating angle determinator will be explained. FIG. 25 is a block diagram showing the calculation of a 1st foot X-compensating angle determinator thereof. The 1st foot X-compensating angle θ1x is calculated in the manner illustrated. Although the illustration is omitted, the 1st foot Y-compensating angle θ1y, the 2nd foot X-compensating angle θ2x and the 2nd foot Y-compensating angle θ2y are calculated similarly. Only the algorithm to determine the 1st foot X-compensating angle θ1x will be explained here.

The X-component of the moment of 1st foot floor reaction force M1actx is filtered through a low-pass filter to obtain M1actfiltx. The X-component of the 1st foot compensating moment Mdmd1x is filtered through a filter for compensation and the filtered result is subtracted from M1actfiltx to obtain a difference moment Mdiff1x. Similarly to the case of feet compensating angle determination, the filter for compensation is a filter for improving the frequency-response characteristic of the transfer function from Mdmd1x to the actual floor reaction force.

Then, similarly to the case of feet compensating angle determination, the 1st foot X-deform compensating angle θff1x for canceling the influence of the deformation of the spring mechanism, etc., on the X-component of 1st foot compensating moment, is determined. This is the so-called feedforward compensation.

Specifically, this is done by using a mechanism-compliance model describing the relationship between the X-direction-component of 1st foot compensating moment Mdmd1x and the amount of deformation, by calculating the angle of deformation of the 1st foot, and by inverting the polarity of the angle to determine the same as the feet deform compensating angle θff1x.

The feet deform compensating angle θff1x can be approximated using the following equation.

$$\theta ff1x = -\alpha 1x * Mdmddbv \qquad \text{Eq. 16}$$

In the above, α1x is a predetermined constant.

Finally, the 1st foot X-compensating angle θ1x is obtained in accordance with the following equation. In the below, K1x is a control gain and is normally set to be a positive value.

$$\theta 1x = K1x * Mdiff1x + \theta ff1x \qquad \text{Eq. 17}$$

Any equivalent alteration such as altering the order of calculation may be made on the block diagrams illustrated.

Returning to the explanation of FIG. 18 and continuing the explanation thereon, the corrected desired feet position and/or posture calculator corrects the desired feet position and/or posture, in accordance with the feet position and/or posture correction of the aforesaid compliance operation, based on the aforesaid feet compensating angle θdbv, the 1st foot X-compensating angle θ1x, the 1st foot Y-compensating angle θ1y, the 2nd foot X-compensating angle θ2x, and the 2nd foot Y-compensating angle θ2y, to determine the corrected desired feet position and/or posture.

A deform amount calculator calculates the amount of deform of the spring mechanism 32 and the sole elastic member 34 which is expected to be generated by the desired foot floor reaction force.

A corrected desired feet position and/or posture with deform compensation calculator further corrects the corrected desired feet position and/or posture so as to cancel the calculated amount of deform, and determines a corrected desired feet position and/or posture with deform compensation.

Figure 26:
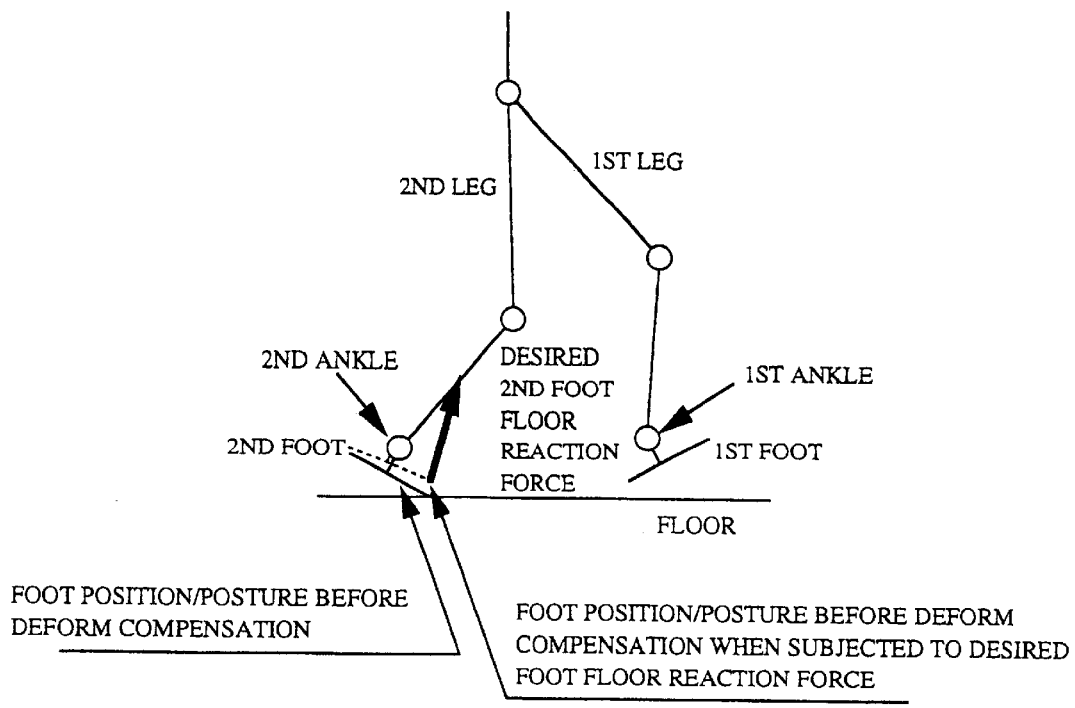
FIG. 26 is an explanatory view for explaining the calculation of a corrected desired feet position/posture with deform compensation calculator illustrated in FIG. 18.
Figure 27:
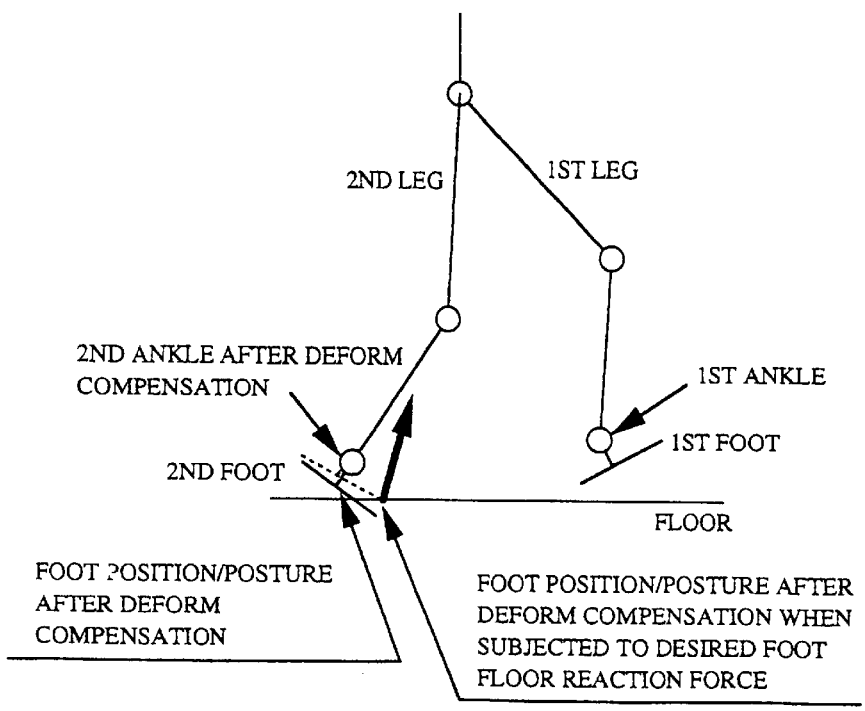
FIG. 27 is an explanatory view, similar to FIG. 26, for explaining the calculation of a corrected desired feet position/posture with deform compensation calculator illustrated in FIG. 18.

For example, when the amount of deform such as shown in FIG. 26 is calculated, the corrected desired feet position and/or posture with deform compensation is determined to be the position and/or posture as illustrated in FIG. 27. In other words, the calculator calculates the corrected desired feet position and/or posture with deform compensation such that the position and/or posture of the deform-compensated foot (illustrated in FIG. 27) after having deformed by the desired foot floor reaction force, becomes equal to the foot position and/or posture before deform compensation (illustrated in FIG. 26).

The deform compensation is a control which cancels a difference of the actual foot position and/or posture caused by the deformation of the spring mechanism 32 or the sole elastic member 34 in a feedforward manner, thereby enabling to effect a walking which is closer to the desired gait when compared to a system without this deform compensation control.

Figure 10:
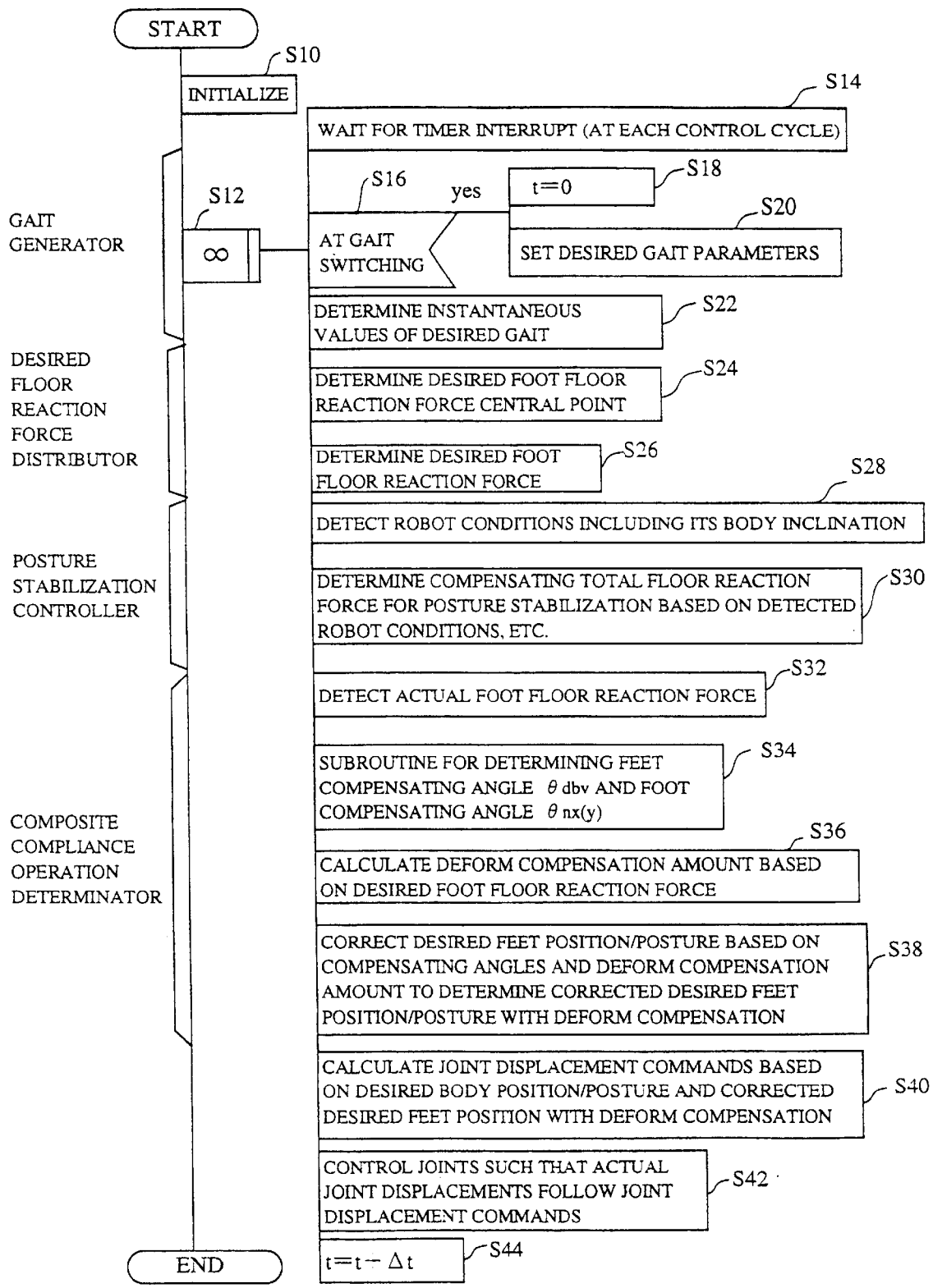
FIG. 10 is a flow chart showing, similarly to FIG. 4, the operation of the control system of a legged mobile robot according to the present invention.

Based on the above, again returning to the explanation of the flow chart of FIG. 10, the aforesaid compensating angles are determined in S34.

Figure 28:
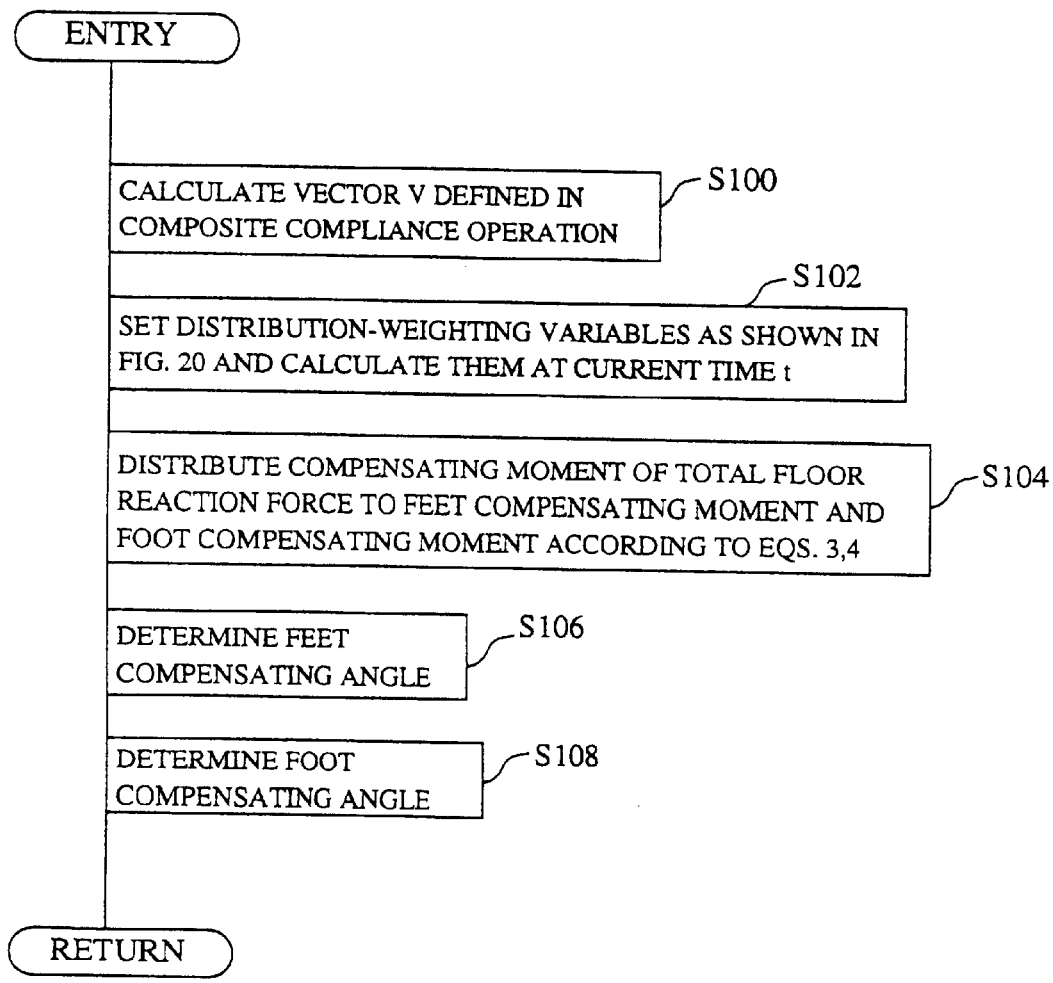
FIG. 28 is a flow chart showing the subroutine for determining the feet compensating angle, etc., referred to in the flow chart of FIG. 10.

FIG. 28 is a flow chart showing the subroutine of this determination.

Explaining this with reference to the figure, the program begins in S100 in which the aforesaid vector V is calculated and proceeds to S102 in which the distribution-weighting variables are set as illustrated in FIG. 20 and the variables at the current time t are calculated. The program then proceeds to S104 in which the compensating moment of total floor reaction force Mdmd is distributed to, or divided into the feet compensating moment Mdmddbv and the foot compensating moment Mdmdnx(y) according to Eqs. 3 and 4, to S106 in which the feet compensating angle θdbv is determined in the manner mentioned above. And, the program proceeds to S108 in which the foot compensating angle θnx(y) is determined.

Returning to the flow chart of FIG. 10, the program then proceeds to S36 in which the amount of deform compensation is calculated based on the desired foot floor reaction force, to S38 in which the desired feet position and/or posture is corrected based on the compensating angles θdbv, θnx(y), and is then corrected based on the amount of deform compensation to determine the corrected feet position and/or posture with deform compensation.

The program then proceeds to S40 in which the joint displacement commands are calculated based on the body position and posture and the corrected desired feet position and/or posture with deform compensation, to S42 in which the actual joint displacements are servo-controlled based on the calculated joint displacement commands, to S44 in which the time is updated by Δt, and returns to S14 to repeat these procedures.

Since this embodiment is configured in the manner mentioned above, briefing this embodiment, almost no interference between the actual total floor reaction control and the actual foot floor reaction control exists, thereby enabling easy control of the actual total floor reaction force and the actual foot reaction force.

To be specific, the system according to this embodiment improved the following points with respect to the technique proposed earlier. To be more specific, in the ankle-compliance control proposed in Japanese Laid-Open Patent Application No. Hei 5 (1993)—305, 584, the actual moment of floor reaction force acting on the ankle or a fixed point at the foot such as a reference sole point is detected and the foot is rotated about the point based on the detected moment. In the system according to this embodiment, the actual moment of foot floor reaction force acting on the desired foot floor reaction force central point (which moves) is calculated, and the control is modified such that the foot is rotated about the desired foot floor reaction force central point based on the calculated moment in order that the moment about the point becomes a desirable value.

As a result, almost no interference between the actual total floor reaction force and the actual foot floor reaction force occurs, thereby making them easy to control. In order to further decrease the interference, it is alternatively possible to select the point of action at a more appropriate location within the floor-contact sole region at every instant.

Moreover, the system can control the floor reaction force acting on the robot, more specifically, the actual moment of total floor reaction force about the desired total floor reaction force central point (desired ZMP) and the actual moment of foot floor reaction force about the desired foot floor reaction force central point can be, easily and properly controlled. In other words, when compared with the case in which the two-leg-compliance control and the ankle-compliance control proposed earlier are both used, less control interference occurs and the system can prevent the actual total floor reaction force and the actual foot floor reaction force from deviating from desired values or oscillation from happening.

Accordingly, the system can ensure to control the floor reaction force acting on the robot properly, even when walking on the floor having not only a slant or undulation extending over a relatively long distance, but also an unexpected local slant or level difference, without suffering therefrom.

Moreover, the system can achieve the posture stabilization control of a legged mobile robot easily, decrease the impact acting on the legged mobile robot at foot landing, and enhance the contactability with the floor so as to prevent the slippage or spinning at walking from happening. The system can decrease the load of the actuators of the legged mobile robot.

Furthermore, in the two-leg-compliance control proposed in Japanese Laid-Open Patent Application No. Hei 5 (1993)—305,586, the moment component of the actual total floor reaction force (i.e., the resultant force of all of the foot reaction forces) about the desired total floor reaction force central point (desired ZMP) is detected and the control is conducted such that the detected moment becomes a desirable value. In the system according to this embodiment, the moment generated by the resultant translational force of the foot reaction force acting on the desired foot floor reaction force central point (excluding the moment component thereof) acting on the desired total floor reaction force central point (desired ZMP) is detected and the control is modified such that the detected moment becomes a desirable value. (The control to cause the detected moment to be a desired value may be the same as that proposed earlier.)

Figure 29:
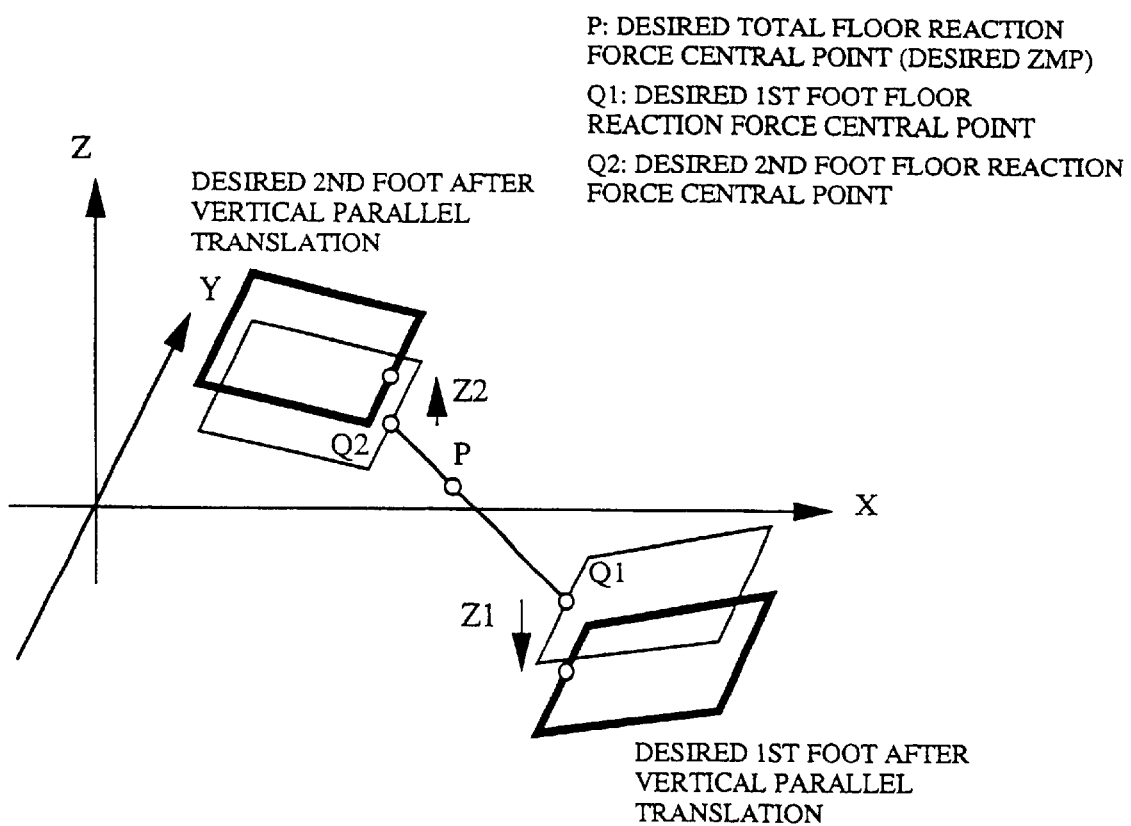
FIG. 29 is an explanatory view, similar to FIG. 16, but showing feet movement or motion in the operation of a control system of a legged mobile robot according to a second embodiment of the present invention.

FIG. 29 is an explanatory view, similar to FIG. 16, but showing the control system of a legged mobile robot according to a second embodiment of the invention.

In the system according to the second embodiment, the operation of compensation is simplified. In this embodiment, as the feet position correction for controlling the force component of the floor reaction force of each foot, instead of that illustrated in FIG. 16, the system is configured such that the feet are moved only in the vertical direction, as illustrated in FIG. 29. The amount of movement in the vertical direction for the 1st foot Z1 and that for the 2nd foot Z2 are determined in accordance with the following equation.

$$Z1 = -\text{Line length PQ1} * \theta dbv$$

$$Z2 = \text{Line length PQ2} * \theta dbv \qquad \text{Eq. 18}$$

In the above, the value obtained by Eq. 15 is used as θdbv.

The rest of the configuration is not different from that in the first embodiment. Having been configured in this manner in the second embodiment, it has the effects and advantages almost the same as those of the first embodiment.

Figure 30:
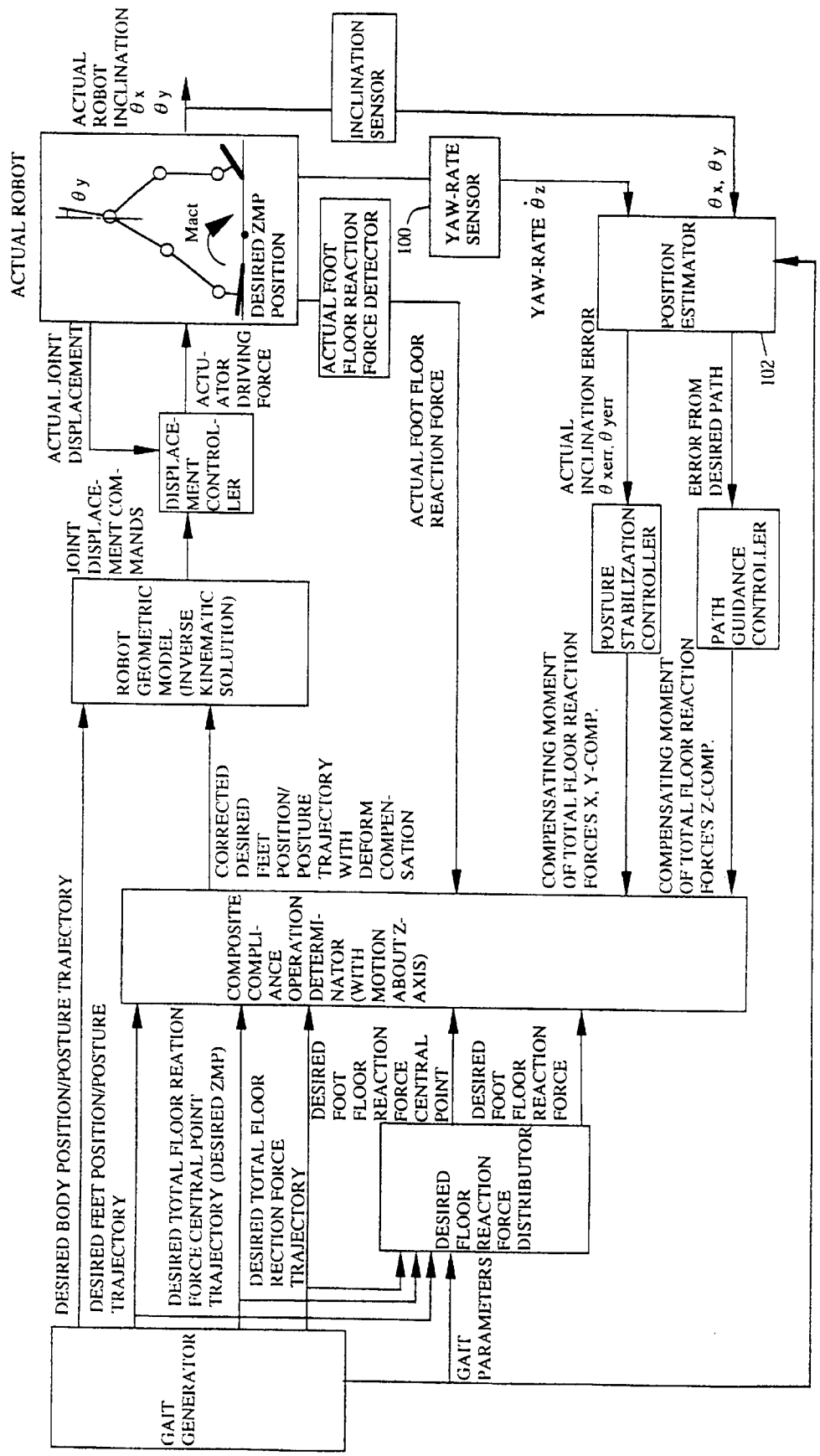
FIG. 30 is an explanatory view, similar to FIG. 4, but showing the configuration and operation of a control system of a legged mobile robot according to a third embodiment of the present invention.
Figure 31:
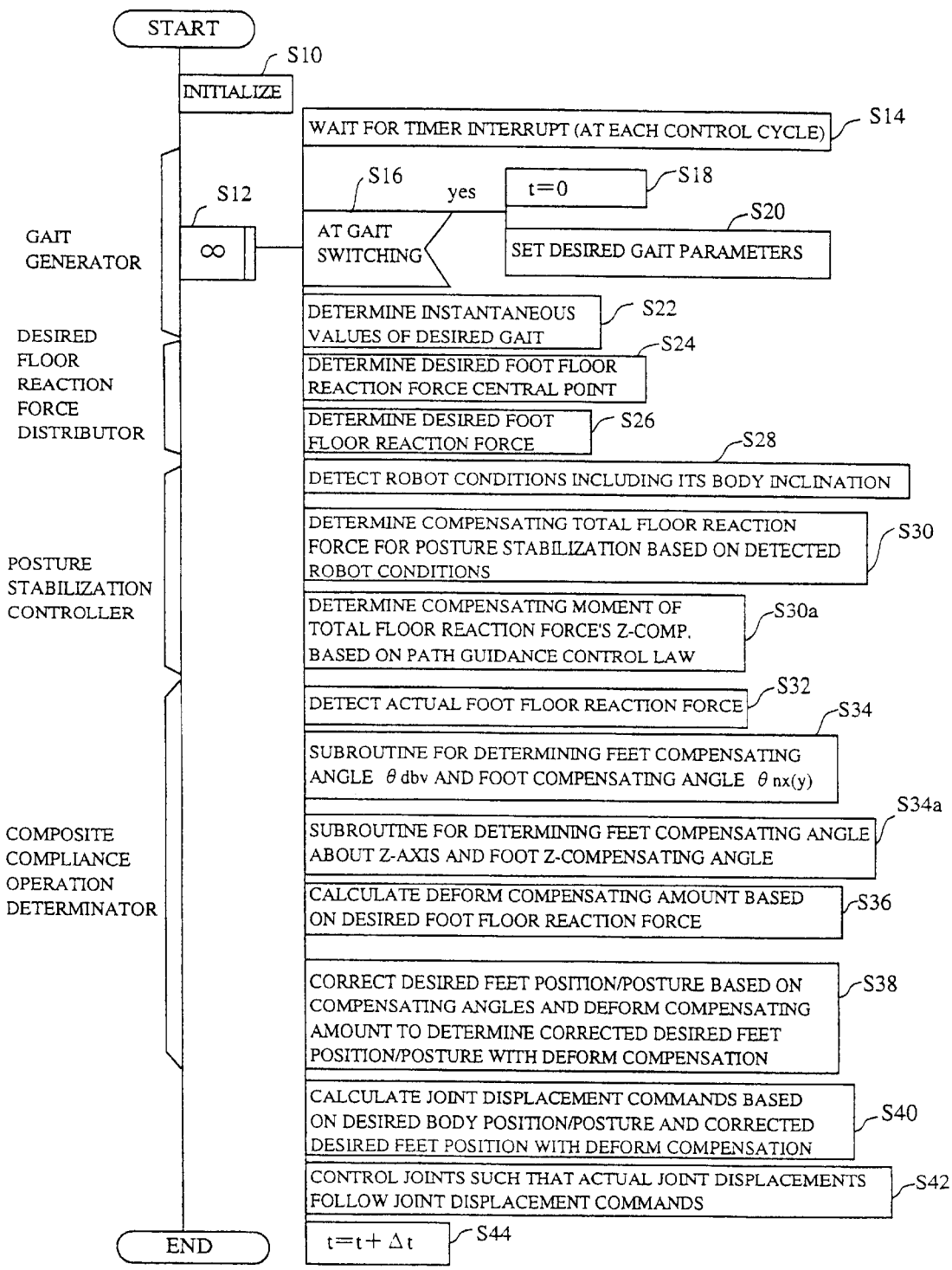
FIG. 31 is a flow chart, similar to FIG. 10, but showing the operation of a control system of a legged mobile robot according to the third embodiment of the present invention.

FIG. 30 is a block diagram, similar to FIG. 4, but showing the configuration of the control system of a legged mobile robot according to a third embodiment of the invention. FIG. 31 is a flow chart, similar to FIG. 10, but showing the operation of the system.

In the third embodiment, a compliance control for the Z-component (the vertical component) of the actual moment of total floor reaction force, is added. More specifically, the third embodiment is configured such that the Z-component of the actual moment of foot floor reaction force due to the aforesaid inherent rotative-vibration about the Z-axis is decreased.

For that reason, in the third embodiment, the state detector, the posture stabilization controller and the composite compliance operation determinator in the configuration of the first embodiment is added with new functions.

Explaining this with reference to FIG. 30, in the system according to the third embodiment, a yaw-rate sensor 100 is provided at an appropriate location of the body 24 of the robot 1 and a position estimator 102 is provided which inputs the outputs of the sensor, etc., and estimates the current position, posture and the direction in which the robot moves. The yaw-rate sensor 100 outputs a signal indicative of the yaw-rate (rotational angular velocity) of the robot 1 about the Z-axis. The rotational angular velocities about the X-axis and Y-axis are calculated based on the output of the inclination sensor 60.

The position estimator 102 determines a current position and direction of foot landing relative to the preceding foot landing position one foot-step earlier, and detects the direction in which the robot forwards by integrating the output of the yaw-rate sensor 100.

Based on this information, it further estimates a positional error and a directional error of the robot 1 relative to a desired path through dead-reckoning. Since the estimation error is likely to oscillate or diverges in the dead-reckoning, it is alternatively possible to recognize the environment using a camera, etc., to correct the estimated value. Since the detected yaw-rate is smaller than the actual value when the body 34 tilts relative to the vertical axis, it is preferable to correct the detected yaw-rate by the output of the inclination sensor 60.

Explaining the operation of the system according to the third embodiment with reference to the flow chart of FIG. 31, the program begins in S10 and proceeds up to S30a, via S30, in which the Z-component of the compensating moment of total floor reaction force Mdmdz is determined based on the estimated positional error and/or the direction error such that the error decreases.

This will be explained taking as an example the case in which the robot walks along a path shown in FIG. 32. The following equation is used as the control law for calculating the Z-component of the compensating moment of total floor reaction force Mdmdz.

$$\text{Mdmdz} = -\text{Kthz} \cdot \theta \text{errz} - \text{Kwz} \, (d\theta \text{errz}/dt) - \text{Khzh} \qquad \text{Eq. 19}$$

In the above, θerrz indicates the directional error; dθerrz/dt indicates its time differential; and h indicates the positional error from the path. The figure shows θerrz and h. In the situation illustrated in the figure, θerrz and h are positive. Kthz, Kwz and Khz are gains (constants) of the path guidance control.

As mentioned above, when the robot 1 is walking, the body 24 rotative-vibrates due to the twisting elasticity of the spring mechanism 32 and the sole elastic member 34 at the foot and to the inertia moment of the robot 1 about the vertical axis. This is the inherent rotative-vibration about the Z-axis. Due to this vibration, the Z-component of the actual moment of foot reaction force vibrates or oscillates. When the robot 1 is walking, the actual foot floor reaction force is almost the sum of the desired foot floor reaction force and this vibration.

If the magnitude of this vibration becomes excessive, the actual moment of foot floor reaction force peaks beyond the frictional margin, making the foot sole slip and causing the robot 1 to spin. If the spinning is large, the robot loses the posture stability and may occasionally turn over. It will be understood from the above that even suppressing this inherent rotative-vibration about the Z-axis improves the posture stability.

In order to merely suppress this inherent rotative-vibration about the Z-axis, it will suffice if the Z-component of the compensating moment of total floor reaction force Zdmdz is determined solely from the yaw-rate error (the time differential of the directional error). In other words, it will suffice if the path guidance control gains other than Kwz are set to zero in Eq. 19.

Moreover, in the third embodiment, the composite compliance operation determinator is added with a new function. Specifically, in order to manipulate the moment component of the actual total floor reaction force and the actual foot floor reaction force about the Z-axis, the correction of the position and/or posture of the feet 22R(L) is added to the operation in the first embodiment. The composite compliance operation determinator determines the amount of this correction.

Before entering into the determination, the added operation will be explained specifically.

This correction of the feet position and/or posture for manipulating the moment component of the actual total floor reaction force and the actual foot floor reaction force about the Z-axis is carried out by adding the following corrections to the aforesaid corrected desired feet position and/or posture (the foot illustrated in thick lines in FIG. 17) and the corrected desired foot floor reaction force central point (Q1' and Q2' illustrated in FIG. 17) obtained by the composite compliance operation in the first embodiment.

1) The coordinate of the corrected desired 1st foot floor reaction force central point (Q1' illustrated in FIG. 17) is rotated and moved about the desired total floor reaction force central point (desired ZMP) around the Z-axis by a rotational angle θdbz. The point after rotation is called "Q1'". Similarly, the coordinate of the corrected desired 2nd foot floor reaction force central point (Q2' illustrated in FIG. 17) is rotated and moved about the desired total floor reaction force central point (desired ZMP) around the Z-axis by the rotational angle θdbz. The point after rotation is called "Q2'". The rotational angle θdbz is called "feet compensating angle about the Z-axis".

The vector which starts at Q1' and ends at Q1" is named a vector Q1'Q1". Similarly, a vector which starts at Q2' and ends at Q2" is named a vector Q2'Q2". FIG. 33 shows Q1" and Q2" seen from the top.

3) Then, the corrected desired 1st foot is then parallel-translated by the vector Q1'Q1", without changing its posture. Similarly, the desired 2nd foot is parallel-translated by the vector Q2'Q2", without changing its posture. FIG. 33 shows each desired foot after movement with thick lines.

4) Then, the corrected desired 1st foot (obtained in 3)) is rotated about Q1', by a rotational angle θ1z around the vertical axis (Z-axis). Similarly, the corrected desired 2nd foot (obtained in 3) is rotated about Q2', by a rotational angle θ2z around the vertical axis (Z-axis). The rotational angles θnz is called "n-th foot Z-compensating angle" . FIG. 34 shows each corrected desired foot after rotation with thick lines.

If the above amount of compensating operation is not excessive, the relationship between the amount of compensating motion and the change in the actual foot floor reaction force generated by the compensating operation will exhibit the following appropriate characteristics.

Characteristic 1) If only the feet compensating angle θdbz is manipulated to move the corrected desired foot position, the force component of the actual foot floor reaction force is generated in the direction opposite to that of movement. At this time, the actual moment of foot floor reaction force about the corrected desired foot floor reaction force central point changes little.

Characteristic 2) If only the n-th foot Z-compensating angle is manipulated to rotate the n-th foot posture, only the Z-component of the moment of n-th foot floor reaction force about the desired n-th foot floor reaction force central point changes, but the other floor reaction force components change by a slight amount.

Characteristic 3) When the feet compensating angle θdbv, the foot X-compensating angle, the foot Y-compensating angle, the feet compensating angle about the Z-axis θdbz and the foot Z-compensating angle are all manipulated at the same time, the deviation of actual foot floor reaction force will be the sum of the individual deviations obtained by respective manipulations. (In other words, the linear combination will be possible).

It could be stated from the above that characteristics 1) and 2) indicate that the respective manipulations mentioned there have independency, while characteristic 3) indicates that the respective manipulations have linearity.

The composite compliance operation determinator determines the feet compensating angle about the Z-axis, i.e., θdbz and the foot Z-compensating angle in the aforesaid operation as follows.

Figure 35:
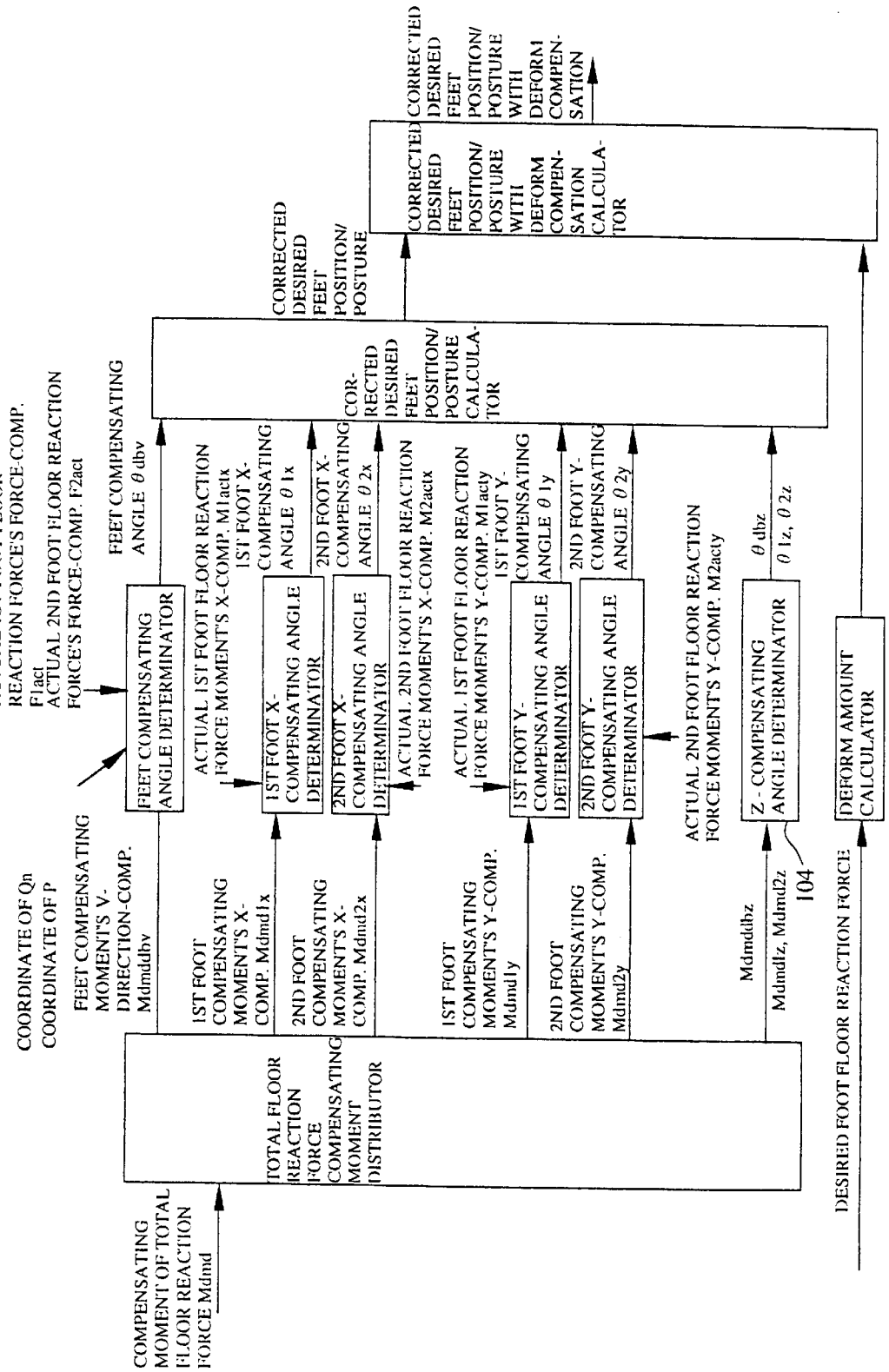
FIG. 35 is a block diagram, similar to FIG. 18, but showing the calculation of the composite compliance operation determinator of the system according to the third embodiment.
Figure 36:
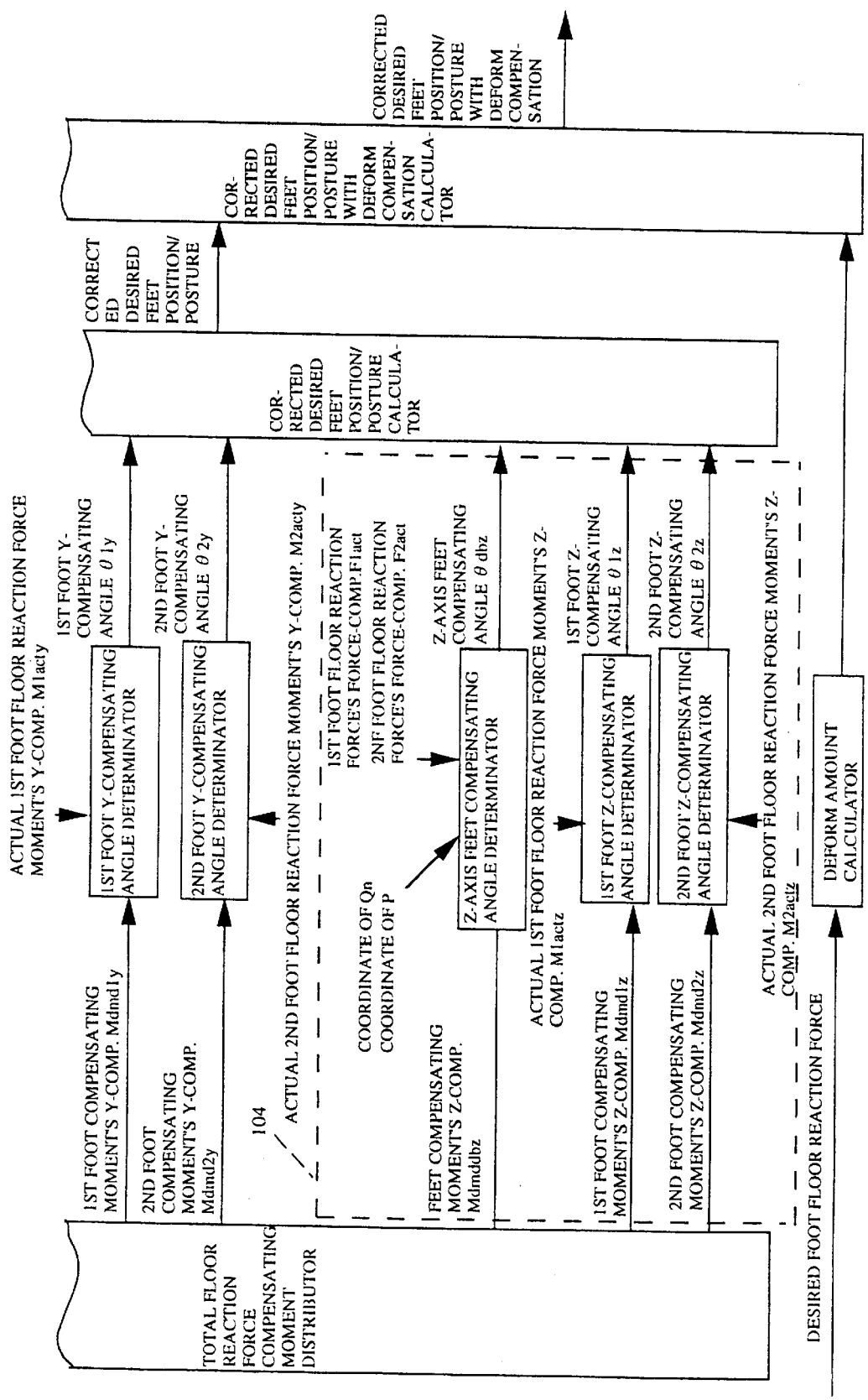
FIG. 36 is a block diagram showing the calculation of a Z-compensating angle determinator illustrated in FIG. 35.

Specifically, FIG. 35 is a schematic block diagram showing the operation of the composite compliance operation determinator in the third embodiment. As illustrated, a Z-compensating angle determinator 104 is added. FIG. 36 shows the details of the Z-compensating angle determinator 104. The added portion will hereinafter be explained.

As illustrated in FIG. 36, the total floor reaction force compensating moment distributor determines the Z-component Mdmddbz of the feet compensating moment Mdmddb and the foot Z-compensating moments Mdmd1z, Mdmd2z, and the Z-compensating angle determinator 104 determines the feet compensating angle about the Z-axis θdbz, the 1st foot Z-compensating angle θ1z and the 2nd foot Z-compensating angle θ2z based on the actual foot floor reaction force and the determined Z-component Mdmddbz of the feet compensating moment Mdmddb and the foot Z-compensating moments Mdmd1z, Mdmd2z, etc. (This corresponds to the procedures at S34$a$ in the flow chart of FIG. 31.)

The corrected desired feet position and/or posture calculator determines the corrected feet position and/or posture through a geometric calculation using data including the feet compensating angle about the Z-axis and the foot Z-compensating angle.

The added procedures will be explained in detail.

Figure 37:
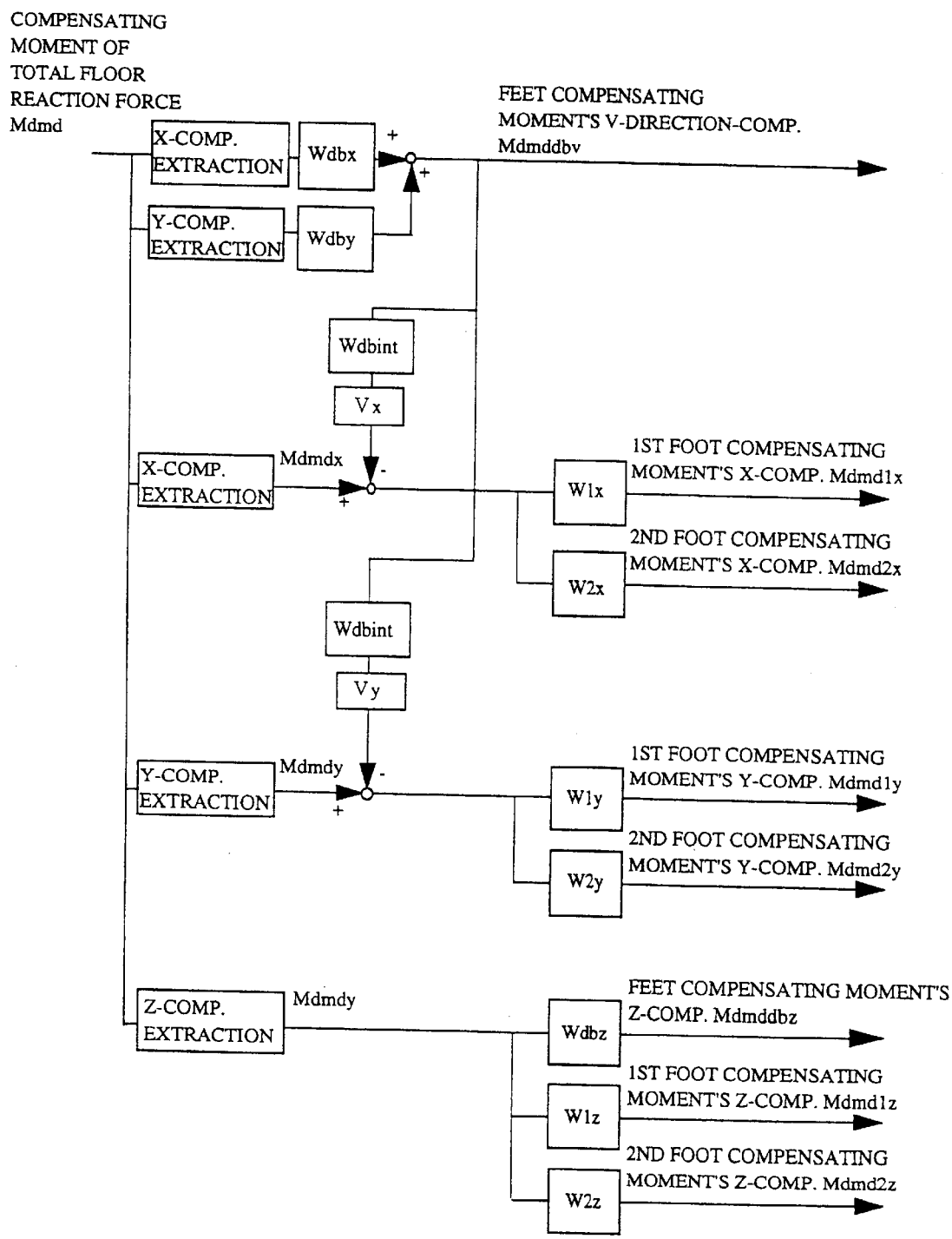
FIG. 37 is a block diagram showing the calculation of a total floor reaction force compensating moment distributor illustrated in FIG. 36.

Explaining the distribution of the compensating moment with reference to FIG. 37, the total floor reaction force compensating moment distributor is added with the operation to distribute the Z-component Mdmddz of the compensating moment of total floor reaction force Mdmd to the Z-component Mdmddbz of the feet compensating moment Mdmddb, the Z-component Mdmdd1z of the 1st foot compensating moment Mdmd1 and the Z-component Mdmd2z of the 2nd foot compensating moment Mdmd2.

The Z-component Mdmddbz of the feet compensating moment is a desired value of the moment to be generated about the desired total floor reaction force central point (desired ZMP) by the force component Fnact of the foot floor reaction force through the manipulation of the feet compensating angle θdbz.

The Z-component Mdmd1z of the 1st foot compensating moment is a Z-component of moment (shown as "M1" in FIG. 34) to be generated about the desired 1st foot floor reaction force central point by manipulating the 1st foot compensating angle θ1z. Similarly, the Z-component of the 2nd foot compensating moment is a Z-component of moment (shown as "M2" in FIG. 34) to be generated about the desired 2nd foot floor reaction force central point by manipulating the 2nd foot compensating angles θ2z.

The distribution will be carried out using, for example, the following equation.

$$Mdmddbz=Wdbz*Mdmdz$$

$$Mdmd1z=W1z*Mdmdz$$

$$Mdmd2z=W2z*Mdmdz \quad \text{Eq. 20}$$

Figure 38:
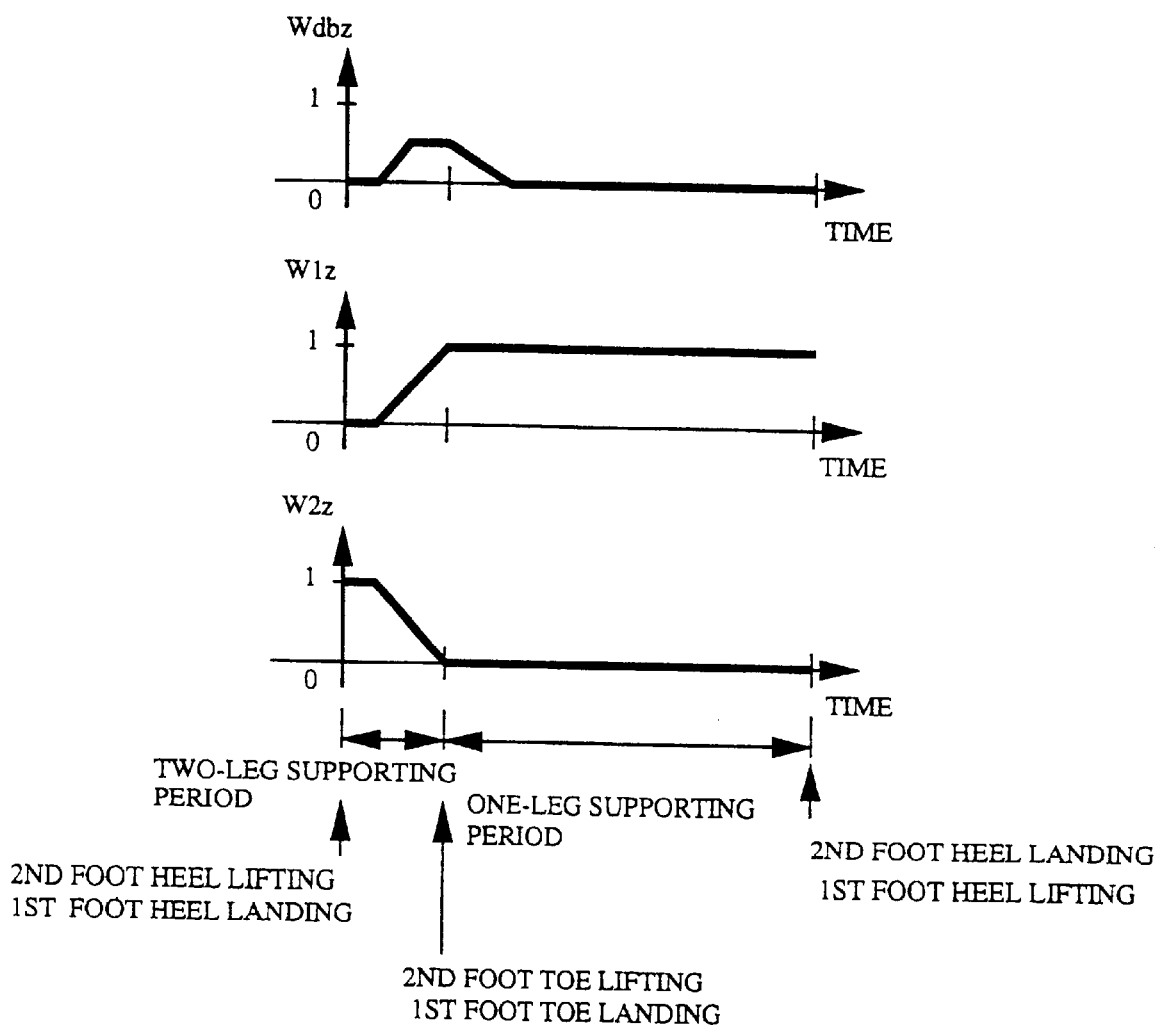
FIG. 38 is a set of time charts each showing examples of set distribution-weighting variables of the total floor reaction force compensating moment distributor, illustrated in FIG. 37.

In the above, Wdbz, W1z and W2z are distribution-weighting variables. FIG. 38 shows an example of the distribution-weighting variables Wdbz, W1z and W2z. The patterns illustrated in the figure should preferably be set taking the following attentions into account.

Attention 1) If the feet compensating angle and the foot compensating angle changed discontinuously, the joints experience an excessive torque. In order to change the feet compensating angle and the foot compensating angle continuously, the distribution-weighting variables should be varied continuously.

Attention 2) The distribution-weighting variables Wdbz, W1z and W2z should be determined such that the Z-component of the actual moment of floor reaction force generated by the manipulation of the feet compensating angle about the Z-axis and the foot Z-compensating angle, is as close as possible to the Z-component Mdmdz of the compensating moment of total floor reaction force Mdmd.

In a situation such as standing in which the Z-component Mdmddbz of the feet compensating moment, the Z-components Mdmd1z, Mdmd2z can be faithfully generated by the actual foot floor reaction force, the variable should preferably be set as follows. Specifically, the variables should be set, satisfying both Eq. 21 as much as possible, such that the Z-component of the actual moment of total floor reaction force Mact becomes equal to the Z-component of the compensating moment of total floor reaction force Mdmd (in the same way as applied to the other components as mentioned in the first embodiment under Demand 1) to the composite compliance operation determinator).

$$Wdbz+W1z+W2z=1 \quad \text{Eq. 21}$$

It is sufficient during walking if the left hand value in Eq. 21 is close to 1. In other words, it is not necessarily 1.

Attention 3) If the feet compensating angle about the Z-axis θdbz is not zero at the time when the free leg foot lands, the position of foot landing will sometimes deviate from a desired position, affecting the guidance control. Accordingly, the distribution-weighting variable Wbz for the feet compensating angle about the Z-axis should preferably be zero at or close to the time at which the free leg foot lands.

Attention 4) If the Z-component angle of a foot to be landed is not zero at the time when the foot has landed, the orientation of foot landing will sometimes deviate from the desired orientation, affecting the guidance control. Accordingly, at or close to the time at which the 1st foot lands, the distribution-weighting variable W1z for the 1st foot Z-compensating angle should preferably be zero, while the distribution-weighting variable W2z for the 2nd foot Z-compensating angle should preferably be zero at or close to the time at which the 2nd foot lands.

Furthermore, the determination of the feet compensating angle about the Z-axis θdbz is added. The feet compensating angle about the Z-axis, i.e., θdbz is determined in accordance with an algorithm similar to that of determination of the feet compensating angle θdbv. The difference therebetween is that the direction of the moment and angle is changed from V to Z. A block diagram for determining this feet compensating angle about the Z-axis θdbv can easily be obtained by replacing V with Z in the block diagram shown in FIG. 24.

Furthermore, the determination of the 1st foot compensating angle θ1z and the 2nd foot compensating angle θ2z is added. This n-th foot Z-compensating angle θnz is determined in accordance with an algorithm similar to that of determination of the 1st foot X-compensating angle θ1x. The difference therebetween is that X is changed as Z, while 1 is changed as n. A block diagram for determining this n-th foot Z-compensating angle θnz can easily be obtained by replacing X with Z and 1 with n in the block diagram shown in FIG. 25.

Figure 39:
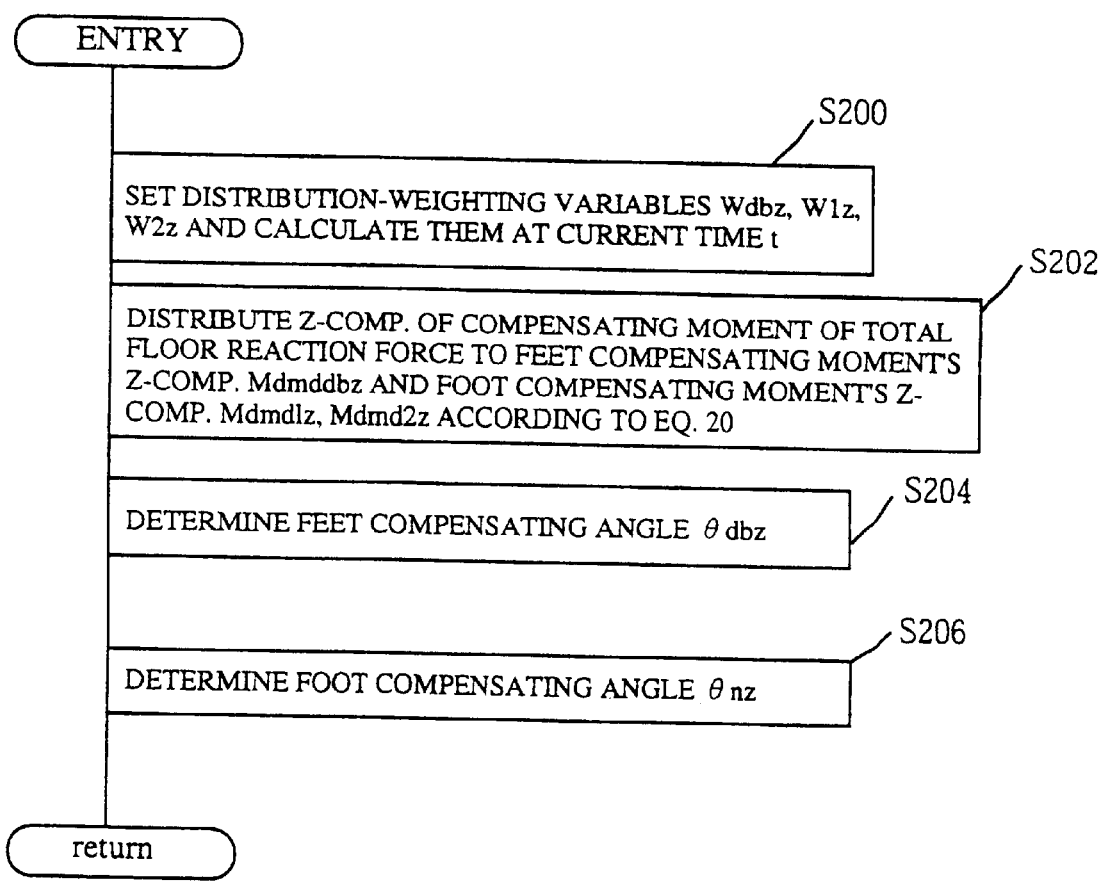
FIG. 39 is a flow chart showing the subroutine of determining a feet compensating angle about Z-axis, etc., referred to in the flow chart of FIG. 31.

The aforesaid subroutine of S34a of FIG. 31 is shown in S200 to S206 in FIG. 39.

Based on the above, in the corrected desired feet position and/or posture determination (corresponding to S38 in the flow chart of FIG. 31), the desired feet position and/or posture is corrected in accordance with the feet position and/or posture correction in the composite compliance operation added with the compensation about the Z-axis based on the feet compensating angle θdbv, the feet compensating angle about the Z-axis θdbz, the 1st foot X-compensating angle θ1x, the 1st foot Y-compensating angle θ1y, the 1st foot Z-compensating angle θ1z, the 2nd foot X-compensating angle θ2x, the 2nd foot Y-compensating angle θ2y, the 2nd foot Z-compensating angle θ2z to determine the corrected desired feet position and/or posture.

As mentioned above, since the compliance control with respect to the Z-component (the component about the vertical axis) of the actual moment of total floor reaction force is added, in addition to the effects and advantages mentioned in the foregoing embodiments, the third embodiment can suppress the vibration of the Z-component of the actual moment of foot floor reaction force due to the inherent rotative-vibration about the Z-axis, thereby attaining the posture stabilization control of a legged mobile robot more effectively.

Figure 32:
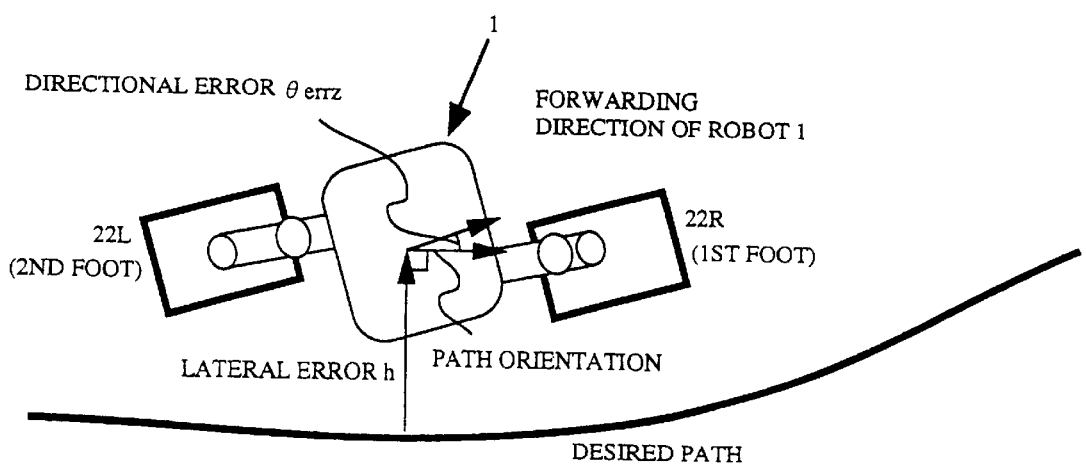
FIG. 32 is an explanatory plan view showing path guidance incorporated in the operation of the system according to the third embodiment.

Moreover, when the path guidance control shown in FIG. 32 is conducted, the system can accurately guide the robot along the desired path.

It should be noted in the third embodiment that, without providing the yaw-rate sensor 100, the position estimator 102 and the path guidance controller, the compliance control for the Z-component of the actual moment of total floor reaction force can be achieved to a considerable extent if the Z-component Mdmdz of the compensating moment of total floor reaction force is merely fixed to zero or thereabout. Claim 9 is based on this feature.

The first to third embodiments are thus configured to have a system for controlling a legged mobile robot having at least a body (body 24) and a plurality of (i.e., two) legs (leg links 2) each connected to the body through a first joint (10, 12, 14R(L)) and having a foot (foot 22R(L)) connected to its distal end through a second joint (18, 20R(L)), comprising gait generating means (gait generator, S10–S22) for generating a gait of the robot including at least a motion pattern, including at least a desired position and a posture of the foot (desired body position and/or posture; desired feet position and/or posture), and a desired pattern of a total floor reaction force acting on the robot (desired total floor reaction force; desired total floor reaction force central point (desired ZMP)); desired foot floor reaction force central point determining means (desired floor reaction force distributor, S24–S26) for determining a desired foot floor reaction force central point indicative of a point of action on the foot when the total floor reaction force in the generated gait is distributed to each of the feet (desired foot floor reaction force central point); actual floor reaction force detecting means (force sensor 44, actual foot floor reaction force detector, S32) for detecting an actual floor reaction force acting on the foot (actual foot floor reaction force); foot rotating amount determining means (composite compliance operation determinator, S32–S34, S34a, feet compensating angle determinator, n-th foot compensating angle determinator, S100–S108, S200–S206)) for calculating a moment of the detected actual floor reaction force about the desired foot floor reaction force central point (components of n-th foot floor reaction force Mactx, y, z), and for determining a foot rotating amount for rotating the foot based on the calculated moment (n-th foot compensating angle θnx, y, z); foot position/posture correcting means (composite compliance operation determinator, S38, S40, corrected desired feet position/posture calculator) for correcting the desired position and/or the posture of the foot such that the position and/or the posture of the foot rotates based on the determined foot rotating amount; and joint displacement means (robot geometric model (inverse kinematic solution), displacement controller, S40, S42) for displacing the first joint (10, 12, 14R(L)) and the second joint (18, 20R(L)) of the robot based on at least the corrected position and/or posture of the foot.

Moreover, they are configured to have a system for controlling a legged mobile robot (1) having at least a body (body 24) and a plurality of (i.e., two) legs (leg links 2) each connected to the body through a first joint (10, 12, 14R(L)) and having a foot (foot 22R(L)) connected to its distal end through a second joint (18, 20R(L)), comprising: gait generating means (gait generator, S10–S22) for generating a gait of the robot including at least a motion pattern, including at least a desired position and a posture of the foot (desired body position and/or posture, desired feet position and/or posture), and a desired pattern of a total floor reaction force acting on the robot (desired total floor reaction force, desired total floor reaction force central point (desired ZMP)); desired foot floor reaction force central point determining means (desired floor reaction force distributor, S24) for determining a desired foot floor reaction force central point indicative of a point of action on the foot when the total floor reaction force in the generated gait is distributed to each of the feet (desired foot floor reaction force central point); actual floor reaction force detecting means (force sensor 44, actual foot floor reaction force determinator, S32) for detecting an actual floor reaction force acting on the foot (actual foot floor reaction force); foot rotating amount determining means (composite compliance operation determinator, S32, S34, S34a, feet compensating angle determinator, n-th foot compensating angle determinator, S100–S108, S200–S206) for determining a foot rotating amount for rotating the foot based on the detected actual floor reaction force (n-th foot compensating angle θnx, y, z); foot position/posture correcting means (composite compliance operation determinator, S38, S40, corrected desired feet position/posture calculator) for correcting the desired position and/or the posture of the foot such that the position and/or the posture of the foot rotates about the desired foot floor reaction force central point or thereabout based on the determined foot rotating amount; and joint displacement means (robot geometric model (inverse kinematic solution), displacement controller, S40, S42) for displacing the first joint (10, 12, 14R(L)) and the second joint (18, 20R(L)) of the robot based on at least the corrected position and/or posture of the foot.

In the system, the foot position/posture correcting means corrects the desired position and/or the posture of the foot based on the determined foot rotating amount such that the position and/or the posture of the foot rotates about the desired foot floor reaction force central point or thereabout.

The system further includes: foot moving amount determining means (composite compliance operation determinator, S34, S34a, feet compensating angle determinator, S100–S108, S200–S206) for determining at least one of a moment of total floor reaction force actually acting on the robot (more precisely, the moment components PQ1*F1act+PQ2*F2act+M1act+M2act), and a moment (Mf1f2act=PQ1*F1act+PQ2*F2act) obtained by subtracting a moment of the floor reaction force acting on the foot (M1act+M2act) from the moment of total floor reaction force actually acting on the robot, and for determining a foot moving amount for moving the foot based on at least the determined moment (θdbv, z); and wherein the foot position/posture correcting means corrects the desired position and/or the posture of the foot based on the determined foot rotating amount and the determined foot moving amount.

In the system, a compensating moment of total floor reaction force (compensating total floor reaction force Mdmd) for posture stabilization is determined, and wherein the foot rotating amount determining means and/or the foot moving amount determining means determines the foot rotating amount and/or the foot moving amount based on at least the detected actual floor reaction force (actual foot floor reaction force) and the determined compensating moment of total floor reaction force for posture stabilization (S34, S34a, S100–S108, S200–S206).

In the system, the compensating moment of total floor reaction force for posture stabilization is determined based on at least an inclination error of the robot (θerrx, y, S28, S30a).

In the system, the compensating moment of total floor reaction force for posture stabilization is determined based on at least a yaw-rate of the robot (θerrz, dθerrz/dt, S28, S30a).

In the system, the compensating moment of total floor reaction force for posture stabilization is determined based on at least an error from a desired path of the robot (i.e., a lateral error from the desired path or the positional error h, S28, S30a).

In the system, a component (Mdmdz) of the compensating moment of total floor reaction (compensating total floor reaction force Mdmd) for posture stabilization is set to zero or thereabout.

In the system, the foot position/posture correcting means further corrects the desired position and/or the posture of the foot based on a posture error of the robot.

In the system, the foot rotating amount determining means and/or the foot moving amount determining means determines the foot rotating amount and/or the foot moving amount such that the compensating moment of total floor reaction force for posture stabilization is distributed to each of the legs (S34, S34a, S100–S108, S200–S206).

Furthermore, the present invention is configured to have a system for controlling a legged mobile robot (1) having at least a body (body 24) and a plurality of (two) legs (leg links 2) each connected to the body through a first joint (10, 12, 14R(L)) and having a foot (foot 22R(L)) connected to its distal end through a second joint (18, 20R(L)), comprising: gait generating means (gait generator, S10–S22, S24) for generating a gait of the robot including at least a motion pattern including at least a desired position and a posture of the foot (desired body position and/or posture, desired feet position and/or posture), and a desired trajectory pattern of a total floor reaction force acting on the robot (desired total floor reaction force, desired total floor reaction force central point (desired ZMP)); posture stabilization compensating total floor reaction force calculating means (posture stabilization controller, S30, S30a) for calculating a compensating total floor reaction force (compensating total floor reaction force Mdmd) for stabilizing a posture of the robot; actual floor reaction force detecting means (force sensor 44, actual foot floor reaction force detector, S32) for detecting an actual floor reaction force acting on the foot (actual foot floor reaction force); floor reaction force distributing means (desired floor reaction force distributor, S34, S34a, S100–S104, S200–S202) for distributing the total floor reaction force in the desired gait and the compensating total floor reaction force; correcting means (composite compliance operation determinator, S34, S34a, S36–S38, compensating angle determinator, deform amount calculator, corrected desired feet position/posture calculator, corrected desired feet position/posture with deform compensation calculator) for correcting the desired position and/or the posture of the foot in the desired gait based on the distributed floor reaction force in the desired gait and the compensating floor reaction force and the detected floor reaction force acting on the foot; and joint displacement means (robot geometric model (inverse kinematic solution), displacement controller, S40, S42) for displacing the first joint (10, 12, 14R(L)) and the second joint (18, 20R(L)) of the robot based on at least the corrected position and/or posture of the foot.

In the system, the correcting means further corrects the desired position and/or the posture of the foot based on a posture error of the robot.

In the first to third embodiments, expatiating the determination of the central point of foot rotation in the compensation operation, the central point of foot rotation in the compensation operation may be determined, at another point within the foot sole floor-contact region expected at that instant, instead of at the desired foot floor reaction force central point such as shown in FIG. 17.

Methods of determining the point will be listed below. It will be possible to configure the system such that a foot rotation causes only the actual moment of foot floor reaction force changes in order that the force component of actual foot floor reaction force suffers less interference, although the calculation becomes complicated. Any of the methods is selected, the moving trajectory of the central point of foot rotation should not be discontinuous. The reason is that, if the trajectory is discontinuous, the compensation operation changes sharply, causing the feet to flutter.

Method 1) Based on the various compensating moments and the force component of the desired foot floor reaction force, to determine a position at which the actual foot floor reaction force central point should exist when the various moments are generated, which is called "corrected desired foot floor reaction force central point". The corrected desired foot floor reaction force central point should be determined such that it does not exceed the foot sole floor-contact region expected at that instant. To determine the corrected desired foot floor reaction force central point or thereabout as the central point of foot rotation.

Method 2) To calculate the central point of area of the foot sole floor-contact region expected and determine the central point or thereabout as the central point of foot rotation.

Method 3) To calculate the actual foot floor reaction force central point based on the actual foot floor reaction force and determine the point or thereabout as the center point of foot rotation.

Method 4) To select two or more candidates from among the central points of foot rotation mentioned above and the foot floor reaction force central point to calculate a weighted average thereof and to determine the weighted average point as the central point of foot rotation.

It should be noted in the above, unless pressure distribution of the foot sole floor-contact region has a negative pressure portion, i.e., unless adhesion is generated, the actual foot floor reaction force central point must exist within the foot sole floor-contact region.

In the first to third embodiments, as illustrated in FIG. 4, although the desired body position and/or posture trajectory is immediately inputted to the robot geometric model, it is alternatively possible to correct the trajectory by re-calculating the body height with the use of body height determination proposed by the applicant in Japanese Application No. Hei 8 (1996)—214,260 based on the horizontal position of the desired body position and/or posture trajectory and the corrected desired feet position and/or posture trajectory, and to input the corrected trajectory to the robot geometric model.

If the desired feet position and/or posture trajectory is corrected to a great extent, the original body height may sometimes make the robot leg stretch to its maximum limit such that the robot is unable to take the expected posture. Therefore, when the body height is re-calculated in the manner mentioned above, such a leg-fully-stretching problem will rarely occur.

In the first to third embodiments, if the robot body tilts, the actual position and/or posture of the foot will deviate relative to the floor. As a result, the actual foot floor reaction force will deviate from the desired foot floor reaction force. This deviation can be canceled by correcting the feet compensating angle θdbv and the foot compensating angles θnx, θny such that the deviation of foot position and/or posture due to body tilting is canceled.

Specifically, this is done by correcting with the use of the X-component θerrx and the Y-component θerry of the body inclination error and the aforesaid vector V. More specifically, the feet compensating angle θdbv (determined in the aforesaid determination of feet compensating angle) is corrected by adding a value Δθdbv (to be obtained by the following equation) thereto.

$$\Delta\theta dbv = -(\theta errx * Vx + \theta erry * Vy)$$

Then, the value θerrx is subtracted respectively from the 1st foot X-compensating angle θ1x and the 2nd foot X-compensating angle θ2x (determined in the aforesaid foot compensating angle determination) to correct the same.

Similarly, the value θerry is subtracted respectively from the 1st foot Y-compensating angle θ1y and the 2nd foot Y-compensating angle θ2y (determined in the aforesaid foot compensating angle determination) to correct the same. Claims 10 and 13 are based on this feature.

In the first to third embodiments, the feet deform compensating angle θffdbv may be zero if the control accuracy is not intended to be high. In other words, the calculation of this feet deform compensating angle may be omitted.

In the first to third embodiments, the 1st foot X-deform compensating angle θff1x may also be zero if the control accuracy is not intended to be high. In other words, the calculation of this 1st foot compensating angle may be omitted.

In the first to third embodiment, since the distribution-weighting variables are determined in response to the desired gait timing, the processing is facilitated. However, if the floor condition differs greatly from that anticipated in the desired gait, the increase amount of actual floor reaction force may differ greatly from Mdmd due to the deviation of foot landing timing.

In order to enhance the robustness against an unexpected change in floor condition, it is alternatively possible to detect the instant of foot landing and lifting based on the force component of the actual floor reaction force and to vary the values of the distribution-weighting variables using the detected data as a trigger.

It is alternatively possible to estimate the foot sole floor-contact condition (e.g., to estimate whether the desired foot floor reaction force central point is out of the desirable foot sole floor-contact region), and to vary the values of the distribution-weighting variables in an appropriate manner taking the actual floor reaction force into account, for example, to decrease the weights so as to suppress the generation of moment if the foot sole floor-contact condition is not good.

In the first to third embodiments, the equation of inverse kinematic solution is prepared beforehand such that the joint displacements are obtained by merely putting the body position and/or posture and the feet position and/or posture. Although the solution must exist in this embodiment, there may be a case in which the solution is not directly obtained depending on the joint arrangement. Needless to say, this configuration can not be applied to that case.

In that case, it will be possible to use the inverse-Jacobean which expresses a ratio of joint perturbation relative to feet position and/or posture relative to the body position and/or posture, etc., in matrix, or pseudo-inverse Jacobean, such that the joint displacements are approximated. This is a technique often used in the industrial robot. Even if the aforesaid configuration is not usable, the solution can be approximated using this technique.

In the first to third embodiments, the spring mechanism 32 (and the sole elastic member 34) itself is not the essential feature of the invention. The essential feature of the invention resides in the feedback control. The deform compensation is an optional feature.

In the first to third embodiment, and equivalent altering the order of calculation may be made on the block diagrams illustrated.

In the first to third embodiments, as mentioned above, assuming that the desired gait of the legged mobile robot is subject to a reaction force, other than the floor reaction force, from the environment, the aforesaid definition of the desired ZMP may be extended by obtaining the resultant force of the force of inertia, the gravity and the reaction force from an object generated by the desired motion pattern, if the moment, except for the vertical moment, of the obtained resultant force about a certain point of action on the floor is zero, by newly defining the point of action as desired ZMP.

The applicant proposed, in Japanese Laid-Open Patent Application Hei 5 (1993)—337,849, correcting only the desired motion pattern (leaving the desired total floor reaction force as it is), and restoring the posture inclination by producing a difference between the ZMP of the corrected motion pattern and the desired total floor reaction force central point. When this technique is combined in this system, the desired total floor reaction force central point will not be equal to the desired ZMP.

In the foregoing embodiments, although the present invention has been described with reference to a biped robot, the present invention can be applied to other legged mobile robots.

INDUSTRIAL FIELD IN WHICH THE INVENTION IS APPLICABLE

According to the present invention, it becomes possible to control the floor reaction forces acting on the legged mobile robot, without causing the interference to occur, easily and properly. In other words, if a control which is close to the combination of the two-leg-compliance control and the ankle-compliance control proposed earlier, is conducted, no control interference occurs and hence, the actual total floor reaction force and the actual foot floor reaction force do not deviate from desirable values, and no oscillation occurs.

Moreover, the system can ensure to control the floor reaction force acting on the robot properly, even when walking on the floor having not only a slant or undulation extending over a relatively long distance, but also an unexpected local slant or level difference, without suffering therefrom.

Furthermore, the system can achieve the posture stabilization control of a legged mobile robot easily, decrease the impact acting on the legged mobile robot at foot landing, and enhance the contactability with the floor so as to prevent the slippage or spinning at walking from happening. In addition, the system can decrease the load of the actuators of the legged mobile robot.

What is claimed is:

1. A system for controlling a legged mobile robot having at least a body and a plurality of legs each connected to the body through a first joint and having a foot connected to its distal end through a second joint, comprising:
   a. gait generating means for generating a gait of the robot including at least a motion pattern including at least a desired position and a posture of the foot, and a desired pattern of a total floor reaction force acting on the robot;
   b. desired foot floor reaction force central point determining means for determining a desired foot floor reaction force central point indicative of a point of action on the foot when the total floor reaction force in the generated gait is distributed to each of the feet;
   c. actual floor reaction force detecting means for detecting an actual floor reaction force acting on the foot;
   d. foot rotating amount determining means for calculating a moment of the detected actual floor reaction force about the desired foot floor reaction force central point, and for determining a foot rotating amount for rotating the foot based on the calculated moment;
   e. foot position/posture correcting means for correcting the desired position and/or the posture of the foot such that the position and/or the posture of the foot rotates based on the determined foot rotating amount; and
   f. joint displacement means for displacing the first joint and the second joint of the robot based on at least the corrected position and/or posture of the foot.

2. A system according to claim 1, wherein the foot position/posture correcting means corrects the desired position and/or the posture of the foot based on the determined foot rotating amount such that the position and/or the posture of the foot rotates about the desired foot floor reaction force central point or thereabout.

3. A system according to any of claims 1 to 2, further including:
   g. foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment;
   and wherein the foot position/posture correcting means corrects the desired position and/or the posture of the foot based on the determined foot rotating amount and the determined foot moving amount.

4. A system according to claim 1 or 5, wherein the foot position/posture correcting means further corrects the desired position and/or the posture of the foot based on a posture error of the robot.

5. A system for controlling a legged mobile robot having at least a body and a plurality of legs each connected to the body through a first joint and having a foot connected to its distal end through a second joint, comprising:
   a. gait generating means for generating a gait of the robot including at least a motion pattern, including at least a desired position and a posture of the foot, and a desired pattern of a total floor reaction force acting on the robot;
   b. desired foot floor reaction force central point determining means for determining a desired foot floor reaction force central point indicative of a point of action on the foot when the total floor reaction force in the generated gait is distributed to each of the feet;
   c. actual floor reaction force detecting means for detecting an actual floor reaction force acting on the foot;
   d. foot rotating amount determining means for determining a foot rotating amount for rotating the foot based on the detected actual floor reaction force;
   e. foot position/posture correcting means for correcting the desired position and/or the posture of the foot such that the position and/or the posture of the foot rotates about the desired foot floor reaction force central point or thereabout based on the determined foot rotating amount; and
   f. joint displacement means for displacing the first joint and the second joint of the robot based on at least the corrected position and/or posture of the foot.

6. A system according to any of claims 1 or 5, wherein a compensating moment of total floor reaction force for posture stabilization is determined, and wherein the foot rotating amount determining means and/or the foot moving amount determining means determines the foot rotating amount and/or the foot moving amount based on at least the detected actual floor reaction force and the determined compensating moment of total floor reaction force for posture stabilization.

7. A system according to claim 6, wherein the compensating moment of total floor reaction force for posture stabilization is determined based on at least an inclination error of the robot.

8. A system according to claim 6, wherein the compensating moment of total floor reaction force for posture stabilization is determined based on at least a yaw-rate of the robot.

9. A system according to claim 6, wherein the compensating moment of total floor reaction force for posture stabilization is determined based on at least an error from a desired path of the robot.

10. A system according to claim 6, wherein a component of the compensating moment of total floor reaction for posture stabilization is set to zero or thereabout.

11. A system according to claim 6, wherein the foot rotating amount determining means and/or the foot moving amount determining means determines the foot rotating amount and/or the foot moving amount such that the compensating moment of total floor reaction force for posture stabilization is distributed to each of the legs.

12. A system for controlling a legged mobile robot having at least a body and a plurality of legs each connected to the body through a first joint and having a foot connected to its distal end through a second joint, comprising:
   a. gait generating means for generating a gait of the robot including at least a motion pattern, including at least a desired position and a posture of the foot, and a desired trajectory pattern of a total floor reaction force acting on the robot;
   b. posture stabilization compensating total floor reaction force calculating means for calculating a compensating total floor reaction force for stabilizing a posture of the robot;
   c. actual floor reaction force detecting means for detecting an actual floor reaction force acting on the foot;
   d. floor reaction force distributing means for distributing the total floor reaction force in the desired gait and the compensating total floor reaction force;
   e. correcting means for correcting the desired position and/or the posture of the foot in the desired gait based on the distributed floor reaction force in the desired gait and the compensating floor reaction force and the detected floor reaction force acting on the foot; and
   f. joint displacement means for displacing the first joint and the second joint of the robot based on at least the corrected position and/or posture of the foot.

13. A system according to claim 12, wherein the correcting means further corrects the desired position and/or the posture of the foot based on a posture error of the robot.

* * * * *